March 28, 1944.  M. L. NELSON  2,345,212
TOTALIZING SYSTEM
Filed April 22, 1940  18 Sheets-Sheet 3

INVENTOR
Martin L. Nelson
BY
Davis, Lindsey, Smith & Shonts
ATTORNEYS

March 28, 1944.    M. L. NELSON    2,345,212
TOTALIZING SYSTEM
Filed April 22, 1940    18 Sheets-Sheet 4

INVENTOR
Martin L. Nelson
BY
Davis, Lindsey, Smith & Shonts
ATTORNEYS.

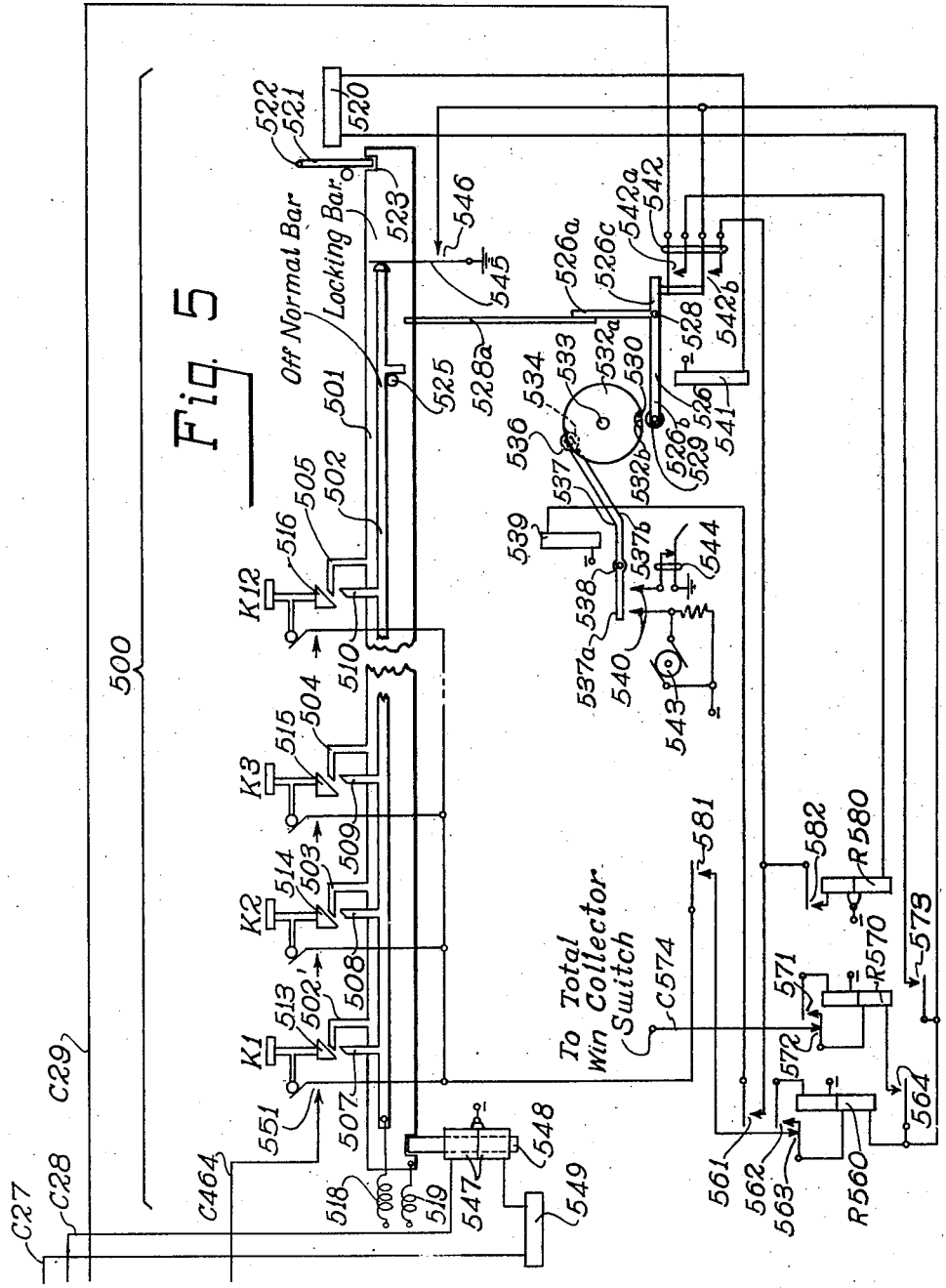

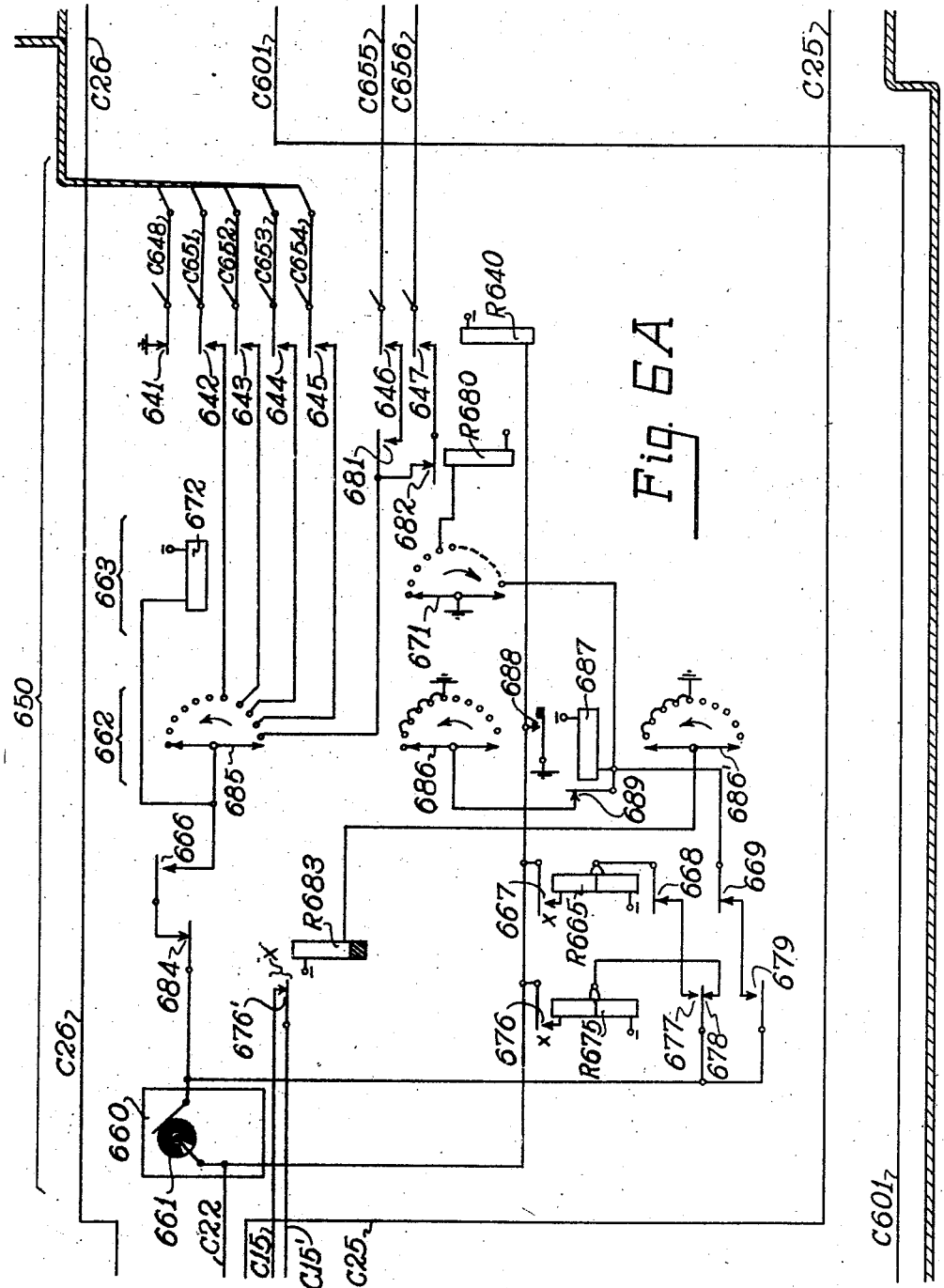

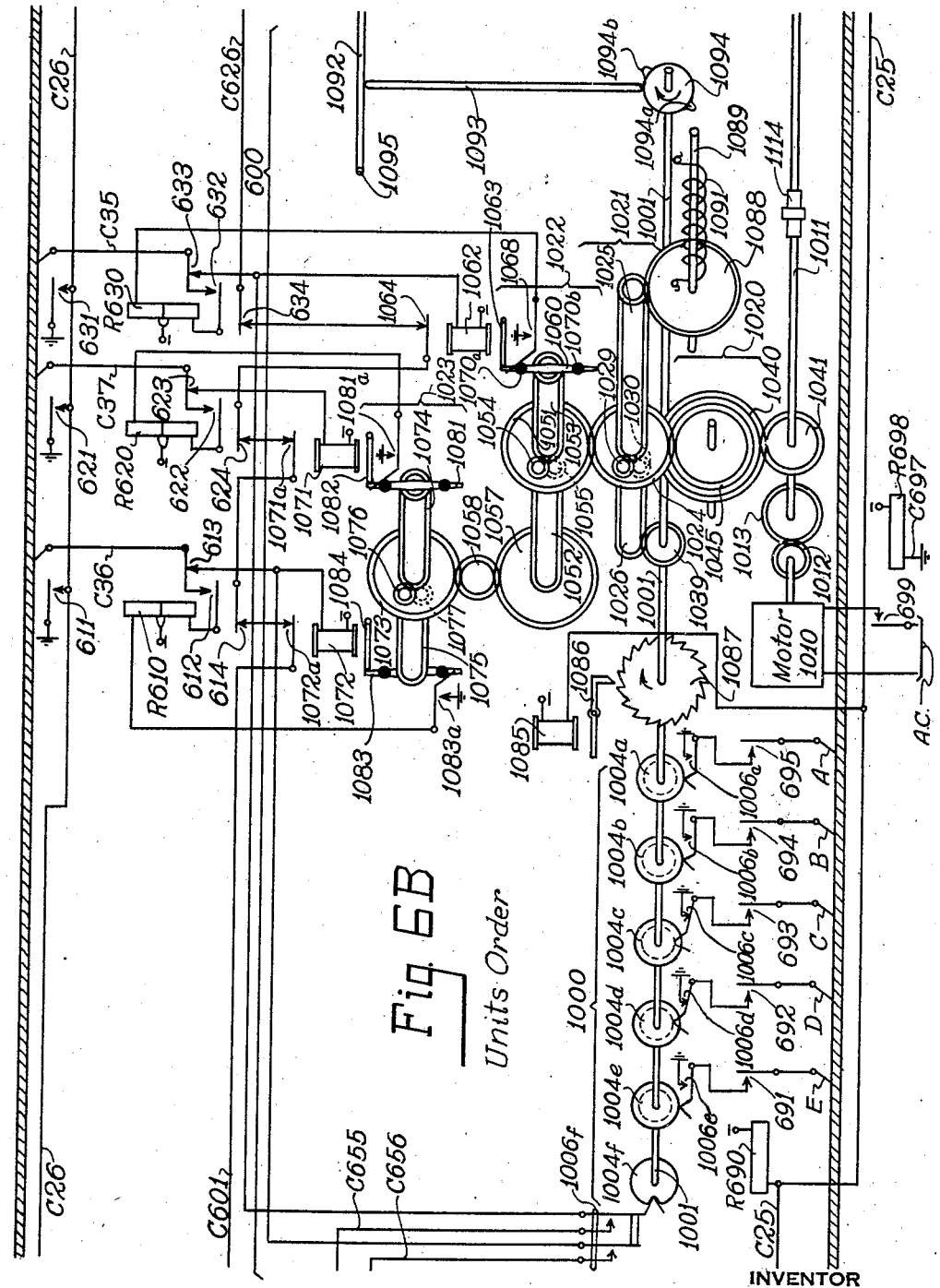

March 28, 1944.  M. L. NELSON  2,345,212
TOTALIZING SYSTEM
Filed April 22, 1940   18 Sheets-Sheet 8
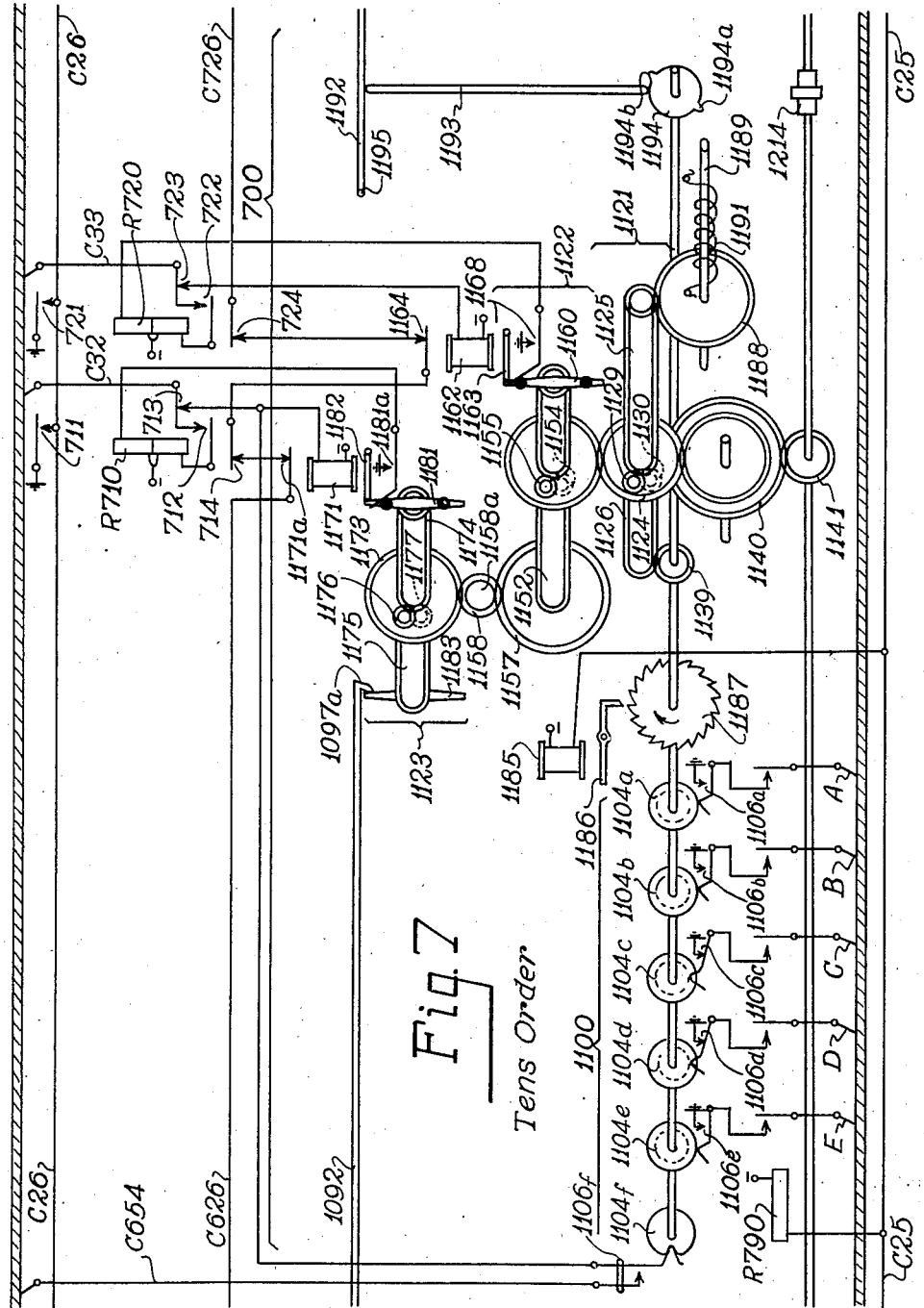
INVENTOR
Martin L. Nelson
BY
Davis, Lindsey, Smith + Shonts
ATTORNEYS

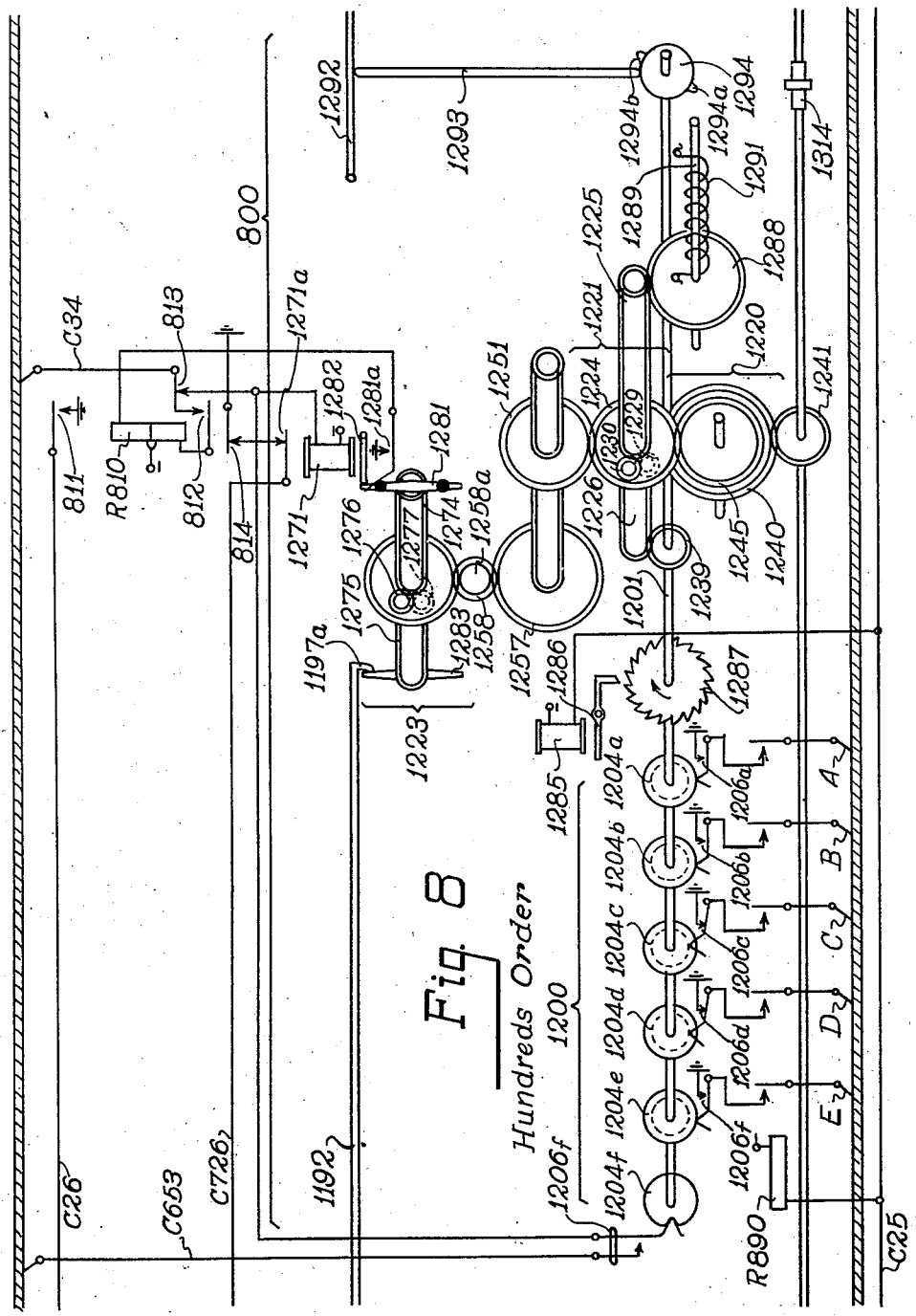

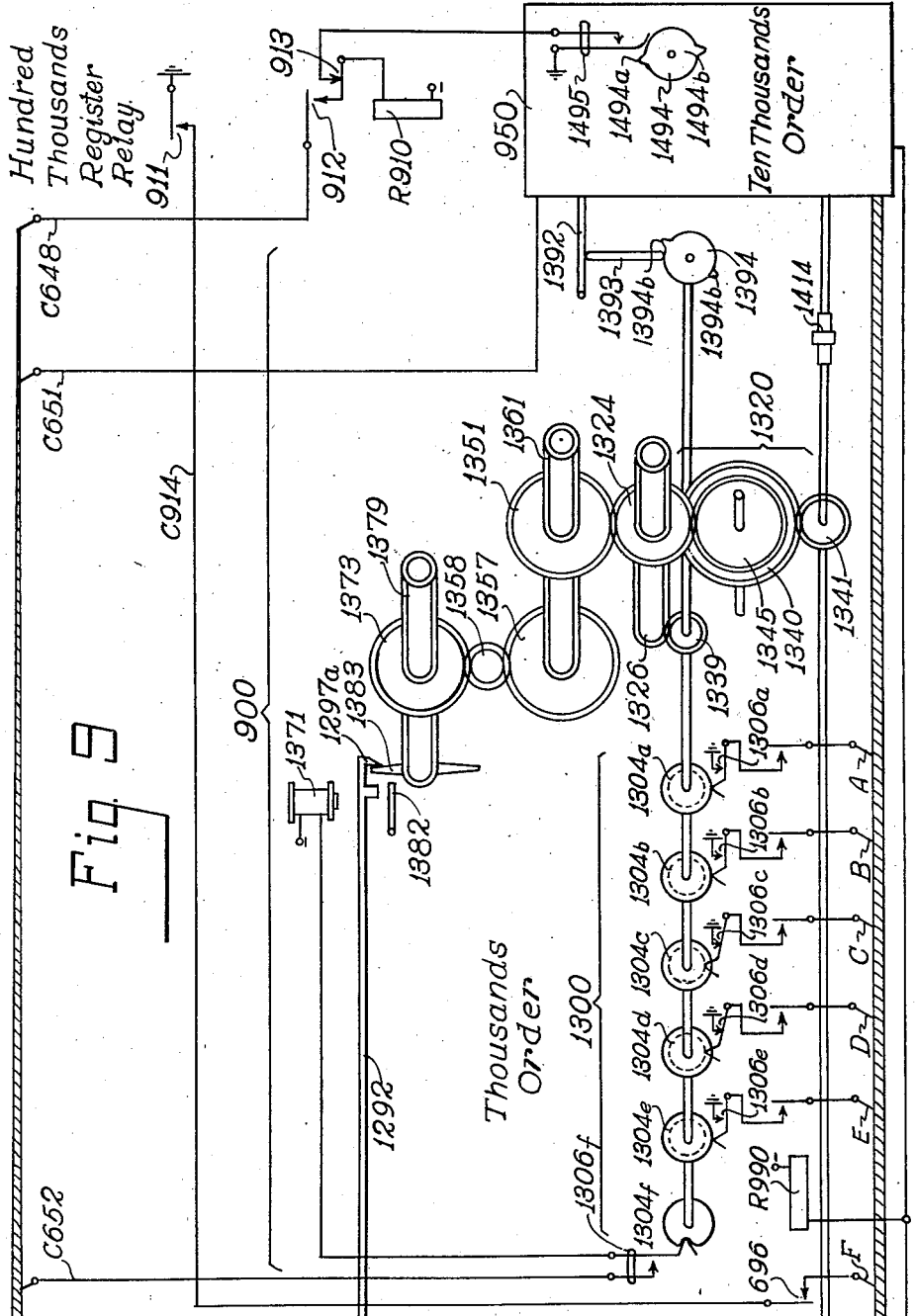

March 28, 1944.　　　M. L. NELSON　　　2,345,212
TOTALIZING SYSTEM
Filed April 22, 1940　　　18 Sheets-Sheet 16

INVENTOR
Martin L. Nelson
BY
Davis, Lindsey, Smith & Shonts
ATTORNEYS

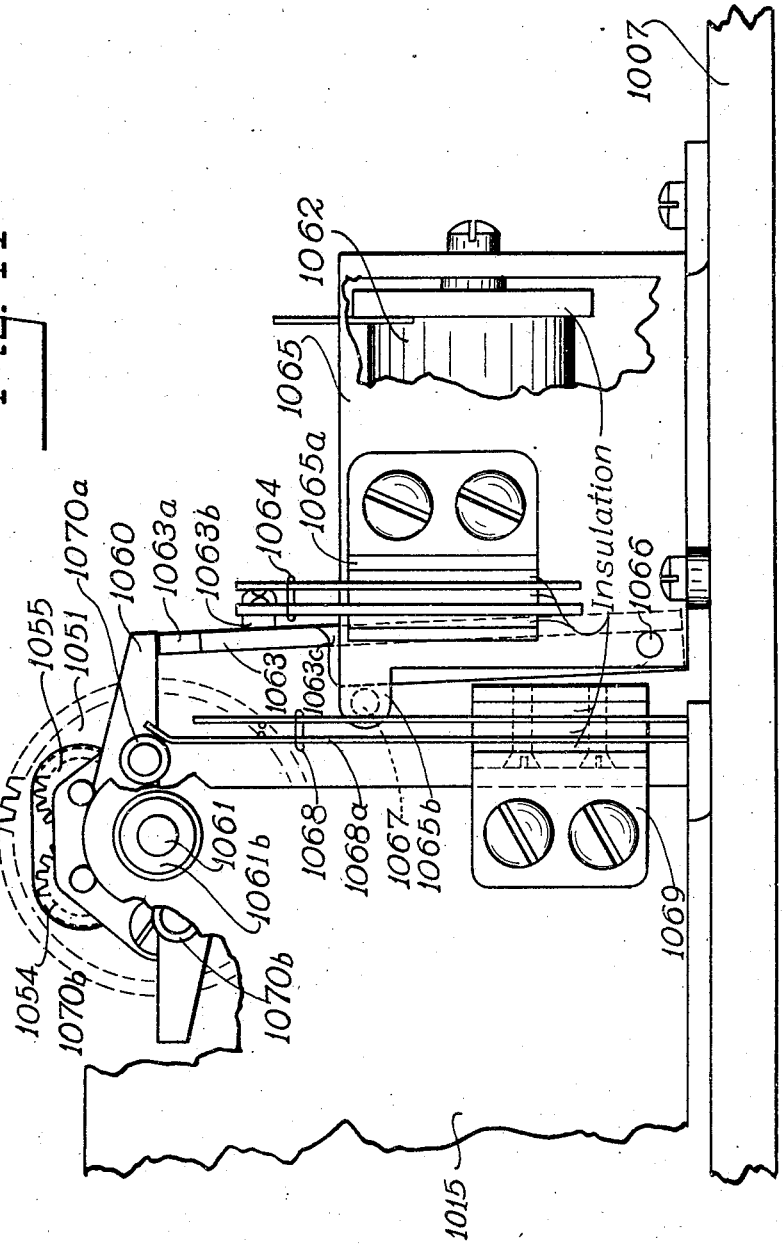

March 28, 1944.   M. L. NELSON   2,345,212
TOTALIZING SYSTEM
Filed April 22, 1940   18 Sheets-Sheet 18

Fig. 19

| Position | Closed Contacts | | | | | Digit | |
|---|---|---|---|---|---|---|---|
| | A | B | C | D | E | | |
| First Normal Position | | | x | x | | 0 | ⎫ |
| First Off Normal | x | | | | x | 1 | |
| Second " " | | | x | | x | 2 | |
| Third " " | | x | x | | | 3 | ⎬ First Half-Revolution Of Drum |
| Fourth " " | x | x | | | | 4 | |
| Fifth " " | | x | | | x | 5 | |
| Sixth " " | x | | | x | | 6 | |
| Seventh " " | x | | x | | | 7 | |
| Eighth " " | | | | x | x | 8 | |
| Ninth " " | | x | | x | | 9 | ⎭ |
| Second Normal Position | | | x | x | | 0 | ⎫ |
| First Off Normal | x | | | | x | 1 | |
| Second " " | | | x | | x | 2 | |
| Third " " | | x | x | | | 3 | ⎬ Second Half Revolution Of Drum |
| Fourth " " | x | x | | | | 4 | |
| Fifth " " | | x | | | x | 5 | |
| Sixth " " | x | | | x | | 6 | |
| Seventh " " | x | | x | | | 7 | |
| Eighth " " | | | | x | x | 8 | |
| Ninth " " | | x | | x | | 9 | ⎭ |

Fig. 20

Figure 2:
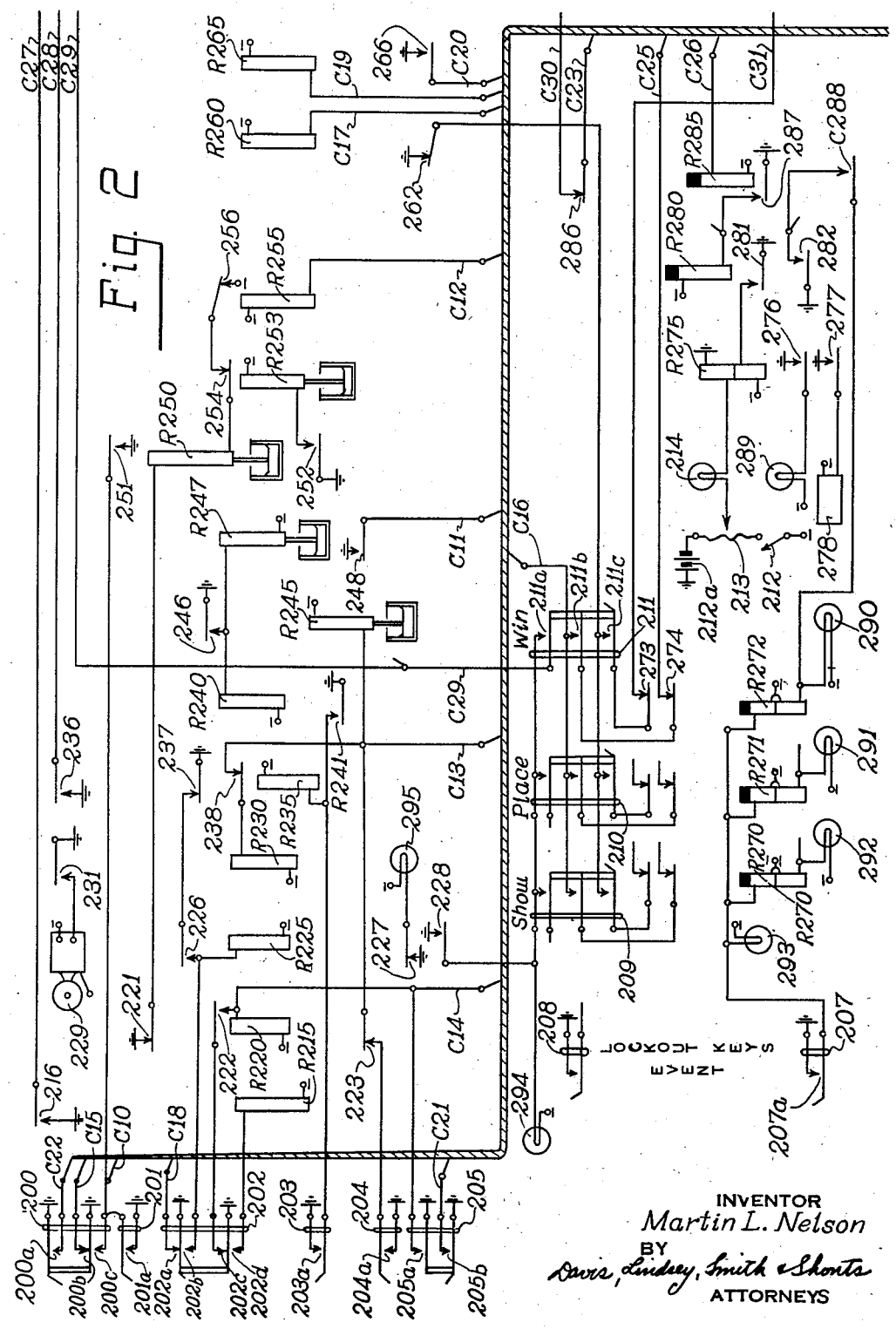
Figure 3:
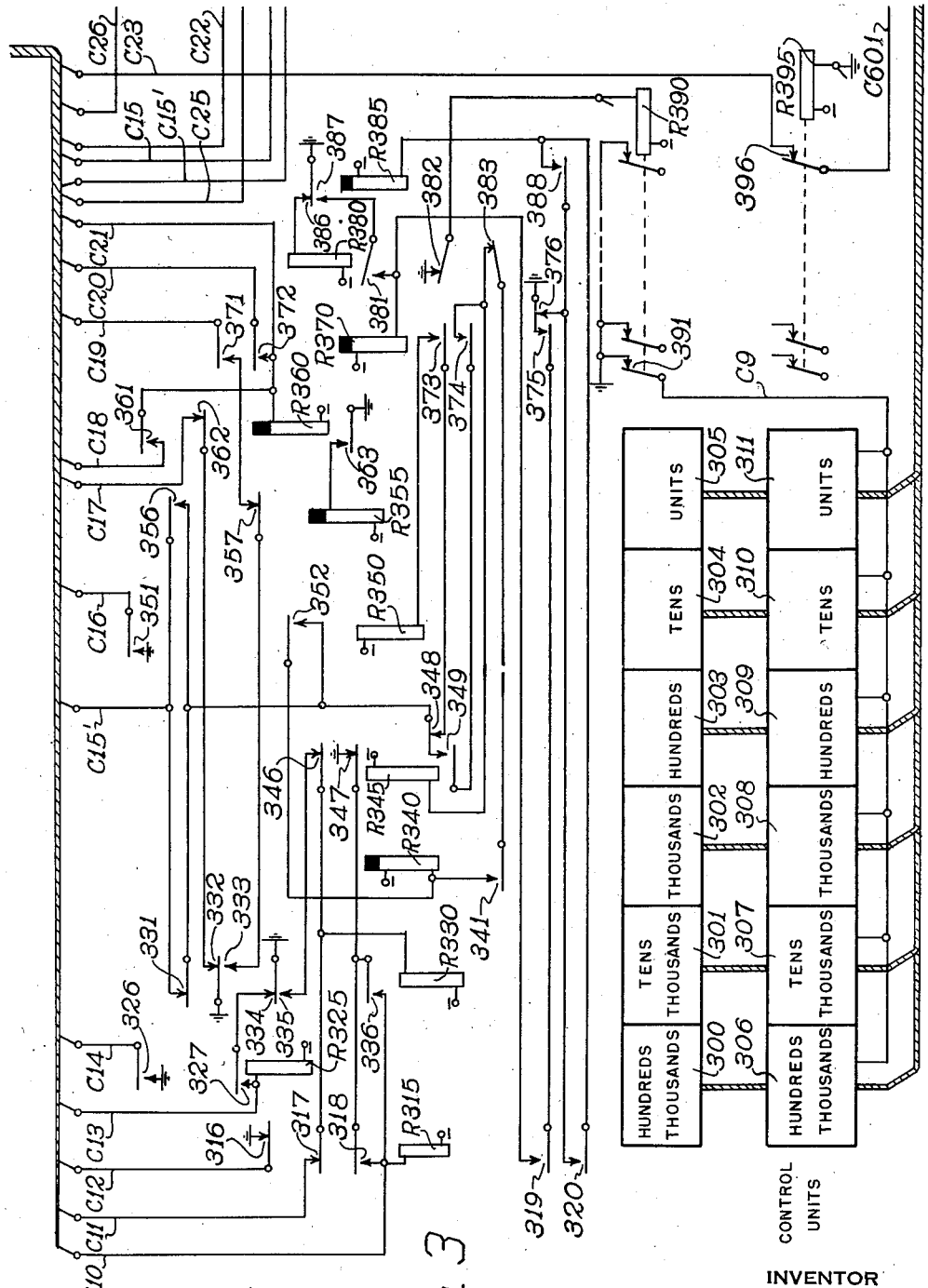
Figure 4:
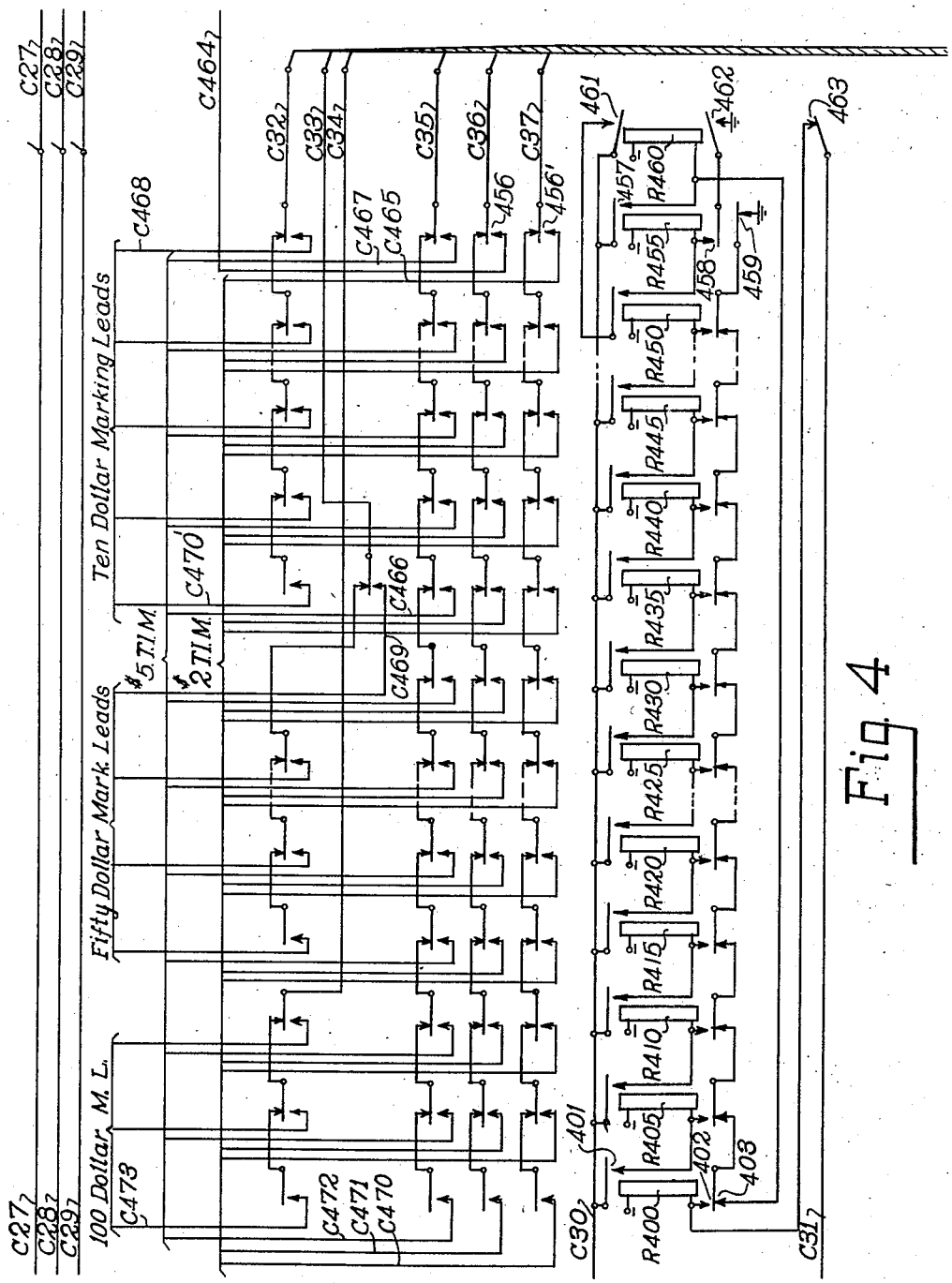

| Fig. 2 | Fig. 4 | Fig. 5 | | | |
|---|---|---|---|---|---|
| Fig. 3 | Fig. 6A | Fig. 6B | Fig. 7 | Fig. 8 | Fig. 9 |

INVENTOR
Martin L. Nelson
BY
Davis, Lindsey, Smith & Shonts
ATTORNEYS

Patented Mar. 28, 1944

2,345,212

UNITED STATES PATENT OFFICE 2,345,212

TOTALIZING SYSTEM

Martin L. Nelson, Park Ridge, Ill., assignor to Automatic Electric Laboratories, Inc., a corporation of Delaware Application April 22, 1940, Serial No. 330,971

24 Claims. (Cl. 235—92)

The present invention relates to automatic totalizing systems and apparatus, and more particularly to improved apparatus for rapidly and accurately totalizing the values of tickets of different denominations and different classes which are sold for different entries for different events at public gatherings, whereby there is obtained and indicated the total value of all of the tickets of each class sold for each of the events and the total value of tickets of particular classes sold for the individual entries.

In the usual arrangement for this purpose the ticket-issuing machines are divided into classes and collector switches, individual to the various entries, are provided in association with the machines of each class for collecting the data of the tickets of different denominations which are issued for the respective entries by the ticket-issuing machines. Thus, each collector switch individually corresponds to a particular entry and to a particular class of ticket. Each collector switch is arranged to control an associated adding machine which functions to total the values of the tickets of the corresponding class which are issued for the corresponding entry. Indicating apparatus is provided in association with each adding machine for the purpose of indicating the total registered in the associated adding machine. Control apparatus is also provided for periodically changing the total displayed by each set of indicating apparatus so that it corresponds to the total registered by the associated adding machine. Different modifications of this general arrangement are illustrated and described in the following patents: No. 2,031,298—Belas et al., granted February 18, 1936; No. 2,066,698—Simpson, granted January 5, 1937; No. 2,071,184—Stewart et al., granted February 16, 1937; No. 2,084,414—Simpson, granted June 22, 1937; No. 2,121,164—Robinson, granted June 21, 1938; No. 2,167,513—Johnston, granted July 25, 1939. In these and other prior arrangements, the adding machines used are only capable of posting the value of one issued ticket at a time, the various ticket values at any time registered in the associated collector switch being sequentially accepted by the adding machine. Further, no provisions are made in the adding machines for enabling any of the component register elements thereof concurrently to post the value of a ticket sale and a value transferred thereto from a register element of lower order, the arrangements being such that these two operations are, in each instance, sequentially effected. Thus, a delay in the totaling of ticket sales occurs each time a carryover between two elements of the adding machine is required. Moreover, in each of these arrangements wherein the displayed totals are periodically changed to conform to the totalized ticket sales, the various adding machines, collector switches and ticket-issuing machines are locked against operation during each period when the totals set up in the adding machines are being transferred to the display panels, thus introducing a time delay in the totalizing and posting of ticket sales.

It is an object of the present invention, therefore, to provide an improved totalizing system of the character described which is so arranged that tickets may be sold and issued during the periods when the totals set up in the adding machines are being transferred to the display panels, and the value of tickets issued during such periods are posted in the adding machines of the system.

It is a further object of the invention to provide an improved totalizing system of the character described which is so arranged that the individual values of a plurality of tickets may be concurrently posted in each adding machine and the tickets representing the values posted are concurrently issued by the ticket-issuing machines on which the ticket sales are indexed.

It is another object of the invention to provide a totalizing system of the character described wherein certain of the register elements of the adding machine are individually arranged simultaneously to register the total value represented by one or more ticket sales and a value transferred thereto from a register element of lower order.

It is a further object of the invention to provide an improved totalizing system of the character described wherein provisions are made for positively and reliably restoring the register elements of each adding machine to normal in a predetermined order at the end of each ticket selling period.

It is a still further object of the invention to provide an improved totalizing system of the character described which is of simple and economical arrangement and is positive and reliable in its operation rapidly to totalize the values represented by a plurality of ticket sales of various classes and for different entries.

It is another object of the invention to provide an improved adding machine which is particularly adapted for use in a system of the character described and is so arranged that the register elements thereof may be locked during a period when the total set up therein is being transferred to associated indicating equipment, without arresting operation of the machine to register values posted therein and without introducing errors in the totals registered thereby.

It is still another object of the invention to provide an adding machine of the character described which is so arranged that operation of the register elements thereof may be arrested during a period when the total set up therein is being transferred to associated indicating equipment, and other parts thereof may continue to operate for the purpose of totaling the values posted in the machine during the intervals when operation of the register elements is arrested.

It is a further object of the invention to provide an improved adding machine of the character described which is so arranged that a plurality of values may be concurrently registered therein to increase the total registered thereby by an amount equal to the sum of the plurality of values.

It is still another object of the invention to provide an improved adding machine of the character described which is so arranged that certain of the register elements thereof may be individually operated simultaneously to register the total of one or more values posted therein and a value transferred thereto from a register element of lower order.

It is a still further object of the invention to provide an improved adding machine of the character described which is of simple and economical arrangement and is positive and reliable in operation.

In the illustrated embodiment of the invention there is provided a totalizing system which comprises the usual value indexing apparatus in the form of ticket-issuing machines for individually issuing tickets of different classes and denominations with respect to the entries of the different events. This apparatus is arranged to control a plurality of adding machines which are individual to the classes and entries and include register apparatus normally operative to total the value of tickets issued by the associated ticket-issuing machines. Indicating units individual to the various adding machines are provided for displaying the total value of the tickets issued by the ticket-issuing machines of the corresponding class for the corresponding entries. For the purpose of transferring the totals registered by the respective adding machines to their respective associated indicating units, means are provided for intermittently locking the register apparatus of the adding machines against operation and for changing the total displayed by each indicating unit so that it corresponds to the total registered by the associated adding machine and for then releasing the register apparatus of the adding machines for further operation.

In accordance with one feature of the present invention, storage devices are provided for storing the total value of tickets issued by the ticket-issuing machines for the corresponding entries when the register apparatus is locked against operation, and for transferring the stored totals to the register apparatus when the register apparatus is released for further operation. More specifically, each of the adding machines includes a plurality of register elements and each register element is arranged to respond to the operation of one or more associated control devices. Certain of the register elements are individually operative simultaneously to register in one continuous operation the total value designated by the concurrent operation of two or more of the associated control devices. The arrangement further includes provisions whereby the simultaneous operation of the two control devices associated with a particular register element results in the operation of two temporarily associated ticket-issuing machines to issue tickets of the values registered by the register element. In accordance with another feature of the present invention, the control or operating means for certain of the register elements includes provisions whereby each element may, in one continuous operation, add to its registered total an amount equal to the total value represented by the operation of one or more of its associated control devices and a value transferred thereto from a register element of lower order.

Figure 1:
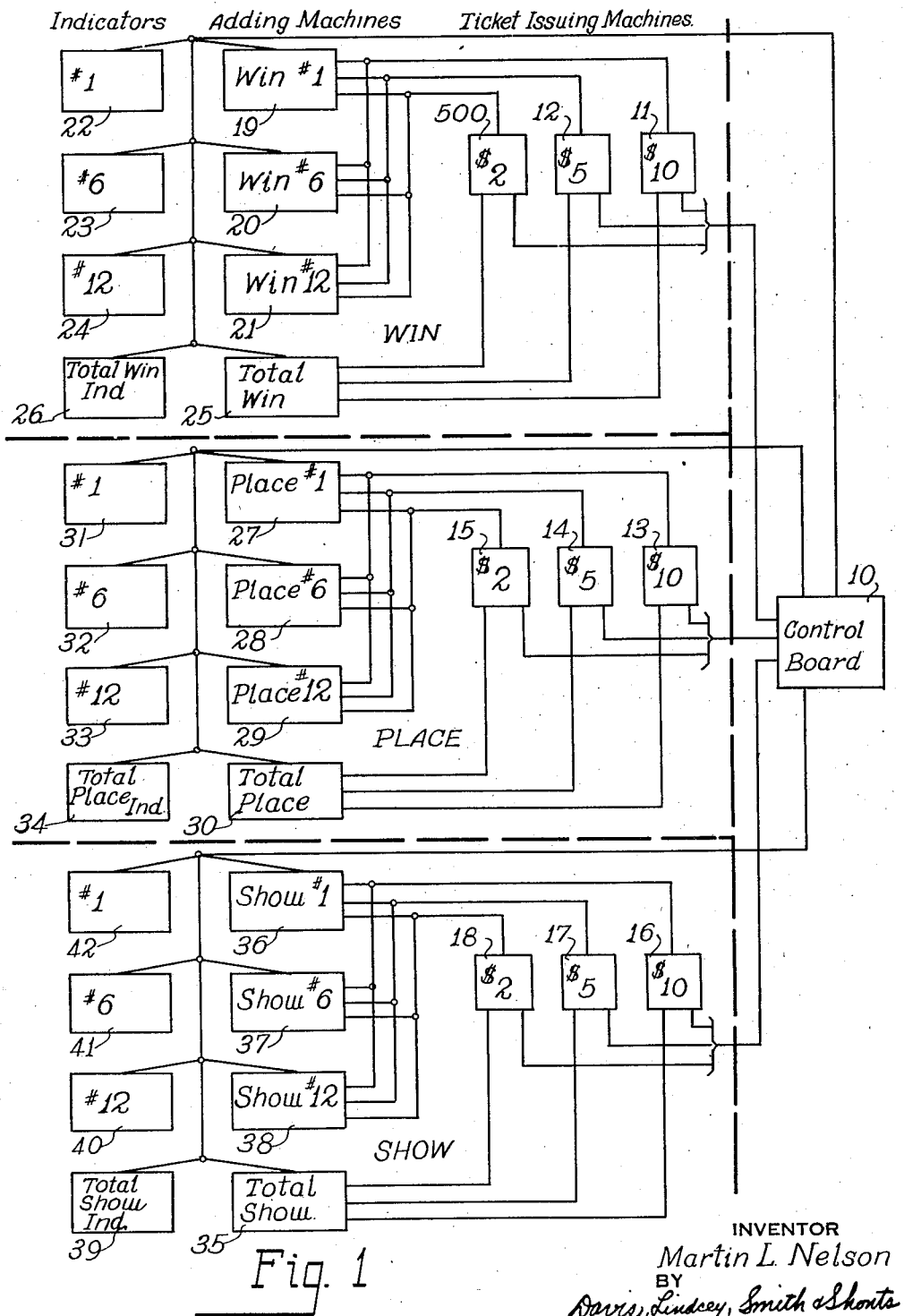

The novel features believed to be characteristic of the invention are set forth with particularity in the appended claims. The invention, both as to its organization and method of operation, together with further objects and advantages thereof will best be understood by reference to the specification taken in connection with the accompanying drawings in which Figure 1 illustrates in skeleton form a totalizing system of the character to which the features of the present invention are applicable; Figs. 2, 3, 4, 5, 6A, 6B, 7, 8 and 9 illustrate in partially schematic form the mechanical arrangement and circuit details of a portion of a system of the general arrangement shown in Fig. 1 and having the features of the present invention incorporated therein; Figs. 10 to 13, inclusive, when laid side by side in the order named, illustrate the general mechanical arrangement of a portion of one of the adding machines embodied in the system; Figs. 14, 15, 16, 17 and 18 illustrate further details of the apparatus shown in Figs. 10 to 13, inclusive; Fig. 19 is a graph illustrating the manner of constructing the contact spring operating cams of the register elements individually provided in the registers shown in Figs. 10 to 13, inclusive, for the purpose of obtaining predetermined closed contact combinations designating different numerical digits; and Fig. 20 illustrates the mode of combining Figs. 2, 3, 4, 5, 6, 6A, 6B, 7, 8 and 9 for the purpose of obtaining a unified system.

Referring now more particularly to Fig. 1 of the drawings, there is illustrated in skeleton form a totalizing system of the character presently in use at race tracks and other public gathering places and to which the features of the present invention are applicable. Briefly described, the system comprises a central control board 10 which, during operation of the system, is attended by a steward who supervises all operations incident to the sale of tickets of various classes and denominations for the different entries, the totalizing of the ticket sales, and the display of the totals on the indicator frames. The system is arranged for the sale of tickets of different values for twelve different entries, three classes of tickets, namely, "win," "place" and "show" tickets being issued with respect to each entry. For the purpose of selling tickets of the "win" class for any one of the twelve entries, a plurality of machines for issuing tickets of different denominations and including the ten dollar machine 11, the five dollar machine 12 and the two dollar machine 500 are provided, these machines being individual to the "win" class but common to the twelve entries. Additional machines, also individual to the "win" class but common to the twelve entires are provided of fifty and one hundred dollar denominations. Similarly, machines of two, five, ten, fifty and one hundred dollar denominations and including the three machines 13, 14 and 15 are provided for issuing tickets of the "place" class for any of the twelve entries. Additional ticket-issuing machines individual to the "show" class but common to all entries, and including the three illustrated machines 16, 17 and 18, are provided. Since the ticket-issuing machines of each class are each capable of issuing tickets for any one of the twelve entries, each thereof is connected to twelve adding machines individually corresponding to the twelve entries. In the system illustrated, only three of the adding machines of the "win" class, namely, the machines 19, 20 and 21 individual to the No. 1, No. 6 and No. 12 entries, are shown. These three adding machines of the "win" group are arranged respectively to control the settings of three associated indicator units 22, 23 and 24 which are also individual to the No. 1, No. 6 and No. 12 entries of the "win" class. The ticket-issuing machines of the "win" class are also arranged to control a "total win" adding machine 25 which is provided for the purpose of controlling the setting of a "total win" indicator unit 26. In a similar manner the machines for issuing tickets of the "place" class are arranged to control twelve individual entry adding machines, three of which are indicated at 27, 28 and 29 as being individual to the events Nos. 1, 6 and 12, and a "total place" adding machine 30. These adding machines have individually associated therewith indicator units, four of which are indicated at 31, 32, 33 and 34 as being individually associated with the adding machines 27, 28, 29 and 30, in the order named. Similarly, the machines for issuing tickets of the "show" class are arranged to control twelve adding machines individual to the twelve different events and a "total show" adding machine 35 which is operative to total the aggregate value of issued tickets of the "show" class. Three of the individual entry adding machines for the "show" class are indicated at 36, 37 and 38 as being individual to entries Nos. 1, 6 and 12 respectively. The four adding machines 35, 36, 37 and 38 also have associated therewith individual indicator units 39, 42, 41 and 40 in the order named. From the foregoing explanation it will be apparent that in a complete system, thirty-nine adding machines and associated indicator units are provided, thirty-six of these machines and their associated indicator units being utilized for totalizing and indicating the total "win," "place" and "show" tickets issued for each of the twelve different entries. The three remaining machines and associated indicator units are used for the purpose of totalizing and indicating the totals of "win," "place" and "show" tickets sold without regard to the entries for which the tickets are sold.

Neglecting for the present the particular circuit arrangement of the apparatus embodied in the system illustrated in Fig. 1 and considering the operation of the system generally, the steward attending the control board 10 first initiates certain control operations which result in the wipeout of all displays existing on the indicator units 22, 23, 24, 26, 31, 32, etc., individual to the various adding machines. Thereafter the various adding machines are conditioned for operation and the ticket-issuing machines are placed in condition for operation to issue tickets of the denominations which they individually represent. In initiating operation of the apparatus the steward also starts the operation of cyclically operating apparatus which functions intermittently to wipe out the existing displays of the indicator units and to associate these units with the adding machine for the purpose of posting new displays thereon which correspond to the totals registered in the respective associated adding machines. Thus, the totals displayed by the display units are periodically changed at frequent intervals in order to apprise the public of the ticket sales of different classes which have been made with respect to the various entries and also the total value of the tickets of each class issued for all entries.

Following the operations just described if a ticket salesman having at his disposal the ticket-issuing machine 500, for example, depresses the key of this machine individual to the entry No. 1 a two dollar ticket sale is marked in the adding machine 19. This adding machine responds to the marking of the two dollar ticket sale by increasing its registered total by the units digit two. During the registration of this sale in the adding machine 19, a current pulse is transmitted back to the ticket-issuing machine 500 which effects operation of this machine to issue the ticket. Prior to restoration of the ticket-issuing machine 500 to normal, a two dollar ticket sale is also marked in the "total win" adding machine 25 which responds by increasing its registered total by the units digit two and by transmitting a releasing pulse back to the ticket-issuing machine 500. When release pulses have been transmitted from both of the adding machines 19 and 25 to the ticket-issuing machine 500, this machine is fully restored to normal and conditioned for further operation. In a similar manner, ticket sales indexed through operation of appropriate keys in the ticket-issuing machine 500 may be registered in any one of the other eleven adding machines of the "win" group. Further, either of the two ticket-issuing machines 11 and 12 may be operated to post ticket sales in any one of the twelve associated adding machines of the "win" group. In any instance wherein one of the ticket-issuing machines of the "win" class is operated to post a ticket sale, a marking corresponding to the value of the ticket sale is made in the "total win" adding machine 25 so that a corresponding change is effected in the registered total of this adding machine. In a manner similar to that just described, the ticket-issuing machines of the "place" and "show" groups may be operated and in each instance a corresponding change is effected in the total registered by the adding machine corresponding to the class and entry with respect to which the ticket is to be issued and also in the setting of the associated class total adding machine 30 or 35.

As indicated in the introductory portion of the specification one feature of the present invention relates to the provision of circuit apparatus which is so arranged that two or more tickets to be issued with respect to the same entry and the same class may simultaneously be posted in the adding machine which corresponds to the particular entry and class. Thus, for example, apparatus is provided which is so arranged that ticket sales concurrently indexed in the machines 500, 12 and 11 with respect to entry No. 1 may simultaneously be posted in the adding machine 19, which machine effects the posting in one continuous operation and thus increases its total by seventeen dollars. Further, during such operation of the adding machine 19, release pulses are concurrently issued to the three ticket-issuing machines 500, 12 and 11, whereby these machines are concurrently operated to issue tickets corresponding to the sales which have been indexed therein. In a similar manner each of the other adding machines embodied in the system is capable of operating concurrently to register the aggregate value of as many as six different tickets, the sale of which has been indexed in six different ticket-issuing machines. Provisions are also made in the apparatus whereby the sale of tickets at the various ticket-issuing machines is not interrupted during the period when the cyclically operating control apparatus provided at the control board 10 is operating to effect a change in the totals displayed by the various indicator units. More specifically, the arrangement of the apparatus is such that ticket sales may continue during the periods when totals set up in the adding machines are being transferred to the indicating apparatus, the aggregate values of these sales being temporarily stored in the various adding machines for the duration of the transfer periods. At the end of each such period the stored values are transferred to the adding machine register apparatus. By virtue of the arrangement of the apparatus to accomplish the above ends, the speed of operation of the system is considerably enhanced, thus enabling a maximum number of tickets to be sold, totaled, and issued in a predetermined time interval.

Referring now more particularly to the circuit arrangement of the apparatus schematically illustrated in Fig. 1 and considering first the apparatus provided at the control board 10, this apparatus is illustrated in Figs. 2, 3, and 6A of the drawings. More specifically, the steward attending the control board 10 has at his disposal a plurality of control keys which include a master switch 212 and three class lockout keys 211, 210 and 209. These class lockout keys or switches are provided for the purpose of conditioning the various ticket-issuing machines and adding machines for the issuance and totalizing of "win," "place" and "show" tickets, respectively. The master switch 212 is provided for the purpose of connecting the negative terminal of the common current source 212a to a common negative bus through which energizing current is delivered to the various circuit control devices of the system. The opposite side of the current source 212a, which is preferably in the form of a storage battery, is connected to another common bus conventionally indicated by a ground symbol. It will be understood that the negative bus indicated by the negative sign is connected to each of the other terminals utilized in the drawings which bear a corresponding symbol and that the positive bus indicated by the ground symbol is also connected to every other terminal illustrated in the drawings having the same symbol. In the interests of simplifying the drawings and the explanation pertaining thereto, the exact wiring of the positive and negative buses has been omitted. In order to relieve the current source 212a from excessive loads occasioned by short-circuits and the like, there is provided in the connection extending from the negative terminal thereof a fuse link 213 of the fusible metal type which, when subjected to overloads, melts and provides a circuit for energizing the fuse alarm signal lamp 214 in series with one winding of an alarm relay R275. The signal provided by energization of the signal lamp 214 is supplemented through the provision of an audible signal device 278 in the form of a bell which is arranged to be controlled in an obvious manner by the alarm relay R275.

The steward attending the control board 10 also has at his disposal additional keys which comprise a start key 205, a ticket-issuing machine release key 202, a reset key 200, and an auxiliary control key 201 which is provided for the purpose of enabling the steward to at any time effect a change in the totals displayed by the various indicator units without waiting for the apparatus which periodically changes the displayed totals to complete a cycle of operation. Two additional keys 203 and 204 are also provided, the first of which is utilized to lock the various ticket-issuing machines against operation at the end of a ticket selling period and the second of which is utilized to control the signal device 229 and to initiate operation of the apparatus to effect a final display of the totals of the tickets sold in the various classes and for the various entries at the end of a ticket selling period. Provisions are made in the apparatus for locking out the various ticket-issuing machines to prevent operation thereof to issue tickets for any of the twelve entries. To this end, twelve entry lockout keys, two of which are indicated at 207 and 208, are individually provided which respectively correspond to the twelve different entries. More specifically, the two keys 207 and 208 individually correspond to entries Nos. 1 and 12 and when operated lock the ticket-issuing machines to prevent the operation thereof to issue tickets with respect to these entries.

The relay equipment provided at the steward's control board 10 comprises a plurality of control relays R215, R220, R225, R230, R235, R240, R245, R247, R250, R253, R255, R260 and R265 which are arranged to perform various circuit control operations described with particularity hereinafter. All of these relays, with the exception of the relays R245, R247, R250 and R253, are of the fast-to-operate, fast-to-release type and may be of any standard construction. The relays R245, R247, R250 and R253, on the other hand, are of the slow-to-operate dashpot variety of which several well-known commercial embodiments are available. The three relays R250, R253 and R255, in cooperation with the control relays R315, R340, R345, R350, R370, R380, R385, R390 and R395, illustrated in Fig. 3 of the drawings, comprise the above-mentioned cyclically operating apparatus for intermittently or periodically wiping out existing displays posted on the various indicator units and for then effecting the posting of new displays which respectively correspond to the totals registered in the respective associated adding machines. The relays R260 and R265, in cooperation with the slow-to-operate relays R355 and R360 are provided for the purpose of controlling the various collector switch start circuits which are described more fully hereinafter. The relay equipment provided at the control board 10 further comprises a slow-to-operate alarm relay R280 which is common to the various adding machines of a particular class and another slow-to-operate alarm relay R285 which is individual to a particular one of the adding machines, namely, that illustrated in the drawings. Additional slow-to-operate alarm relays individual to the other adding machines and corresponding to the relay R285 are provided.

These alarm relays are arranged selectively to control slow-to-operate lockout relays, three of which, R270, R271 and R272, are illustrated in the drawings. These lockout relays have individually associated therewith signal lamps 292, 291 and 290 in the order named which function selectively to indicate the faulty condition of the adding machines to which they respectively correspond. Additional supervisory apparatus comprising the four lamps 289, 293, 294 and 295 is provided for enabling the steward to at all times maintain a close check on the condition of the system.

In addition to the apparatus already described, there is provided at the control board 10 an adding machine release control circuit 650 which is common to the various adding machines and is illustrated in Fig. 6A of the drawings as comprising a release pulse generating device 660, a restoring pulse counting switch 663, a register sequence switch 662 and five control relays R675, R683, R665, R680 and R640. The two relays R665 and R675 are of the well-known two-step type and the relay R683 is of the slow-to-release type as indicated by the slugged heel piece forming a part thereof. Although the pulse generator 660 may be of any conventional construction, this device is preferably of the motor driven commutator type, being provided with a driving motor, not shown, of the synchronous variety which is arranged to be energized in response to operation of the master switch 212. The two switches 662 and 663 are of the well-known rotary type and may, for example, be of the character disclosed in Patent No. 1,693,027, Erickson, granted November 27, 1928. More specifically, the pulse counting switch 662 comprises three sets of bank contacts of eleven points each, three double ended wipers 685, 686 and 686' individually associated with the three contact sets and an operating magnet 687 which, in cooperation with an associated ratchet and pawl mechanism, not shown, operates in response to pulses transmitted thereto to advance the enumerated wipers step by step over their respective associated contacts. A set of off-normal springs 688 is also embodied in the switch 662 for certain control purposes referred to with particularity hereinafter. The switch 663 is similar in construction to the switch 662, but includes only one set of contacts of eleven points having a single double ended wiper 671 which is arranged for step-by-step operation under the control of a motor magnet 672.

The various indicator units 22, 23, 24, etc., illustrated in Fig. 1 of the drawings, individually comprise a plurality of digit display frames each having associated therewith a digit control unit. Thus, the indicator unit 22 is schematically illustrated in Fig. 3 of the drawings as comprising units, tens, hundreds, thousands, ten thousands, and hundred thousands display frames 305, 304, 303, 302, 301 and 300, respectively, which have associated therewith relay control units 311, 310, 309, 308, 307 and 306, in the order named. Each of the display frames, with the exception of the hundred thousands display frame 300, comprises digit lamps for indicating the digits one to nine and zero, respectively. The hundred thousands display frame 300 comprises display lamps for displaying the digit one. The relay control units 307 to 311, inclusive, are identical in arrangement with the relay translating unit illustrated in Fig. 9 of the above-cited Robinson Patent No. 2,121,164. Briefly described, each of these units comprises five coding relays which are arranged for energization over the leads A to E, inclusive, in combinations of two, these relays when energized in different pairs designating different digits of from one to nine and zero. The control unit 306 which is individually associated with the hundred thousands display frame 300 comprises a single relay which, when energized over the lead F, shown in Fig. 9 of the drawings, functions to complete the operating circuit for the digit lamps of the hundred thousands display frame 300.

The various ticket-issuing machines of the system are identical in construction and may be of the character of the two dollar ticket-issuing machine 500, the details of which are schematically illustrated in Fig. 5 of the drawings. Briefly described, this machine comprises a locking bar 501, an off-normal bar 502, twelve ticket indexing keys K—1 to K—12, inclusive, which are individual to the twelve different entries and suitable control apparatus arranged to respond to operation of the various enumerated keys. More specifically, each of the enumerated keys terminates in a tapered camming element which cooperates with cam follower projections carried by the off-normal and locking bars to move these bars off-normal and to restrain the bars in an off-normal position when the key is depressed. Thus, the key K—1, for example, includes a camming element 513 which, in cooperation with the cam follower projection 502' carried by the bar 501 and the projection 507 carried by the off-normal bar 502, cooperates to move these bars off-normal and to lock the bars in the off-normal positions when the indicated key is depressed. Each of the enumerated entry keys is also arranged to control a set of circuit control springs which are individually included in different marking circuits respectively extending to adding machines of the corresponding class and the corresponding entries. The two bars 501 and 502 are normally restrained in their respective normal positions under the influence of a pair of biasing springs 518 and 519. For the purpose of locking these two bars against operation there is provided a locking magnet 547 which is arranged to be controlled from the control board 10 over a circuit including an impedance element 549. In order automatically to restore the two bars 501 and 502 to normal following the depression of one of the keys embodied therein, there is provided a reset magnet 520 which includes an armature 521 pivotally mounted at 522 and including an operating finger projecting within a slot 523 provided in the locking bar 501. The operating mechanism of the ticket-issuing machine 500 also includes a pair of camming elements 532a and 532b which are mounted for rotation with a common drive shaft 533 and are arranged respectively to control two cam follower arms 526 and 537 which are mounted for pivotal movement about the shafts 528 and 538, respectively. In order to operate the camming elements 532a and 532b, there is provided a driving motor 543 which, when energized, is arranged to drive the shaft 533 through a suitable speed reducing gear mechanism, not shown. The energization of this motor is under the control of a master switch 544 and an auxiliary knife switch which includes a pair of contacts 540 and a blade 537a carried by the cam follower arm 537. The cam follower arm 526 is arranged to be pivoted about its shaft 528 to an off-normal position in response to operation of the locking bar 501 through the provision of a resilient element 528a which is caried by the locking bar 501 and is provided with a free end arranged to cooperate with the operating finger 526a of the arm 526. This arm is also arranged to be restrained in its normal position against the bias exerted thereon by the resilient element 528a through the provision of an auxiliary control magnet 541 which includes an armature, not shown, but arranged to cooperate with the portion 526b of the arm 526 to restrain this arm in the position illustrated in the drawings when the indicated magnet is energized. The control apparatus of the ticket-issuing machine 500 includes three relays R560, R570 and R580, a set of off-normal springs 546 which are arranged to be controlled by the off-normal bar 502, and additional circuit control springs 542, the setting of which is determined by the position occupied by the cam follower arm 526.

The adding machine 19 individual to entry No. 1 and provided for the purpose of totalizing ticket sales of the "win" class is illustrated in Figs. 4, 6B, 7, 8 and 9 as comprising a collector switch, shown in Fig. 4, and a plurality of register elements or orders which are shown in Figs. 6B, 7, 8 and 9, respectively. More specifically, the collector switch illustrated in Fig. 4 of the drawings comprises a plurality of sequentially operating relays R400, R405, R410, R415, R420, R425, R430, R435, R440, R445, R450, R455 and R460. In all, this switch comprises twenty-six relays, a portion thereof having been omitted from the drawings in the interests of simplifying the disclosure. It will be understood, however, that the circuit connections associated with the relays which are not shown, are identical with the connections extending between and controlled by the relays enumerated above. The first twenty-five of these relays are provided for the purpose of sequentially connecting the associated marking leads, such, for example, as the leads C468, C469, C470, C471, C472 and C473, which individually extend to different ones of the ticket-issuing machines of the "win" class and are all common to the No. 1 entry, with the take-off leads C32 to C37, inclusive. The twenty-sixth relay R460 is a stop relay, being provided for the purpose of arresting operation of the collector switch in response to certain control operations performed at the control board when the progressing cycle of operation of the twenty-five preceding relays is ended.

The adding machine mechanism is schematically illustrated in Figs. 6B, 7, 8 and 9 of the drawings as comprising a units order 600 for receiving two and five dollar values, a tens order 700 for receiving ten and fifty dollar values, a hundreds order 800, a thousands order 900, a ten thousands order 950 and a one hundred thousand dollar register relay R910. The orders 600, 700, 800 and 900 respectively comprise the operating mechanisms illustrated in Figs. 10, 11, 12 and 13 of the drawings, and the first three thereof have associated therewith one or more control relays for performing circuit control operations described with particularity hereinafter. Thus, the units order 600 has associated therewith three control relays R610, R620 and R630. Similarly, the tens order 700 has associated therewith two additional control relays R710 and R720. The hundreds order 800 has associated therewith a single control relay R810. In general, these relays are provided for the purpose of deenergizing the indexing magnets of the respective associated orders and of sending current pulses back to the ticket-issuing machines for the purpose of restoring these machines to normal and of causing the machines to issue tickets. Since in the system illustrated, provisions are not made for selling tickets of denominations larger than one hundred dollars, it is unnecessary to provide any control relay equipment in association with the orders 900 and 950. In this regard it is pointed out that the two last-mentioned orders are of identical construction and arrangement and, accordingly, the order 950 has been only schematically illustrated in the drawings. The control apparatus for the adding machine also comprises a start relay R698 which is operative under the control of the master switch 212 to control the circuit for energizing the motor which is provided to drive the adding machine.

The mechanical construction and arrangement of the orders 600, 700, 800, 900 and 950 are best illustrated in Figs. 10 to 19, inclusive, of the drawings. Due to the similarity between these orders and for convenience in identifying and relating the various parts thereof, reference characters having the same tens and units digits but different hundreds digits which respectively correspond to the figure numbers have been used in Figs. 10 to 13, inclusive, of the drawings to identify corresponding parts.

Figure 14:
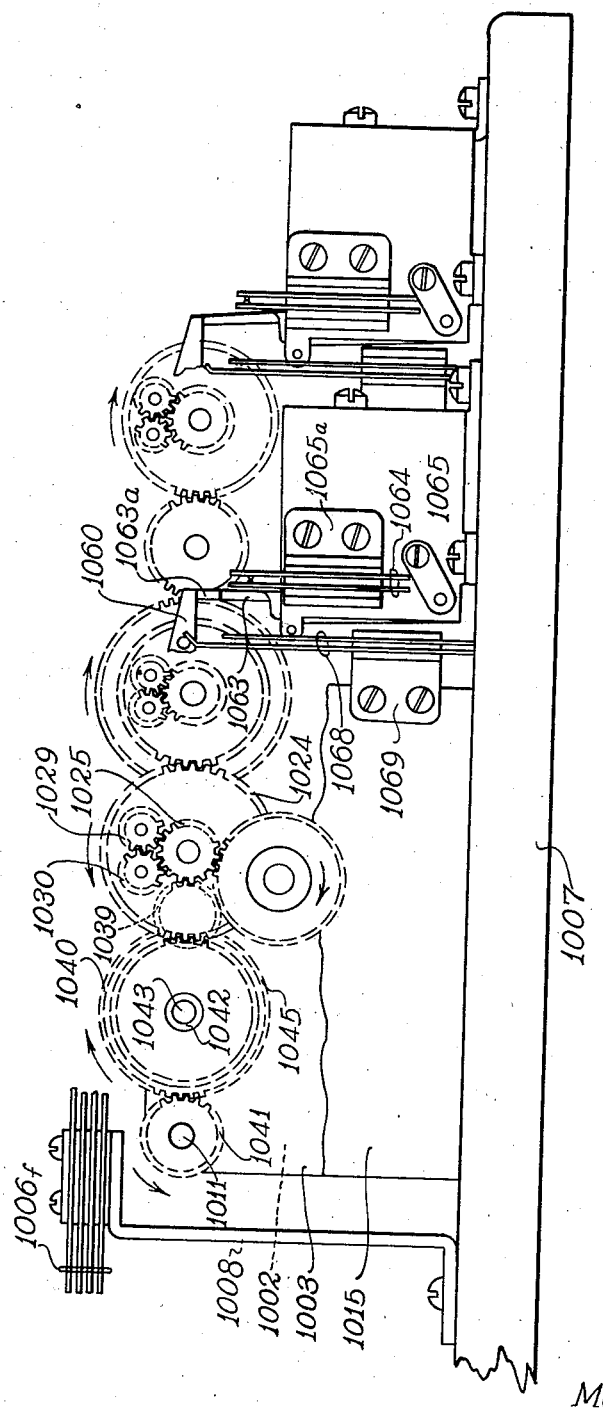

Briefly described, the units order 600, which is provided for the purpose of totaling two dollar and five dollar ticket sales, comprises a register element in the form of a drum 1000 carried by a spindle 1001 having its opposite ends journaled in bearing surfaces provided in upstanding brackets 1002 and 1003. As shown in Fig. 14 of the drawings, the two brackets 1002 and 1003 are mounted upon a base plate 1007 by means of bolts, screws, or the like. The drum 1000 comprises six camming disks 1004a, 1004b, 1004c, 1004d, 1004e and 1004f which are formed of any suitable insulating material and are spaced apart along the spindle 1001 by means of spacing sleeves 1005. The camming disks 1004 and the spacing washers 1005 are rigidly secured to the spindle 1001 for rotation therewith in any desired well-known manner. The enumerated camming disks are arranged to control the settings of six sets of contact springs 1006a, 1006b, 1006c, 1006d, 1006e and 1006f, the first five of which individually comprise two normally disengaged springs which are spaced apart and insulated from each other. As best shown in Figs. 6B and 14 of the drawings, the spring pile 1006f comprises four contact springs which, like the other enumerated contact springs, are insulated from each other and are mounted upon the upper end of a bracket piece 1008 carried by the base plate 1007. Each of the five camming disks 1004a, 1004b, 1004c, 1004d and 1004e is provided with notches around its periphery for controlling the setting of the associated set of contact springs. These notches are arranged in the manner more fully described subsequently so that the five associated sets of contact springs may have any one of ten different settings, depending upon the angular position of the drum 1000. One of these settings represents the normal or zero digit position of the drum 1000, while the remaining nine settings respectively correspond to the digits 1 to 9, inclusive.

For the purpose of driving the drum 1000 of the units order 600 and the corresponding drums of each of the other four orders, there is provided a driving motor 1010, preferably of the synchronous type, which is arranged to drive an operating shaft 1011 individual to the units order 600 through meshing speed reducing gears 1012 and 1013. The first of these gears is mounted upon the motor drive shaft and the second thereof is mounted upon the shaft 1011. The various shafts 1011, 1111, 1211, 1311 and the shaft not shown but individual to the ten thousands order 950, are connected together by means of flexible coupling elements 1114, 1214, 1314 and 1414 to form, in effect, a single shaft which is commonly driven by the motor 1010. The shaft 1011 is supported by the upstanding bracket 1003 and a third bracket 1015 which is also mounted upon the base plate 1007. More specifically, the shaft 1011 is journaled in bearing members 1016 and 1017 extending through the brackets 1015 and 1003 respectively, and is restrained against longitudinal movement by means of collars 1018 and 1019 which are secured to the shaft by set screws, in the manner illustrated. The shaft 1011 is arranged to transmit rotary movement to the drum spindle 1001 through a driving mechanism which comprises a friction clutch 1020 and a differential mechanism 1021. Normally, the drum spindle 1001 is locked against operation through this driving connection by means of a latching gear train which comprises electromagnetically controlled escapement mechanisms and two additional differential mechanisms 1022 and 1023.

Figure 10:
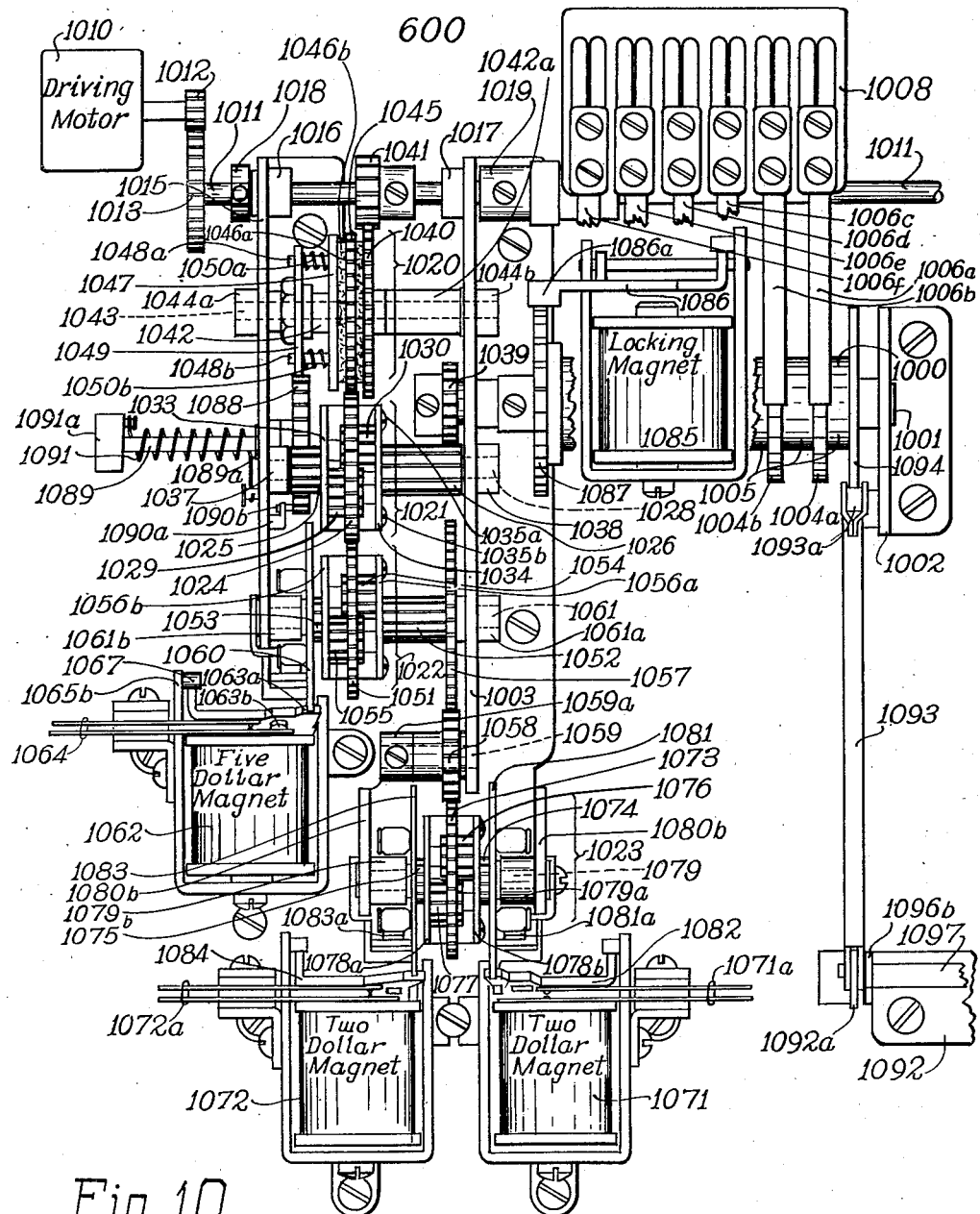
Figure 15:
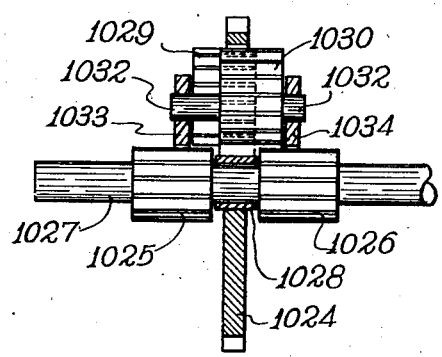
Figure 16:
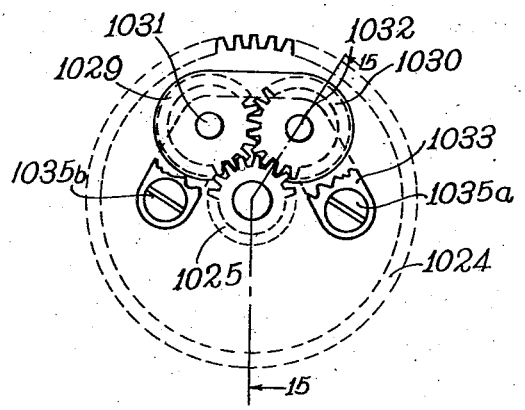

The differential mechanism 1021 is best illustrated in Figs. 10, 15 and 16 as comprising a driving gear 1024 and a pair of sun gears 1025 and 1026 which respectively mesh with two planetary gears 1029 and 1030. More specifically, the driving gear 1024 is mounted for rotation with a shaft 1027 by means of a mounting sleeve 1028, and is provided with an elongated slot extending through the side thereof which receives the meshing planetary gears 1029 and 1030. The sun gears 1025 and 1026 are journaled on the shaft 1027 for free rotation thereabout. The meshing planetary gears 1029 and 1030 are respectively mounted upon shafts 1031 and 1032 which are journaled in bracket pieces 1033 and 1034 extending parallel with the driving gear 1024 on either side thereof and mounted upon this gear by means of cap screws or bolts 1035a and 1035b. The stub shaft 1027 upon which the sun gears 1025 and 1026 are journaled is, in turn, journaled in bearing members 1037 and 1038 which are respectively mounted upon the bracket pieces 1015 and 1003. The sun gear 1026 of the differential mechanism 1021, in addition to meshing with the planetary gear 1030, meshes with a register pinion 1039 which is mounted upon the left end of the drum spindle 1001, whereby rotary movement is imparted to the drum when one of the escapement mechanisms is released to permit rotation of the driving gear 1024.

As indicated above, rotary movement is imparted to the driving gear 1024 through the clutch mechanism 1020, which mechanism comprises a gear 1040 meshing with a pinion 1041 mounted for rotation with the drive shaft 1011. The gear 1040 is rigidly mounted upon a sleeve 1042 which is journaled on a shaft 1043. The shaft 1043 is, in turn, journaled in bearing members 1044a and 1044b respectively carried by the supporting brackets 1015 and 1003. The clutch mechanism further comprises a driving gear 1045 which is journaled on the sleeve 1042 for rotation thereabout. Clutch plates 1046a and 1046b are provided on opposite sides of the driving gear 1045, the first of which engages an adjacent friction face formed on the side of the gear 1040. The other clutch plate 1046b is provided with a surface which engages an adjacent friction surface of an additional clutch element 1047. This additional element carries three guide rods, two of which are indicated at 1048a and 1048b which extend through openings provided in a guide plate 1049. The guide plate 1049 is rigidly mounted upon the sleeve 1042 by means comprising the nut and collar assembly illustrated. For the purpose of biasing the clutch element 1047 to the right, thereby to compress the plates 1046a and 1046b between this element and the gears 1040 and 1045, coil springs, two of which are indicated at 1050a and 1050b, are provided. Each of these three springs is telescoped over one of the guide rods 1048 and is compressed between the guide plate 1049 and the clutching element 1047. In order to prevent longitudinal movement of the clutch assembly 1020 along the shaft 1043, there is provided a sleeve 1042a which is interposed between the bracket bearing 1044b and is rigidly secured to the shaft 1043. Preferably, the clutch plates 1046a and 1046b are formed of a suitable composition material having heat resisting properties and a substantial coefficient of friction. From the above explanation it will be apparent that the assembly comprising the gear 1040, the clutch element 1047, the guide plate 1049 and the sleeve 1042 are constructed to rotate as a unit about the shaft 1043, the driving gear 1045 normally being restrained against rotation with these elements through the action of the escapement mechanisms and their associated differential mechanisms 1022 and 1023.

The two differential mechanisms 1022 and 1023 are identical in construction and arrangement with the differential mechanism just described. Thus, the mechanism 1022 comprises a driving gear 1051, a pair of sun gears 1052 and 1053 and a pair of orbital gears 1054 and 1055 which mesh with each other and with the sun gears 1052 and 1053, respectively. The orbital gears 1054 and 1055 extend through a slotted opening provided in the driving gear 1051 and are respectively carried by shafts which are journaled in bracket members 1056a and 1056b secured to the driving gear 1051 in the manner illustrated in Figs. 15 and 16. The sun gears 1052 and 1053 are journaled for rotation about and the driving gear 1051 is mounted for rotation with a shaft 1061 which is, in turn, journaled in bearing members 1061a and 1061b respectively carried by the brackets 1003 and 1015. The sun gear 1052 carries at its right end an enlarged intermediate gear 1057 which, in turn, meshes with an idler gear 1058. The gear 1058 is journaled on a stub shaft 1059 carried by the bracket piece 1003. This gear and the bearing element upon which it is supported, are restrained against lateral movement by the bracket 1003 and a collar 1059a which is secured to the left end of the stub shaft 1059 by a set screw.

For the purpose of normally restraining the sun gear 1053 against rotation, an escapement member 1060 is mounted thereon for rotation therewith. The escapement member 1060 is provided with two oppositely extending arms and is arranged to be released for rotation with the sun gear 1053 under the control of an operating magnet 1062. As best shown in Figs. 14 and 17 of the drawings, the magnet 1062 is provided with an operating armature 1063 having an upstanding latching finger 1063a formed integral therewith. This armature is normally biased to the released position wherein the finger 1063a lies in the path of rotation of the arms of the escapement member 1060. The armature 1063 is also arranged to control a pair of circuit interrupting contact springs 1064, one of which is provided with a free end engaging an insulating button 1063b carried by the armature 1063 and is normally slightly stressed to bias the armature 1063 to its released position. The core and winding of the magnet 1062 are disposed within and mounted upon a substantially U-shaped field member 1065 which is secured to the base plate 1007 in any desired manner. The spring pile comprising the two normally engaged contact springs 1064 is mounted upon an L-shaped bracket 1065a which is, in turn, mounted upon the field member 1065 by means of cap screws. The armature 1063 is mounted for rotation about a shaft 1066 having its ends journaled in the legs of the U-shaped field member 1065. Pivotal movement of the armature 1063 about the shaft 1066 is limited through the provision of a stop 1067 carried by a projecting portion 1065b of the field member 1065 and arranged to engage the side flange 1063c of the armature 1063.

For circuit control operations, fully described hereinafter, a pair of additional contact springs 1068 are provided which are mounted upon a bracket piece 1069 supported by the bracket 1015 in the manner illustrated. These contact springs are normally disengaged, are insulated from each other, and are arranged to be operated into engagement in response to each operation of the escapement member 1060 through an arc of 180 degrees. To this end, rollers 1070a and 1070b are mounted upon opposite arms of the escapement member 1060 and are so arranged that one thereof engages the bent-over free end of the contact spring 1068a each time the armature 1063 is operated to release the member 1060.

As indicated above, the differential mechanism 1023 is identical in construction and arrangement with the two other differential mechanisms 1021 and 1022 and is arranged to be controlled by two additional electromagnets 1071 and 1072, each of which is identical in construction with the electromagnet 1062 described above. More specifically, the differential mechanism 1023 comprises a driving gear 1073 which meshes with the gear 1058, a pair of sun gears 1074 and 1075 and a pair of planetary or orbital gears 1076 and 1077. The two orbital gears 1076 and 1077 extend through a slotted opening provided in the driving gear 1073 and are carried by shafts journaled in a pair of bracket members 1078a and 1078b which are mounted upon opposite sides of the driving gear 1073. The two orbital gears 1076 and 1077, in addition to meshing with each other, respectively mesh with the sun gears 1074 and 1075. The driving gear 1073 is mounted for rotation with a shaft 1079 which is journaled at its opposite ends in bearing members 1079a and 1079b respectively supported by two additional bracket pieces 1080a and 1080b which are mounted upon the base plate 1007. The two sun gears are journaled for rotation about the shaft 1079 and each thereof carries an escapement member which is arranged to cooperate with the armature of the associated electromagnet so that when released rotary movement may be imparted to the drum 1000. Thus, the sun gear 1074 carries an escapement member 1081 having oppositely extending arms, either of which is adapted to engage a latching finger extending upwardly from the armature 1082 of the electromagnet 1071. The escapement member 1081, like the corresponding escapement member 1060, carries upon its opposite arms a pair of rollers formed of insulating material which are arranged to control a pair of contact springs 1081a. The sun gear 1075 similarly carries an escapement member 1083 having oppositely extending arms which are arranged to engage a latching finger extending upwardly from the armature 1084 of the electromagnet 1072. This escapement member also carries on its opposite arms a pair of rollers formed of insulating material which are arranged to control an additional pair of contact springs 1083a. The two electromagnets 1071 and 1072 are respectively provided with additional sets of circuit controlling contact springs 1071a and 1072a which respectively correspond to the contact springs 1064 associated with the electromagnet 1062.

As indicated in the introductory portion of the specification, one of the features of the present invention relates to the arrangement of the different orders whereby totals may be taken off of the adding machines and posted on the display boards without holding up the operation of any of the equipment to continue the registration of ticket sales during the periods when the totals are being transferred to the display boards. In order to prevent two dollar and five dollar ticket sales from effecting movement of the drum 1000 during the transfer periods, there is provided a locking magnet 1085 which is similar in construction to the three magnets 1062, 1071 and 1072 and is mounted upon the base plate 1007 in any desired manner. This locking magnet is provided with an armature 1086 which carries a locking pawl 1086a arranged to cooperate with the teeth of a ratchet wheel 1087 rigidly mounted upon the drum spindle 1001, thereby to restrain the drum 1000 and the pinion 1039 against rotation in response to the release of one or more of the three escapement members 1060, 1081 and 1083. Thus, the drum 1000 may be locked against rotation during the periods when transfers are being made. In order temporarily to store the two dollar and five dollar ticket sales which occur during such periods, there is provided a storage device which comprises a storage pinion 1088. This pinion is mounted for rotation with a shaft 1089 which is journaled in a bearing member 1089a mounted upon the bracket piece 1015. The storage pinion 1088 is arranged to mesh with the sun gear 1025 of the differential mechanism 1021 and is biased by means of a coil spring 1091 to a normal position which is determined by engaging stop elements 1090a and 1090b respectively carried by the bracket piece 1015 and the gear 1088. The coil spring 1091 surrounds the extended portion of the shaft 1089 and is anchored at one end to the bracket piece 1015 and at the other end to a collar 1091a mounted on the end of the shaft 1089.

Figure 11:
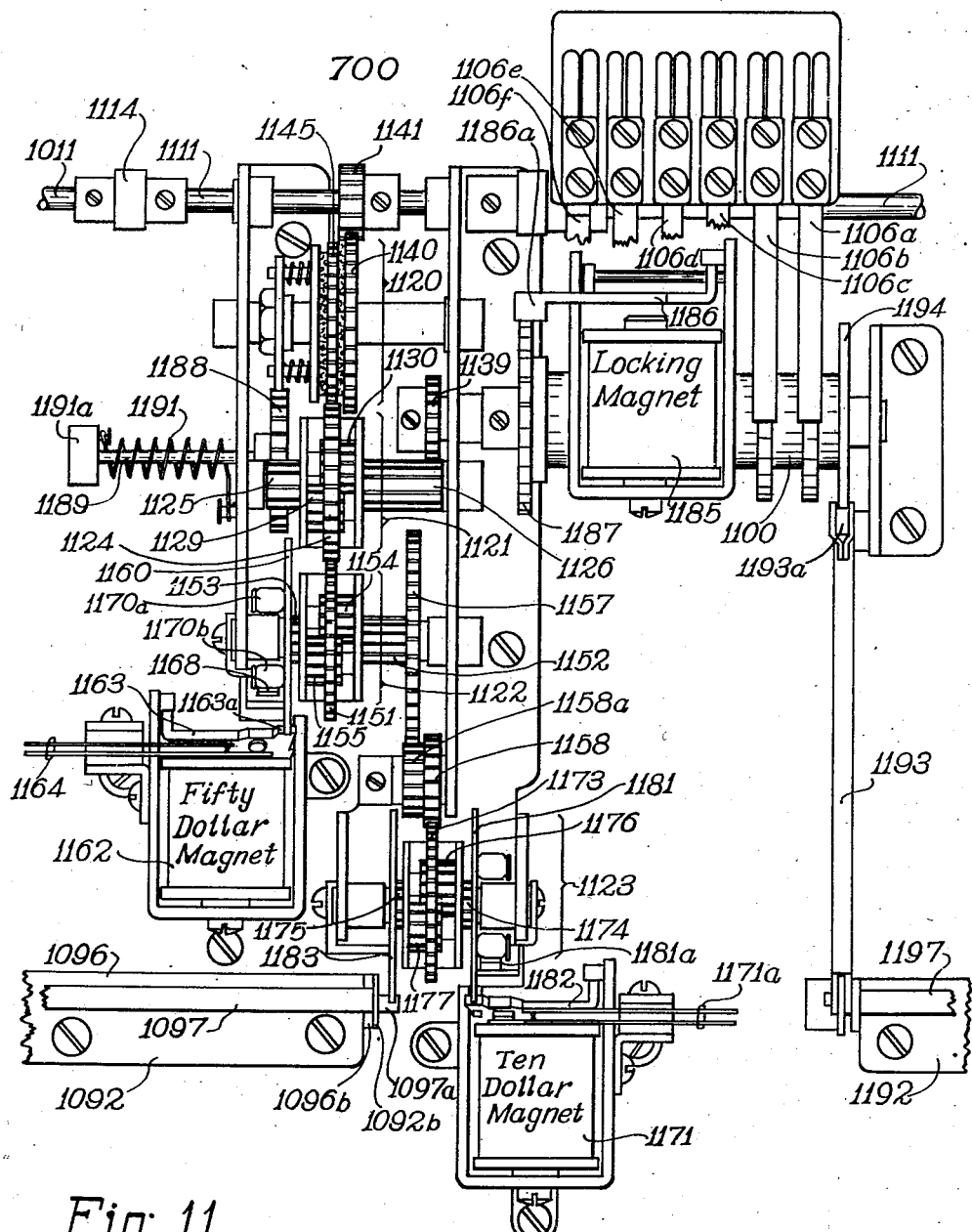
Figure 18:
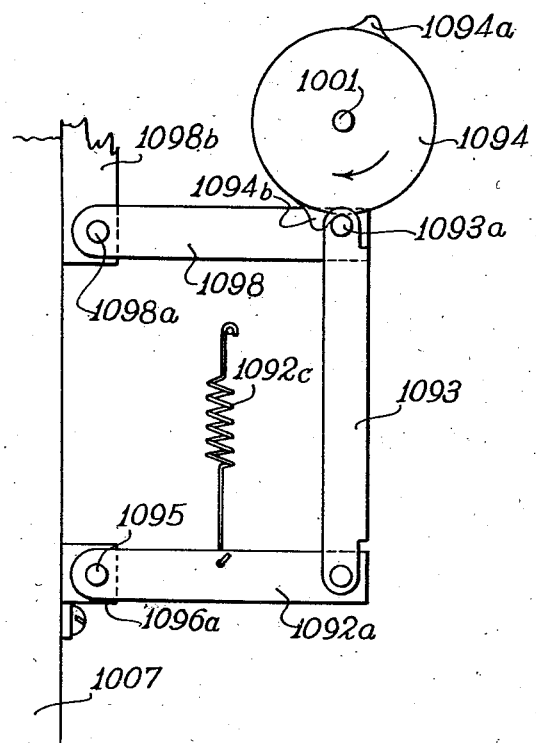

For the purpose of carrying over from the units order 600, illustrated in Fig. 10, to the tens order 700, illustrated in Fig. 11, each total of ticket sales representing ten dollars, a carry-over or tens transfer mechanism is provided which includes an escapement release frame 1092 arranged to cooperate with the arms of the escapement member 1183 embodied in the ten dollar differential mechanism 1123. This frame is rocked between a normal position wherein it locks the escapement member 1183 against rotation and an off-normal position wherein the escapement member 1183 is released for rotation with its associated sun gear 1175 by means of an arm 1093 which is arranged to cooperate with a carry-over cam 1094 mounted for rotation with the drum 1000. As best shown in Figs. 10, 11 and 18, the carry-over frame 1092 comprises a pair of side arms 1092a and 1092b, the lower ends of which are mounted upon a shaft 1095 which is journaled in the upstanding lugs 1096a and 1096b of a bracket member 1096 carried by the base plate 1007. The actuating element of the frame comprises a bar 1097 which extends transversely between the upper ends of the two side arms 1092a and 1092b and is provided with a latching finger 1097a which extends through the arm 1092b and normally lies in the path of rotation of the escapement member 1183. The arm 1093 is formed of channel-shaped stock and is cut away at its lower end so that the arm 1092 may extend within the channel and relative movement between the two arms may occur. The lower end of the arm 1093 is carried by a projecting portion of the rod 1097 and the opposite end thereof is pivotally connected to an upstanding arm 1098. A roller 1093a engaging the peripheral surface of the cam 1094 is mounted for rotation between the side walls of the upper end of the arm 1093. The lowermost end of the rocker arm 1098 is arranged to pivot about a stub shaft 1098a which is mounted upon a supporting member 1098b carried by the base plate 1007 or the bracket 1002. For the purpose of biasing the frame 1092 so that the roller 1093a engages the peripheral surface of the cam 1094, there is provided a biasing spring 1092c which is anchored at one end to the side arm 1092a and at the other end to a convenient portion of the supporting structure, such, for example, as the bracket 1002. In order to rock this frame to a position such that the latching finger 1097a is moved out of the path of rotation of the escapement member 1183, the cam 1094 is provided with two lobes 1094a and 1094b which are disposed at predetermined diametrically opposed points around the circumference of the cam.

In the tens order 700, shown in Fig. 11, the magnet 1171, which in cooperation with the escapement member 1181 control one side of the differential mechanism 1123, is provided for the purpose of releasing the drum 1100 so that this drum may be rotated through an angle corresponding to a ten dollar sale each time the magnet 1171 is momentarily energized. As indicated previously, the other side of the differential mechanism 1123 is controlled by the carry-over mechanism comprising the frame 1092 and the escapement arm 1183 to permit a corresponding movement of the drum 1100 each time the carry-over mechanism is actuated to indicate that total sales equal to ten dollars have been registered by the units order 600 shown in Fig. 10. It will be apparent from the following description that each half revolution of either of the two escapement members 1081 and 1083 corresponds to two units of movement of the drum 1000. In other words, each time one of these arms is released for rotation with the preceding portion of the locking gear train the drum 1000 is rotated an amount sufficient to change the settings of the associated contact springs 1006 from a zero value setting to a two dollar setting, or from a two dollar setting to a four dollar setting or from a four dollar setting to a six dollar setting, etc.

In the tens order 700 shown in Fig. 11, on the other hand, the arrangement is such that each time one of the escapement members 1181 and 1183 is released for one-half of a revolution the drum 1100 is advanced to a new setting which differs by the digit one from the previous setting. This necessitates a gear ratio between the driving gear 1173 of the differential mechanism 1123 and the gear 1157 which is different from the ratio of the corresponding gears 1057 and 1073 of the units order 600. To this end, the gear 1157 is made larger than the corresponding gear 1057 and is arranged to mesh with a small pinion 1058a which is preferably formed integral with the pinion 1058. By a proper selection of the tooth ratio between the gear 1157 and the pinion 1058a, the angular movement imparted to the sun gear 1152 in response to a half revolution of either of the escapement members 1181 and 1183 is made exactly one-half that through which the sun gear 1052 moves in response to a half revolution of either of the two escapement members 1081 and 1083. Aside from this difference, the tens order 700 shown in Fig. 11 is identical in construction with the units order 600 shown in Fig. 10, it being noted that each operation of the magnet 1162 designates a value of fifty dollars.

Figure 12:
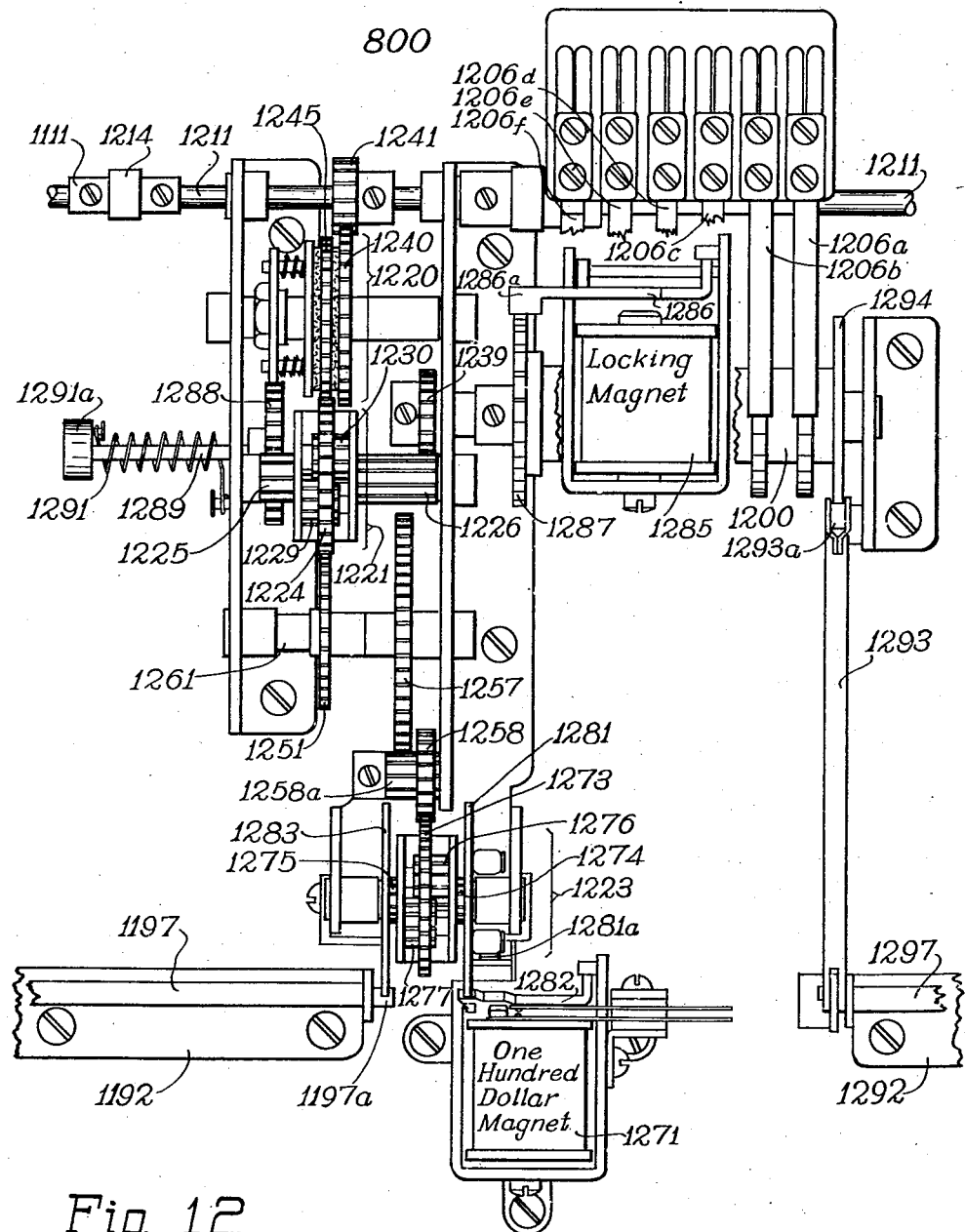

The hundreds order 800 shown in Fig. 12, which is provided for the purpose of receiving ticket sale values one hundred dollars, is arranged to absorb the one hundred dollar carry-overs from the tens order 700. To this end, a carry-over or tens transfer mechanism is provided between these two orders which is identical in arrangement with the carry-over mechanism described above and interconnecting the units order 600 with the tens order 700. Since the hundreds order 800 in all cases effects sales registrations of the same denominations, the differential mechanism for effecting the registration of sales of different denominations is not required. More specifically, a differential mechanism which corresponds to the mechanisms 1122 and 1022 of the tens and units orders 700 and 600, respectively, in order to permit the entry of fifty dollar and five dollar sales respectively, is not required. Accordingly, the driving gear 1273 of the differential mechanism 1223 is geared directly to the driving gear 1224 of the differential mechanism 1221 through a gear train comprising the pinions 1258 and 1258a and a pair of intermediate gears 1257 and 1251, the two intermediate gears 1251 and 1257 both being mounted for rotation with the shaft 1261. The ratio of the gear train comprising the two pinions 1258 and 1258a and the two intermediate gears 1257 and 1251 is such that the drum 1200 is advanced through an angle corresponding to a sales value of one hundred dollars in response to each half revolution of either of the two escapement members 1281 and 1283.

Figure 13:
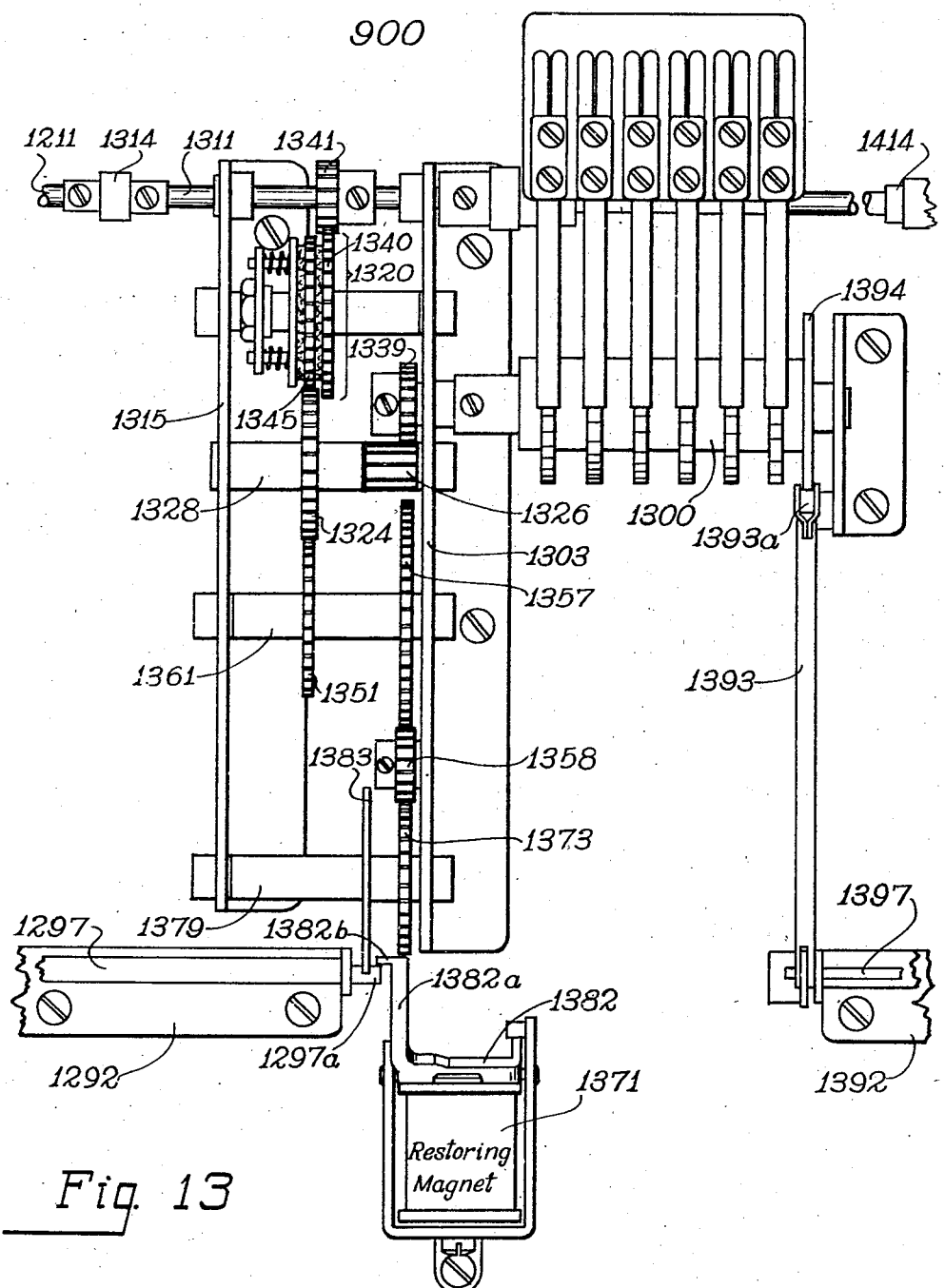

Since no provisions are made in the ticket-issuing machines for individual ticket sales of more than one hundred dollars, the thousands order 900 illustrated in Fig. 13 is utilized solely for the purpose of absorbing the carry-over from the hundreds order 800. This means that provisions for storing registrations corresponding to individual ticket sales occurring during the periods when the totals posted in the machine are being transferred to the display panels are not required, since during such periods the drum 1200 of the hundreds order 800 is locked against rotation by the magnet 1285. Accordingly, carry-overs cannot be mechanically transmitted from this order to the thousands order 900. As a result, it is unnecessary to provide in the thousands order a magnet corresponding to the magnet 1285 of the hundreds order 800 for locking the drum 1300 against rotation. Further, no operating magnets corresponding to the magnets 1062, 1072 and 1071 of the units order 600 and operative in direct response to the sale of a ticket at one of the associated ticket-issuing machines are required to effect control of the drum 1300. Accordingly, the differential mechanisms described above in connection with the units order 600 are dispensed with in the thousands order 900. More specifically, the drum 1300 of the thousands order is operated only in response to operation of the carry-over mechanism connecting this order with the preceding hundreds order 800. This carry-over mechanism is identical in construction with that illustrated in Figs. 10, 11 and 18, which interconnects the units order 600 with the tens order 700. Thus, the carry-over mechanism comprises a frame 1292 which is arranged to be rocked from the normal position illustrated in the drawings to an off-normal position, wherein the latching finger 1297a is disengaged from the escapement member 1283 under the control of a rocker arm 1293 which is provided with a spring biased roller engaging the camming element 1294 carried by the drum 1200. The escapement arm 1383 in cooperation with the latching finger 1297a normally locks the drum 1300 against movement through a gear train which comprises the gears 1373, 1358, 1357, 1351, 1324, 1326 and 1339. The gears 1324 and 1326 are rigidly secured to the shaft 1328 which is journaled in suitable bearing members mounted on the bracket pieces 1303 and 1315. Similarly, the intermediate gears 1351 and 1357 are mounted for rotation with the shaft 1361 which is journaled in two additional bearings also carried by the brackets 1303 and 1315. Finally, the escapement member 1383 and the gear 1373 are mounted for rotation with the shaft 1379 which is journaled in additional bearing members carried by the two brackets 1303 and 1315. The ratio of the enumerated gears is such that the drum 1300 is rotated through an angle corresponding to a change in total of one thousand dollars in response to each half revolution of the escapement arm 1383. Rotary movement is imparted to the drum 1300 from the drive shaft 1311 through the clutch mechanism 1320 and the gears 1324, 1326 and 1339. For the purpose of releasing the escapement member 1383 independently of the carry-over mechanism comprising the latching finger 1297a, thereby to return the drum 1300 to one of its normal or zero positions at the end of a ticket selling period, there is provided a restoring magnet 1371 which is substantially identical in construction and arrangement with the previously described magnet 1062 embodied in the units order 600. The magnet 1371 differs from the magnet 1062 in that the armature 1382 thereof is provided with an outwardly extending arm 1382a which carries at the outer end thereof a finger 1382b arranged in overlapping relationship with the latching finger 1297a. As thus arranged, the finger 1382b operates to rock the carry-over frame 1292 so that the latching finger 1397a is moved out of the path of movement of the escapement member 1383 when the magnet 1371 is energized to attract the armature 1382 to the associated pole face of the magnet core structure. Thus, by repeated energization of the magnet 1371 the drum 1300 may be rotated from any position representing a digit value of from one to nine to one of its zero or normal positions.

The ten thousands order 950 is utilized solely for the purpose of receiving carry-overs from the thousands order 900 and is identical in construction and arrangement with the latter order. Accordingly, this order has been only schematically indicated in Fig. 9 of the drawings. Since, in the normal operation of the apparatus, ticket sales totaling an amount greater than two hundred thousand dollars are seldom, if ever, encountered in practice, only the five mechanical orders 600, 700, 800, 900 and 950 have been provided. The sixth order for registering a single carry-over from the ten thousands order 950 comprises a relay R910 which is arranged to be energized and operate in response to operation of the register drum embodied in the ten thousands order 900 from either of its zero or normal positions to the other of its zero or normal positions. To this end, the camming element 1494 carried by the ten thousands register drum and corresponding to the camming element 1394 of the thousands order 900 is provided with a pair of lobes 1494a and 1494b which are individually operative to move a pair of contact springs 1495 into engagement, thereby to energize the register relay R910 when the associated drum is rotated from one of its positions representing the digit nine to the adjacent normal or zero digit position.

It will be understood from the foregoing explanation that normally the drums of the various orders are locked against rotation through the locking mechanisms individually associated therewith. When the totalizing apparatus is conditioned for operation in the manner subsequently explained the motor 1010 is energized and operates to drive the connected drive shafts of the various orders through the speed-determining gears 1012 and 1013. Accordingly, rotary movement is imparted to the gear 1040, the clutch plate 1047 and the guide plate 1049, all of which are carried by and mounted for rotation with the sleeve 1042. The driving gear 1045 is locked against rotation through the three differential mechanisms 1021, 1022 and 1023. Thus, so long as the escapement member 1060 is latched against rotation by the armature 1063 of the electromagnet 1062 and the gear 1057 is locked against rotation through the differential mechanism 1023, the driving gear of the differential mechanism 1051 is also locked against rotation, whereby the two gears 1024 and 1045 are prevented from rotating. The intermediate gear 1057 which is connected to drive the driving gear 1073 of the differential mechanism 1023, is normally effectively locked against rotation through the engagement of the escapement members 1083 and 1081 with the latching projections of the electromagnet armatures 1084 and 1082 respectively. Thus, so long as these two escapement members are latched the sun gears 1074 and 1075 are prevented from rotating, thereby to prevent relative movement between the orbital gears 1076 and 1077. In a manner apparent from the above explanation, the gears embodied in the other orders 700, 800, 900 and 950, which correspond to the gears 1045 and 1024 of the units order 600, are locked against rotation, thereby to prevent rotation of the associated register drums.

As indicated previously, each of the six camming elements 1004 of the drum 1000 is provided with two identical sets of notches around the peripheral surfaces thereof for the purpose of imparting different settings to the associated contact springs 1006. More specifically, each set of notches occupies one-half of the cylindrical surface defined by the peripheries of the camming elements, whereby two complete cycles of operation of the drum are effected in response to one revolution thereof. With respect to the first five of the camming elements, each set of notches comprises ten pairs of indentations evenly spaced around a half circle segment of the peripheries of the camming elements 1004, the indentations representing each setting of the drum being longitudinally aligned and being cut in different pairs of the camming elements. The arrangement of these notches will best be understood by reference to Fig. 19 of the drawings wherein the closed contact positions of the contact springs 1006a to 1006e, inclusive, and the digit values assigned to these positions are plotted against the various positions which the drum 1000 may occupy. Thus, it will be apparent from this chart that the cam depressions are, in the first normal position of the drum 1000 provided in the camming elements 1004c and 1004d so that the cam follower portion of the upper contact spring in each of the spring sets 1006c and 1006d are disposed in these depressions. Accordingly, with the drum 1000 occupying its first normal position the contact springs 1006c and 1006d are respectively engaged. Since no indentations are provided in the other camming elements at corresponding points around the peripheral surfaces thereof, the contact springs of the other three sets are respectively disengaged. Similarly, indentations are only provided in the camming elements 1004a and 1004e at the positions along the peripheral surfaces of the camming elements 1004 corresponding to the first off-normal position of the drum 1000. From a consideration of the chart illustrated in Fig. 19, the manner in which the other cam depressions are disposed around the peripheral surfaces of the camming elements 1004 will readily be apparent. It will further be noted that the second set of camming depressions which are disposed along the second half-circle segment of the peripheral surfaces of the camming elements are identical in arrangement with the depressions disposed around the first half-circle segment of the peripheral surfaces of these elements. It is pointed out that the lobe 1094a projecting from the camming element 1094 is disposed along the periphery of this element so that it rides through a position in engagement with the roller 1093a when the drum 1000 is moved from the setting corresponding to the first nine digit to the second zero digit. The second lobe 1094b is disposed along the periphery of the camming element 1094 at a point diametrically opposite the first lobe 1094a, so that it rides through a position in engagement with the roller 1093a during movement of the drum 1000 from a position corresponding to the second nine digit back to the first normal position thereof. By virtue of this arrangement, a carry-over of one tens unit is transmitted from the units order 600 to the tens order 700 each time the drum 1000 is moved one-half revolution from one of its two normal positions. The depressions provided in the sixth camming element 1004f are disposed at points around the periphery of this element which respectively correspond to the two zero or normal positions of the drum 1000. The arrangement of the depressions provided in the camming elements of the four other orders 700, 800, 900 and 950 is exactly the same as that just described with reference to the camming elements 1004 of the units order 600.

If, with all of the drums of the five orders 600, 700, 800, 900 and 950 standing at normal and the motor 1010 operating, a two dollar sale is effected which results in the momentary energization of the two dollar indexing magnet 1071, for example, this magnet operates its armature 1082 to unlatch the escapement member 1081 and to disengage the contact springs 1071a. In response to this operation the escapement member 1081 is released for rotation with the gears 1074, 1076, 1077, 1073, 1058, 1057, 1052, 1054, 1055, 1051, 1024, 1029, 1030, 1026, 1039 and 1045. Thus, the gear 1040, which meshes with the driving gear 1041, drives the clutch gear 1045 through the clutch elements 1046a, 1046b and 1047. The gear 1045, in turn, rotates the driving gear 1024 of the differential mechanism 1021. In the case under consideration, the sun gear 1025 which meshes with the storage pinion 1088 is locked against rotation due to engagement of the stop members 1090a and 1090b and the bias exerted on this pinion by the auxiliary drive spring 1091. Accordingly, the orbital gear 1029 is, in response to rotation of the driving gear 1024, rotated about the sun gear 1025 and in so doing imparts rotary movement to its meshing orbital gear 1030. This rotary movement of the orbital gear 1030 is transmitted through the sun gear 1026 and the driving gear 1039 to the drum 1000. The driving gear 1024 of the differential mechanism 1021 in rotating also imparts rotary movement to the meshing driving gear 1051 of the differential mechanism 1022. In this differential mechanism the sun gear 1053 is locked against rotation due to the engagement of the escapement member 1060 with the latching finger 1063a of the five dollar magnet 1062. Accordingly, the orbital gear 1055 is rotated about the sun gear 1053 and thus rotates its meshing orbital gear 1054, thereby to impart rotary movement to the sun gear 1052 and the intermediate driving gear 1057 carried thereby. The gear 1057 is connected through the pinion 1058 in driving relationship with the driving gear 1073 of the third differential mechanism 1023. Accordingly, rotation of the driving gear 1073 is initiated. In the differential mechanism 1023 the sun gear 1075 is locked against rotation due to the engagement of the escapement member 1083 with the latching finger of the armature 1084. Accordingly, the orbital gear 1077 which meshes with the sun gear 1075 is rotated about this sun gear with the driving gear 1073 and, during such rotation, imparts rotary movement to its meshing orbital gear 1076. The orbital gear 1076, in turn, drives the sun gear 1074 to cause rotation of the escapement member 1081. During the initial movement of this member one of the two insulating rollers carried thereby functions to move the contact springs 1081a into engagement, thereby to perform certain circuit control operations which are subsequently described in detail. As explained hereinafter, the duration of the current pulse transmitted to the magnet 1071 is such that this magnet is deenergized to cause the return of the armature 1082 to its normal position before the escapement member 1081 can be rotated through one-half of a revolution in the manner just explained. Accordingly, when the escapement member 1081 has been operated through an arc of 180 degrees, one of the arms of this member engages the latching finger of the released armature 1082. Thus, the gear train connecting the three escapement members with the driving pinion 1045 of the clutch 1020 is again locked up and rotation of the drum 1000 is arrested. The ratio of the gears 1073, 1058 and 1057 included in this train is such that the drum 1000 is moved from its initially occupied normal position through the first adjacent off-normal position to the second off-normal position, thereby to operate the contact springs 1006 from a setting designating the digit zero to a setting designating the digit two.

In the event a second pulse is transmitted to the other two dollar magnet 1072, the escapement mechanism 1083 is released. The manner in which the drum 1000 is rotated two steps in response to the resultant half revolution of the escapement member 1083 is exactly the same as described above, it being pointed out that in this case the orbital gears 1076 and 1077 rotate about the latched sun gear 1074 in response to the rotary movement imparted to the driving gear 1073. As these two orbital gears rotate, the sun gear 1075, which meshes with the orbital gear 1076 and carries the escapement member 1083, is rotated to bring the associated escapement member back into engagement with the latching finger of the magnet armature 1084. If two pulses are simultaneously delivered to the two dollar magnets 1071 and 1072, both of the escapement members 1081 and 1083 are released. Due to the frictional drag caused by the meshing of the gears 1075, 1077, 1076 and 1074 these four gears are driven as a unit at least during the initial movement of the driving gear 1073. In this case both of the escapement members 1081 and 1083 are driven through one-half of a revolution before the differential mechanism 1023 is again locked against operation. Accordingly, the driving gear 1073, the register pinion 1039 and the register drum 1000 are respectively driven through arcs which have twice the magnitude of the arcs through which these elements are respectively moved in response to the transmission of a pulse to only one of the two magnets 1071 and 1072. Thus, the drum 1000 is moved four steps to the position fourth removed from that occupied before the transmission of concurrent registration pulses to the two magnets 1071 and 1072.

If a registration pulse is transmitted to the five dollar magnet 1062, this magnet attracts its associated armature 1063 to disengage the contact springs 1064 and to move the latching finger 1063a out of the path of rotation of the escapement member 1060. When the differential mechanism 1022 is thus released the driving gear 1051 thereof is driven through the clutch mechanism 1020 and the driving gear 1024 of the differential mechanism 1021. Since, in this case, the sun gear 1052 is locked against operation by the gears 1057 and 1058 and the latched escapement members 1081 and 1083 of the differential mechanism 1023, the orbital gears 1054 and 1055 are rotated about the sun gear 1052. Accordingly, the rotary movement is imparted to the opposite sun gear 1053 and the escapement member 1060. The duration of the pulse transmitted to the five dollar magnet is such that this magnet is deenergized and its armature retracted before the escapement member 1060 is driven through one-half of a revolution. Accordingly, after this member has completed one-half of a revolution one of the arms thereof again engages the latching finger 1063a to again lock up the gear train. The tooth ratio of the two driving gears 1024 and 1051 is such that the drum 1000 is, in response to the release of the escapement member 1060 and its operation through one-half of a revolution, operated five steps to the off-normal position fifth removed from that which it occupied prior to transmission of the pulse to the magnet 1062. During the initial movement of this escapement member, one of the two insulating rollers 1070a and 1070b carried thereby is operated into engagement with the free end of the contact spring 1068a, thereby to move the two contact springs 1068 into engagement to perform certain circuit control operations which are subsequently described in detail.

In view of the foregoing explanation it will be apparent that the five dollar magnet 1062 may simultaneously be energized with either or both of the two dollar magnets 1071 and 1072 with a resulting increase in the number of steps through which the drum 1000 is operated. Thus, if the five dollar magnet 1062 is simultaneously energized with either of the two dollar magnets the drum 1000 is operated through seven steps. Similarly, if the five dollar magnet 1062 is simultaneously energized with both of the two dollar magnets the drum 1000 is operated through nine steps.

As indicated above, each time the drum 1000 is operated from one of its two ninth off-normal positions back to a zero or normal position, one of the two lobes 1094a and 1094b is moved through a position in engagement with the roller 1093a of the carry-over mechanism connected between the two orders 600 and 700. When this occurs the arm 1093 is momentarily moved downward from the position illustrated in Fig. 10 of the drawings, thereby to rock the carry-over frame 1092 about the shaft 1095 against the bias of the spring 1092c. The direction in which the carry-over frame 1092 is rotated is such that the latching finger 1097a is moved out of engagement with the escapement member 1183. As a result, the escapement member 1183 is, through operation of the clutch 1120 and the differential mechanisms 1121, 1122 and 1123, driven through an arc of 180 degrees, at which time one of the arms thereof engages the released latching finger 1097a. During operation of the gear train embodied in the tens order 700, the drum 1100 is, through operation of the sun gear 1126 and the register pinion 1139, driven one step from its occupied position to the next succeeding position. To this end, the gears 1157, 1158a and 1158 which form the driving connection between the sun gear 1152 and the driving gear 1173 of the differential mechanism 1123 are selected of such size that the driving gear 1173 is, in response to a given angular movement of the sun gear 1152, rotated through an angle which is twice as large as the arc through which the driving gear 1073 of the differential mechanism 1023 is driven in response to the same angular movement of its associated sun gear 1052. Thus, for each half revolution of either of the two escapement members 1181 and 1183 the register drum 1100 is operated one step. If, on the other hand, a register pulse indicative of a fifty dollar ticket sale is transmitted to the fifty dollar magnet 1162, the drum 1100 is operated through five steps in response to the release of the escapement member 1160 and the consequent rotation of this member through an angle of 180 degrees. The manner in which the clutch 1120 and the three differential mechanisms 1121 to 1123, inclusive, operate in response to operation of the carry-over frame 1092 or either of the two magnets 1162 and 1171 is identical in all respects with the mode of operation of the corresponding elements embodied in the units order 600 and will be readily understood from the foregoing explanation. In this regard it will be apparent that the magnet 1171 may be energized simultaneously with operation of the carry-over frame 1092, in which case the drum 1100 is operated through two steps, and that the fifty dollar magnet 1162 may be energized simultaneously with operation of the carry-over frame or energization of the ten dollar register magnet 1171, or both. If the fifty dollar magnet 1162 is energized simultaneously with operation of the carry-over frame 1092 the drum 1100 is operated through six steps to change the setting of the contact springs 1106 so that additional sales totaling sixty dollars are registered thereby. The same change in the total is effected in response to simultaneous energization of the two magnets 1162 and 1171. If the carry-over frame 1092 is operated concurrently with the transmission of two pulses simultaneous to the two magnets 1162 and 1171, the drum 1100 is operated through seven steps to change the setting of the contact springs 1106 so that the total set up therein is increased by seventy dollars.

The manner in which one hundred dollar values indexed in the tens order 700 are carried over to the hundreds order 800 through operation of the camming element 1194, the arm 1193 and the carry-over frame 1192, is exactly the same as described above with reference to the carry-over of values from the units order 600 to the tens order 700. Since no provisions are made in the apparatus for receiving individual ticket sales of more than one hundred dollars, the hundreds order 800 is not provided with a differential mechanism which corresponds to the two differential mechanisms 1022 and 1122 respectively embodied in the units and tens orders 600 and 700, or with an operating magnet, corresponding to the magnets 1062 and 1162, for entering five hundred dollar values. In the order 800 the ratio of the gears 1251, 1257, 1258a and 1258 which connect the driving gear 1224 of the differential mechanism 1221 with the driving gear 1273 of the differential mechanism 1223 are selected with tooth ratios such that the drum 1200 and the register pinion 1239 operate one step in response to operation of the carry-over frame 1192 to release the escapement member 1283, or in response to the transmission of a register pulse to the hundred dollar magnet 1271. In the event the carry-over frame 1192 is operated simultaneously with the transmission of a register pulse to the magnet 1271, the drum 1200 is operated two steps in a manner which will be clearly apparent from the foregoing explanation. Each time the drum 1200 is operated one step, the setting of the contact springs 1206 is changed to increase the total set up therein by one hundred dollars.

As explained above, the thousands order 900 is provided solely for the purpose of receiving values transferred thereto from the hundreds order 800. The manner in which the camming element 1294, the arm 1293 and carry-over frame 1292 cooperate to release the escapement member 1383 of the thousands order 900 each time ticket sales totaling one thousand dollars have been received in the hundreds order 800 is exactly the same as described above with reference to the carry-over of ticket sales totaling ten dollars from the units order 600 to the tens order 700. In this regard it will be understood that the tooth ratios of the gears 1351, 1357, 1358 and 1373 forming the driving connection between the driving gear 1324 and the shaft 1379 upon which the escapement member 1383 is mounted are such that the drum 1300 is moved one step in response to operation of the escapement member 1383 through an arc of 180 degrees. In the thousands order 900 the magnet 1371 is utilized solely for the purpose of effecting restoration of the drum 1300 to one of its two normal positions. The manner in which this is accomplished is described in detail hereinafter with reference to the control circuits illustrated in Figs. 1 to 9, inclusive, of the drawings. Each group of sales totaling ten thousand dollars and carried over to the thousands order 900 from the preceding orders 600, 700 and 800 is, through operation of the carry-over mechanism comprising the carry-over frame 1392, the operating arm 1393 and the camming element 1394, transferred to the ten thousands order 950 which is identical in construction and arrangement with the thousands order 900.

As explained in detail hereinafter, during those periods when the aggregate value of the total ticket sales registered in the orders 600, 700, 800, 900 and 950 is being transferred to the associated indicating unit, the locking magnets 1085, 1185 and 1285 are all energized to lock the various register drums against rotation. Thus, when the magnet 1085 is energized it attracts its armature 1086 so that the latching pawl 1086a is operated into engagement with the ratchet wheel 1087 to lock the spindle 1001 against rotation. If, during the period of energization of the magnet 1085 impulses designating ticket sales are transmitted to the magnets 1062, 1071 and 1072, the aggregate values of the sales is temporarily registered in the storage mechanism comprising the spring biased storage pinion 1088 until the locking magnet 1085 is deenergized to permit retraction of its armature 1086. Thus, if a pulse designating a two dollar ticket sale is transmitted to the magnet 1071, for example, during a period when the drum 1000 is locked against rotation, the escapement member 1081 is released. When thus released, this member is rotated a half revolution through operation of the clutch 1020 and the three differential mechanisms 1021, 1022 and 1023. In this case since the magnet 1085 is energized the sun gear 1026 which meshes with the register pinion 1039 is locked against rotation. Accordingly, the orbital gears 1029 and 1030 are, during rotation of the driving gear 1024, rotated about the sun gear 1026 and in the course of such rotation impart rotary movement to the sun gear 1025. The sun gear 1025 thus rotates the storage pinion 1088 against the bias of the spring 1091 in a direction to move the stop 1090b away from the stop 1090a. It will be understood that the sun gear 1025 is, during operation of the escapement member 1081, rotated through an angle equal to the angle through which the opposite sun gear 1026 would have been rotated had the drum 1000 been free to rotate therewith. Thus, the spring 1091 is tensioned to exert a restrained driving force upon the storage pinion 1088. If additional pulses are delivered to the magnets 1062, 1071 and 1072 prior to the release of the locking magnet 1085, the storage pinion 1088 is operated through additional angles respectively determined by the magnitude of the ticket sales, thereby further to tension the spring 1091 and to move the stop 1090b a further distance away from the stationary stop 1090a, all in the manner just explained. In this regard it will be apparent that the angle through which the storage pinion 1088 is operated in response to a pulse transmitted to the five dollar magnet 1062 is two and one-half times as large as the angle through which this pinion is driven in response to the transmission of a pulse to one of the two dollar magnets. It will further be apparent that when the locking magnet 1085 is released the angular displacement of the storage pinion 1088 from its normal position determines the aggregate of the ticket sales which have been registered thereby during the ensuing period. It will also be apparent that the storage device is capable of adding to its stored total the values of ticket sales resulting in the transmission of simultaneous pulses to two or three of the magnets 1062, 1071 and 1072.

In a manner similar to that just described, the storage mechanisms respectively embodied in the tens and hundreds orders 700 and 800 operate to total ten, fifty and one hundred dollar ticket sales which occur during the periods when the register drums thereof are locked against operation. At the end of each such period, the three magnets 1085, 1285 and 1185 are de-energized in the manner subsequently explained. Accordingly, each of the sun gears 1026, 1126 and 1226 is released for rotation. If, at the time these gears are released, all of the associated escapement members are latched against rotation the respective driving gears 1024, 1124 and 1124 of the differential mechanisms 1021, 1121 and 1221 are locked against rotation. Accordingly, the three drums 1000, 1100 and 1200 are driven through angles respectively corresponding to the sales totals which have been posted in the associated storage mechanisms. Thus, when the magnet 1085, for example, is released to unlock the sun gear 1026, the tensioned spring 1091 operates to rotate the storage gear 1088 back to its normal position wherein the stop 1090b carried thereby engages the stationary stop 1090a. During such rotation of the storage pinion 1088 the register pinion 1039 is operated through a predetermined angle by means of the driving connection provided by the two sun gears 1025 and 1026 and the two orbital gears 1029 and 1030. It will be apparent that the magnitude of the angle through which the gear 1039 is rotated is determined by the off-normal position occupied by the storage pinion 1088 at the time the drum 1000 is released. Thus, the drum 1000 is operated to a new setting wherein the sum of the temporarily stored ticket sales is added to the total designated by the setting of this drum at the start of the period during which the drum was locked against operation. It will be apparent that the operation of the storage device embodied in the units order 600 to alter the setting of the drum 1000 may occur simultaneously with the entry of the values represented by one or more register pulses transmitted to one or more of the magnets 1062, 1071 and 1072. The storage devices individual to the three orders 600, 700 and 800 are also operative to cause totals to be transferred from the respective associated orders to the orders of next higher order. Thus, if the drum 1000, for example, occupies one of its ninth off-normal positions at the beginning of a period when this drum is locked against operation and sales totaling eight dollars are registered by the storage pinion 1088 during the ensuing period, the auxiliary drive means comprising the spring 1091 will advance the drum 1000 through one of its normal positions to the next succeeding seventh off-normal position when the drum 1000 is released at the end of the period. During this operation of the drum 1000 the carry-over frame 1092 is operated to its off-normal position momentarily to release the escapement member 1183, whereby a ten dollar value is transferred from the units order 600 to the tens order 700. In a similar manner the storage devices embodied in the tens and hundreds orders 700 and 800 are operative to cause the transfer of predetermined values from these orders to the orders 800 and 900, respectively. It will be apparent from the foregoing explanation that at the end of each period when the register drums are locked against operation, the storage mechanisms respectively embodied in the three orders 600, 700 and 800 operate to alter the settings of the register drums so that the ticket sales effected during the period are added to the existing total set up in the machine. It will further be apparent that the operation of the ticket-issuing machines and of the ticket sales registering apparatus is in no way interfered with during the periods when the totals are being transferred from the adding machine to the display panels. It will also be understood that the value of six individual tickets, namely, a pair of two dollar tickets, one five dollar ticket, one ten dollar ticket, one fifty dollar ticket and a one hundred dollar ticket may concurrently be entered and totaled in the adding machine by suitably arranging the collector switch to transmit register pulses to the six magnets from six ticket-issuing machines of the denominations mentioned. One of the advantages of the present system resides in breaking down of the adding units into register elements of different orders and the arrangement whereby two and five dollar ticket sales are entered in the units orders and ten and fifty dollar ticket sales are entered in the tens orders. By virtue of this arrangement the locking gear trains connecting the register magnets with the register drums are relatively short so that great precision in the gear trains is not required to obtain the correct drive ratios. Thus, the largest drive ratio of five to one is required in the tens order 700.

As distinguished from this arrangement if ticket sales of all denominations were entered in a register having only one register element or order a drive ratio of fifty to one would be required in order to permit proper posting of the values of one hundred dollar ticket sales and two dollar ticket sales, respectively. This would necessitate the use of long gear trains having exceedingly precise tooth ratios between the component gears thereof.

Initiating operation of the system

In order to initiate operation of the system the steward attending the control board first operates the "win," "place" and "show" switches 211, 210 and 209, respectively, to their off-normal positions where they remain until manually restored to normal, and then closes the master or power switch 212 to connect the negative terminal of the current source 212a to the negative bus over which all of the electromagnetic control elements of the system are commonly energized. When the master switch is closed, the relays R255, R260, R380, R395, and R598 included in the apparatus provided at the control board are immediately energized. The relay R698 in operating, completes, at its contacts 699, a circuit for energizing the driving motor 1010 of the adding machine illustrated in Figs. 6B to 9, inclusive, and similar circuits for energizing the driving motors individual to the other adding machines embodied in the system. The relay R460 of the collector switch illustrated in Fig. 4 and the corresponding relays of the thirty-eight other collector switches are also energized in response to closure of the master switch 212. More specifically, the relay R460 is energized over a circuit extending from ground by way of the contacts 459, the contact chain controlled by the relays R400 to R450, inclusive, the contacts 403 and the winding of R460 to battery. The relay R460 in operating, opens, at its contacts 461 and 462, points in the operating and locking circuits for the last relay R455 of the chain and prepares at its contacts 463 the operating circuit for the start relay R400 of the chain.

The operating circuit for the relay R255 extends from ground by way of the contacts 316, C12 and the winding of R255 to battery. The relay R255 in operating, completes a circuit for energizing the dashpot relay R250, this circuit extending from ground by way of the contacts 221, the winding of R250 and the contacts 254 and 256 to battery.

The relay R260 is energized over a circuit which extends from ground by way of the contacts 332 and 362, C17 and the winding of R260 to battery. In operating, the relay R260 completes, at its contacts 262, parallel circuits for initiating operation of the several "win," "place" and "show" collector switches. Thus, the start relay R400 of the collector switch illustrated in Fig. 4 is energized in response to operation of the relay R260 over a circuit extending by way of the contacts 262, 211c and 273, C31, the contacts 463 and the winding of R400 to battery. Parallel branches of this circuit extend through the contacts of the "win," "place" and "show" switches 211, 210 and 209 respectively to the start relays of each of the other collector switches embodied in the system, whereby operation of all of the collector switches is initiated.

The relay R380 is energized over a circuit extending from ground through the contacts 386 and the winding of R380 to battery. When thus energized, the relay R380 opens, at the contacts 381, a point in the operating circuit for the relay R370 and prepares, at its contacts 383, the operating circuit for the relay R345. At its contacts 382, the relay R380 completes an obvious operating circuit for the relay R390. The relay R390 in operating, completes, at its contacts 391, an obvious path for grounding the hold conductor C9 which extends to the various indicator control units 306 to 311, inclusive, of the No. 1 entry, "win" group. At its other contacts, the relay R390 connects the hold leads individual to the other indicator control units to ground, thereby to provide locking paths for the individual indicator control relays embodied in these units.

The relay R400 upon operating, completes, at its contacts 402, a locking circuit for itself which extends through the chain connected contacts of the other collector switch relays to ground at the contacts 459. At its contacts 403, the relay R400 opens the above-traced operating circuit for the relay R460, causing the latter relay to release and reprepare the operating and holding circuits for the relay R455 and to open the operating circuit for the start relay R400. At its contacts 401, the relay R400 prepares an operating circuit for the relay R405. At its remaining upper contacts, the relay R400 connects the marking conductors C470 to C473, inclusive, and respectively extending to the two, five and one hundred dollar ticket-issuing machines to the take-off conductors C37, C36, C35 and C34, respectively.

The relay R395 is energized directly from ground when the master switch 212 is operated to its closed circuit position. In operating, this relay completes the operating circuit for the "win" collector switch illustrated in Fig. 4 and corresponding operating circuits for the other twelve collector switches of the "win" group. Two additional relays also energized directly in response to operation of the master switch 212, but not shown, also operate to prepare similar operating circuits for the collector switches of the "place" and "show" groups, respectively. More specifically, when the relays R395 and R400 are both operated the above-mentioned operating circuit for the second relay R405 embodied in the collector switch of Fig. 4 is completed, this circuit extending from ground by way of the contacts 814 and 1271a, C726, the contacts 724, 1164, 714 and 1171a, C626, the contacts 634, 1064, 624, 1071a, 614 and 1072a, C601, the contacts 396, C23, the contacts 286, C30, the contacts 401 and the winding of R405 to battery. The relay R405 in operating, opens, at its lower contacts, the holding circuit for the relay R400; completes, at its lower make contacts, an obvious locking circuit for itself and, prepares, at its inner-upper contacts, the operating circuit for the third relay R410 of the collector switch. At its upper contacts, the relay R405 disconnects the marking conductors C470 to C473, inclusive, from the two, five and one hundred dollar take-off leads C37, C36, C35 and C34. At its upper make contacts, the relay R405 connects its associated marking leads to the enumerated two, five and one hundred dollar take-off conductors. From the foregoing explanation it will be apparent that so long as the conductor C30 is grounded the twenty-five relays R400, R405, R410, etc., embodied in the collector switch illustrated in Fig. 4 will operate in rapid succession, each interrupting the holding circuit of the preceding relay, until the relay R460 is again energized. When the relay R460 is energized and operates it opens, at its contacts 461 and 462, the operating and locking circuits for the relay R455, causing the latter relay to restore and complete the previously traced operating circuit for the relay R460. At its contacts 463, the relay R460, in operating, completes the previously traced operating circuit for the first or start relay R400 of the collector switch. Thus, the relays of the collector switch operate in the manner of a rotary switch sequentially to connect the marking conductors extending to the various ticket-issuing machines of the "win" class to the take-off conductors C32 to C37, inclusive.

In order to condition the apparatus for the actual selling of tickets, the steward attending the control board momentarily operates the key 205 to its off-normal position and thereafter operates the ticket-issuing machine release key 202. When the key 205 is moved off-normal, the contacts 205a are operated into engagement to complete an obvious circuit for energizing the relay R220. At the contact springs 205b, a circuit extending by way of C21 is completed for energizing the slow-to-operate total-taking start relay R360. The relay R220 in operating, completes a locking circuit for itself which extends from ground through the contacts 202c and 222 and the winding of R220 to battery. At its contacts 223, the relay R220 opens a point in the parallel operating circuit for the relays R245 and R230. At its contacts 221, the relay R220 opens the above-traced operating circuit for the dashpot relay R250, thereby to arrest the operation of the latter relay.

The relay R360 in operating, completes a locking circuit for itself, this circuit extending from ground by way of the contacts 202a, C18, the contacts 361 and the winding of R360 to battery. At its contacts 363, the relay R360 completes an obvious operating circuit for the slow-to-operate relay R355. At its contacts 362, the relay R360 opens the previously traced operating circuit for the relay R260. The relay R260 in restoring, disconnects the conductor C31 from ground, thereby to arrest operation of the collector switch illustrated in Fig. 4 as soon as the relay R460 has operated at the end of the operating cycle in progress. In a similar manner operation of each of the other collector switches is arrested immediately the relays embodied therein and corresponding to the relay R460 of the collector switch illustarted are operated. The relay R355 in operating, opens, at its contacts 357, a point in the operating circuit for the relay R265 and prepares, at its contacts 356, certain additional control circuits referred to specifically hereinafter.

When the ticket-issuing machine release key 202 is manually operated to its off-normal position by the steward attending the control board 10, the relay R215 is energized over a circuit extending from ground by way of the contacts 202d and the winding of R215 to battery. The relay R215 in operating completes, at its contacts 216, an obvious path for impressing ground potential upon the ticket-issuing machine start conductor C27. This conductor is multipled to the operating windings of all of the start magnets respectively embodied in the several ticket-issuing machines. Thus, when the relay R215 operates, a circuit is completed for energizing the operating winding of the start magnet 547 embodied in the ticket-issuing machine 500 illustrated in Fig. 5, this circuit extending by way of the grounded conductor C27 through the impedance element 549 and the lower operating winding of the magnet 547 to battery. When its lower winding is thus energized, the magnet 547 operates to shift its core 548 out of the slot provided in the locking bar 501, thereby to condition the ticket-issuing machine 500 for operation under the control of the ticket salesman attending the particular booth or station where the ticket-issuing machine 500 is located. In a similar manner, all of the other ticket-issuing machines of the system are conditioned for operation when the relay R215 operates.

When the ticket-issuing machine release key 202 is operated to its off-normal position the contact springs 202c are disengaged to open the previously traced locking circuit for the relay R220. The relay R220 now restores to reprepare, at its contacts 223, the operating circuit for the relays R245 and R230, and to recomplete, at its contacts 221, the previously traced operating circuit for the dashpot relay R250. At the contacts 202a of the ticket-issuing machine release key 200, the previously traced locking circuit for the relay R360 is interrupted, thereby to cause the sequential release of the relays R360 and R355 in an obvious manner. The relay R360 in releasing, recompletes, at its contacts 362, the previously traced operating circuit for the relay R260. Accordingly, the relay R260 reoperates to again connect ground potential to the start conductors corresponding to and including the conductor C31 which individually extend to the several collector switches. Thus, the cyclic operation of the collector switch illustrated in Fig. 4 and of the other thirty-eight collector switches is again initiated.

When the ticket issuing machine release key 202 is operated to its off-normal position a circuit is also completed for energizing the relay R225, this circuit extending from ground through the contacts 202b and the winding of R225 to battery. The relay R225 in operating, completes, at its contacts 226, an obvious locking circuit for itself and opens, at its contacts 227, the normally completed circuit for energizing the signal lamp 295. The resulting deenergization of this lamp serves to inform the steward that the thicket-issuing machines are no longer locked up. At its contacts 228, the relay R225 completes a path for impressing ground potential upon the pick-up leads respectively extending to the various ticket-issuing machines, one branch of this path extending from ground by way of the contacts 228 and 211a to the conductor C29 which extends to the ticket-issuing machine 500. Similar paths extend through the operated contacts of the "win," "place" and "show" switches 211, 210 and 209, respectively, and terminate at pick-up leads respectively extending to the other ticket-issuing machines of the system. At the contacts 228, the relay R225 also completes an obvious circuit for energizing the signal lamp 294, thereby to inform the steward that the ticket-issuing machines have been released for operation. The release of the key 202 following the operation just described is without effect.

*Changing the totals displayed*

In order periodically to impress ground potential upon the operating conductor C25 commonly included in the operating circuits of the connect relays R690, R790, R890, R990, etc., and the locking magnets 1085, 1185, 1285, etc., thereby to cause the total sales registered in the adding machine orders 600, 700, 800, 900, etc., to be displayed by the corresponding frames of the respective associated display units, the two dashpot relays R250 and R253 are arranged intermittently to cause the operation of the start relay R315 and certain of the associated control relays illustrated in Fig. 3. To this end, the dashpot relay R250 operates to close its associated contacts 251 and 252 a predetermined time interval after the relay R220 is released in the manner just explained. At the contacts 252, an obvious circuit is completed for energizing the dashpot timing relay R253. At the contacts 251, a circuit extending by way of C10 is completed for energizing the relay R315. A predetermined time interval after the dashpot relay R253 is energized, it operates to open, at its contacts 254, the above-traced operating circuit for the dashpot relay R250. The latter relay, in turn, operates to interrupt the above-traced operating circuit for the relay R315 and the circuit for energizing the dashpot relay R253. Thus, the two relays R250 and R253 cyclically interact, the first-mentioned thereof functioning intermittently to complete the operating circuit for the relay R315.

The relay R315 in operating, completes a holding circuit for itself which extends from ground by way of the contacts 347 and 318 and the winding of R315 to battery. At its contacts 316, the relay R315 opens the previously traced operating circuit for the relay R255, causing the latter relay to restore and open the operating circuit for the dashpot relay R250, whereby operation of this dashpot relay is arrested until the registered ticket sales have been translated into digits which are displayed by the various display units. The relay R315 in operating, also opens, at its contacts 317, a point in the operating circuit for the relay R330 and prepares, at its contacts 319, a holding circuit for the slow-to-operate relay R370. At its contacts 320, the relay R315 completes a circuit for energizing the slow-to-operate relay R385, this circuit extending from ground by way of the contacts 378 and 320 and the winding of R385 to battery. The relay R385 now operates, to complete, at its contacts 388, an obvious locking circuit for itself and to open, at its contacts 386, the operating circuit for the relay R380. At its contacts 387, the relay R385 prepares an operating circuit for the relay R370, this latter circuit being completed in response to the subsequent release of the relay R380. The relay R380 in releasing, also opens, at its contacts 383, a point in the prepared operating circuit for the relay R345 and interrupts, at its contacts 382, the operating circuit for the relay R390 and the other relays connected in parallel with the relay R390, but individual to other groups of display units. When thus deenergized, the relay R390 restores to disconnect the locking lead C9 individual to the control units 306 to 311, inclusive, from ground, whereby the operated register relays of these control units are released to cause the digits being displayed by the respective associated digit indicating frames 300 to 305, inclusive, to be wiped out. At its other armatures, the relay R390 disconnects the locking leads individual to the other indicator control units of the "win" class from ground, whereby the displays of all of the display units of the "win" class are wiped out in preparation for a new registration. In a similar manner the indicating lamps of the other display units are deenergized to effect a complete wipe-out of the existing display.

The relay R370 upon operating in response to the release of the relay R380, completes a locking circuit for itself, this circuit extending from ground by way of the contacts 375 and 319 and the winding of R370 to battery. At its contacts 376, the relay R370 interrupts the previously traced operating and locking circuit for the relay R385. In response to this operation the relay R385 releases to cause the reoperation of the relays R380 and R390 in an obvious manner. The relay R390, upon reoperating, again connects holding ground potential to the associated locking leads, which include the lead C9 commonly included in the holding circuits of the translating relays embodied in the indicator control units 306 to 311, inclusive. At its contacts 371, the relay R370 prepares an operating circuit for the relay R265. At its contacts 374, the relay R370 prepares a holding circuit for the relay R345. At its contacts 372, the relay R370 prepares an alternative operating circuit for the relay R360. Finally, the relay R370 completes, at its contacts 373, a circuit for energizing the relay R350, this circuit extending from ground through the contacts 200b over the conductor C15 and by way of the contacts 676', the conductor C15', the contacts 331, 348 and 373 and the winding of R350 to battery.

The relay R350, upon operating, completes a circuit for energizing the relay R340, this circuit extending by way of the grounded conductor C15', the contacts 331 and 352 and the winding of R340 to battery. At its contacts 351, the relay R350 completes a path extending by way of C16 and the contacts 211b and 274 for impressing ground potential upon the conductor C25 commonly included in the operating circuits of the connect relays R690, R790, R890, etc., and the locking magnets 1085, 1185, 1285, etc., individual to the orders of the adding machines in the "win" class and to the "total-win" adding machine of the "win" class. This ground connection is also carried through contacts of the "place" and "show" switches 210 and 209 to ground the operating leads commonly included in the operating circuits of the connect relays and the locking magnets individual to the orders embodied in the adding machines of the "show" and "place" groups.

More specifically, the circuit for energizing the connect relays R690, R790, R890, R990 and the connect relay of the order 950, all embodied in the adding machine illustrated, may be traced as extending from ground by way of the contacts 351, C16, the contacts 211b and 274, C25 and the parallel connected windings of the enumerated relays to battery. Obvious parallel circuits also including the grounded conductor C25 are completed for energizing the locking magnets 1085, 1185 and 1285, individual to the orders 600, 700 and 800. As explained above, these magnets, when energized, serve to lock the respective associated register drums against rotation until the conductor C25 is disconnected from ground to terminate the transfer period. When energized over the above-traced circuit, the enumerated connect relays all operate to connect the associated contact sets of the respective associated orders to the five sets of individually associated marking leads which respectively extend to the indicator control units 306 to 311, inclusive. Assuming, for example, that the ticket sales which have been made in the interval which elapses between the operation of the key 202 and the operation of the relay R350 total eight thousand, six hundred and seventy-two dollars, a path is set up through operation of the control relays in the indicator control unit 311 for energizing the lamp of the units indicator frame 305 designating the digit two. The setting of the relays in the control unit 311 to accomplish this end is, of course, determined by the position occupied by the camming elements 1004 of the units order 600. More particularly, in the case assumed, the contact springs 1006c and 1006e are engaged while the contact springs 1006a, 1006b and 1006d are disengaged, as will be evident from a consideration of the chart illustrated in Fig. 19. Accordingly, the control leads E and C extending to the units order 600 are connected to ground through the contacts 691, 1006e and 693, 1006c, respectively. From a consideration of the arrangement of the register relays illustrated in Fig. 9 of the previously mentioned Robinson Patent No. 2,121,164, wherein the wiring of the relays embodied in the indicator control units 306 to 311, inclusive, is disclosed, it will be apparent that the relays of the control unit 311 for setting up a circuit for energizing the No. 2 digit lamps of the indicator frame 305 are energized when the leads C and E extending to the units order 600 are connected to ground. These relays, upon operating, lock to ground over the holding conductor C9. In a similar manner the lamps for displaying the thousands, hundreds and tens digits eight, six and seven, respectively, are respectively energized in the indicator frames 302, 303 and 304 in response to operation of the relays R790, R890 and R990 respectively. It will be understood in this regard that the contact springs 1106, 1206 and 1306 of the orders 700, 800 and 900, respectively, occupy different settings conforming to the chart illustrated in Fig. 19. All of the relays embodied in the control units 308, 309 and 310, which are energized in response to operation of the connect relays R790, R890 and R990, lock to ground over the common locking lead C9. Thus, the indicator unit comprising the display frames 300 to 305, inclusive, is caused to display the new total. Since, at this time, nothing is registered in the ten thousands order 950, the register drum of this order occupies one of its two normal positions wherein the control leads C and D extending thereto are connected to ground through the drum-controlled contacts corresponding to the contacts 1306 of the thousands order 900. Accordingly, the relays which are operative to cause the energization of the zero digit lamp in the indicator frame 301 are energized in the ten thousands indicator control unit 307, these relays also locking to ground over the common locking lead C9. Since, in the case assumed, the one hundred thousands register relay R910 is not operated, ground potential is withheld from the control lead F, whereby the lamp for displaying the digit one in the one hundred thousands indicator frame 300 is not energized.

The relay R340, upon operating in response to operation of the relay R350, completes the prepared operating circuit for the relay R345, this circuit extending by way of the grounded conductor C15', the contacts 331, 352, 341 and 383 and the winding of R345 to battery. The relay R345 in operating, interrupts, at the contacts 347, the previously traced locking circuit for the relay R315 and, at its contacts 348, interrupts the operating circuit for the relay R350. At its contacts 346, the relay R345 opens a point in the holding circuit for the relay R330. At its contacts 349, the relay R345 completes a holding circuit for itself, this circuit extending by way of the grounded conductor C15', the contacts 331, 349 and 374 and the winding of R345 to battery. A branch of this circuit extends through the contacts 383 and 341 to hold the relay R340 energized independently of the relay R350. The relay R350, upon restoring, opens, at its contacts 351, the previously traced paths for impressing ground potential upon the operating leads corresponding to and including the lead C25 which extend to the connect relays and locking magnets of the various orders embodied in the several adding machines, thus causing all of these connect relays and locking magnets to restore. When the indicated locking magnets are released, the register drums of the various orders are conditioned for further operation. At its contacts 352, the relay R350 interrupts the above-traced operating circuits for the two relays R340 and R345.

The start relay R315 releases when its locking circuit is broken at the contacts 347 of the relay R345 and, in restoring, closes its contacts 316 to recomplete the operating circuit for the relay R255. At its contacts 319, the relay R315 opens the previously traced holding circuit for the relay R370, causing the latter relay to restore. The relay R370 in releasing opens the above-traced holding circuits for the relays R340 and R345, causing both of these relays to restore. The relay R255, upon reoperating, recompletes the previously traced operating circuit for the dashpot timing relay R250, whereby operation of this relay and the associated dashpot relay R253 is again initiated. After a predetermined time interval, the dashpot relay R250 again operates to initiate the control operations just described. More specifically, this relay, in cooperation with the relays R315, R340, R345, R350, R370, R380, R385 and R390, periodically operate to effect an erasure of the total being displayed by the various indicator units and to cause a new display to be substituted therefor which is determined by the settings of the register drums embodied in the various adding machines.

If, for any reason, the steward attending the control board desires to obtain an indication of the registered ticket sales without waiting for the timing relay R250 to complete the operating circuit for the start relay R315, he may energize this control relay by momentarily operating the indicating cycle key 201 to its off-normal position. In response to this operation, the contact springs 201a are closed to complete the previously traced operating circuit for the relay R315. From this point on, the manner in which the relay R315, in cooperation with the relays R340, R345, R350, R370, R380, R385 and R390, operates to effect erasure of the existing display and the substitution of an up-to-the-minute display of the ticket sales registered in the various adding machines is exactly the same as described above.

Two dollar ticket sales

After the steward attending the control board has performed the switch and key operations described in the preceding sections, all of the ticket-issuing machines are conditioned for operation. In order to explain the manner in which ticket sales are registered in the various adding machines, the operation of the two dollar ticket-issuing machine 500 will be considered by way of example. If the ticket salesman having this machine at his disposal receives an order for a two dollar ticket for the first event, he will depress the key K1 of this ticket-issuing machine. When this key is depressed the tapered end of the camming element 513 rides into engagement with the tapered ends of the follower projections 502' and 507, respectively. As a result, the locking bar 501 and the off-normal bar 502 are shifted to the right from the positions illustrated in the drawings against the biasing forces exerted thereon by the springs 519 and 518, respectively. In this regard it will be recalled from the previous explanation that when the steward attending the control board operates the ticket-issuing machine release key 202, the locking magnet 547 is energized to withdraw its plunger 548 out of the locking depression provided in the locking bar 501. When the spring biased key K1 is operated to its fully depressed position, the triangular camming element 513 is locked under the horizontally extending portion of the projection 502' carried by the locking bar 501. Further, the stem of the operated key K1 is engaged by the laterally extending portion of the projection 502' to restrain the bars 501 and 502 in their operated positions. Accordingly, the key K1 and the two bars 501 and 502 are restrained in their respective operated or off-normal positions after the key K1 is released by the salesman. When the key K1 is depressed, the contact springs 551 individual thereto are operated into engagement in an obvious manner to prepare a path for impressing ground potential upon the two dollar marking conductor C464. During operation of the off-normal bar 502 to its off-normal position, the contact spring 545 is moved off-normal to close the contacts 546, thereby to prepare certain control circuits described subsequently. As the locking bar 501 is shifted to the right from the position illustrated, the resilient member 528, which is anchored at its upper end to the bar 501, is translated to the right to rotate the member 526 comprising the arms 526a, 526b and 526c about its pivot point 528, thereby to operate the contact springs 542a and 542b respectively into engagement. The angle of rotation of the member 526 is limited through engagement of the roller 529 carried at the free end of the arm 526b with the surface defined by the indentation 530 provided in the camming element 532a. When the contact springs 542a are operated into engagement, a circuit is completed for energizing the lower winding of the relay R580, this circuit extending from ground by way of the contacts 228 and 211a, C29, the contacts 542a and the lower winding of R580 to battery. Upon operating, the relay R580 completes, at its contacts 582, a locking circuit for itself, this circuit extending from ground by way of the contacts 546, 542b, 582 and the upper winding of R580 to battery. At its contacts 581, the relay R580 connects marking ground potential to the two dollar marking conductor C464 over a path which extends from ground by way of the contacts 546, the lower winding of R560 and the contacts 563, 581, 551 to the marking conductor C464.

Following operation of the key K1 embodied in the ticket-issuing machine 500 and during the portion of the next operating cycle of the collector switch shown in Fig. 4 when the relay R455 is operated, a circuit including the marking lead C464 is completed for energizing the lower winding of the relay R560 in series with the winding of the two dollar magnet 1072. More specifically, this circuit extends from ground by way of the contacts 546, the lower winding of R560, the contacts 563, 581 and 551, C464, the contacts 455, the take-off lead C36, the contacts 613 and the winding of the magnet 1072 to battery. The resistance of the lower winding embodied in the relay R560 is very low as compared with the resistance of the winding of the magnet 1072 and accordingly the latter winding does not permit sufficient current flow in the above-traced circuit to enable the relay R550 to operate. The magnet 1072, however, operates to attract its armature 1084 and thus release the escapement member 1083. At its contacts 1072a, the magnet 1072, upon operating, interrupts the previously-traced chain circuit over which the relays of the collector switch illustrated in Fig. 4 are energized, thereby to arrest the operation of this collector switch. When the armature 1084 is withdrawn from engagement with the escapement member 1083, this member is driven by the motor 1010 through the clutch mechanism 1020 and the three differential mechanisms 1021, 1022 and 1023 in the manner previously described. During the initial movement of the escapement member 1083 the roller carried by the lower arm thereof operates momentarily to move the contact springs 1083a into engagement, thereby to complete an obvious circuit for energizing the upper winding of the relay R610. When thus energized, the relay R610 immediately operates, to complete, at its contacts 612, a locking circuit for itself, which locking circuit extends from ground by way of the contacts 546, the lower winding of R560, the contacts 563, 581 and 551, the marking lead C464, the contacts 456, the take-off lead C36, the contacts 612 and the lower winding of R610 to battery. At its contacts 613, the relay R610 interrupts the above-traced circuit for energizing the magnet 1072, whereby the armature 1084 of this magnet is retracted to a position for engaging the lower arm of the escapement member 1083 after this member has been moved through an arc of 180 degrees. At its contacts 614, the relay R610 in operating, opens a further point in the previously traced operating circuit for the collector switch shown in Fig. 4, thereby to prevent the continued operation of this collector switch when the magnet 1072 releases to represent the collector switch operating circuit at its contacts 1072a. At its contacts 611, the relay R610 connects the conductor C26 to ground, thereby to complete an obvious circuit for energizing the slow-to-operate relay R285. The purpose of the relay R285 and its associated relay equipment is explained hereinafter.

During rotation of the escapement member 1083, the drum 1000 is, through operation of the clutch 1020 and the differential mechanism 1021, driven to a new setting which represents an addition of two dollars to the total previously registered by this drum, all in the manner previously explained with reference to Figs. 10 to 13, inclusive. Thus, if the drum 1000 occupies one of its normal positions at the time rotation thereof is initiated, it will be operated, during the half revolution of the escapement member 1083, to change the setting of the contact springs 1006 so that the contact springs 1006c and 1006e are respectively engaged and the other contact springs are disengaged. As indicated above, after the escapement member 1083 has been rotated through an angle of 180 degrees the lower arm thereof engages the released armature 1084 of the magnet 1072, thereby to lock the three differential mechanisms 1021, 1022 and 1023 against further operation and thus arrest the rotary movement of the drum 1000.

The lower winding of the relay R610 is of relatively low resistance. Accordingly, when this winding is substituted for the high resistance winding of the magnet 1072 in the above-traced circuit including the lower winding of the relay R560, the current flow over this circuit is increased sufficiently to cause operation of the relay R560. In operating, the relay R560 first completes a holding circuit for itself, this circuit extending from ground by way of the contacts 546, the lower winding of R560, the contacts 562 and the upper winding of R560 to battery. At its contacts 563, the relay R560 interrupts the above-traced circuit over which its lower winding and the lower winding of the relay R610 are being held energized in series, thereby to cause the release of the last-mentioned relay. At its contacts 564, the relay R560 completes a path for impressing ground potential upon the marking lead C574, this path extending from ground by way of the contacts 546 and 564, the lower winding of R570 and the contacts 572 to the marking conductor C574. This conductor extends to the collector switch which is associated with the "total win" adding machine and the grounding of this conductor serves to mark the two dollar ticket sale in this collector switch.

Since as previously explained this collector switch and the adding machine associated therewith are identical to the collector switch and adding machine illustrated in the drawings, the details thereof have not been shown. It will be apparent, however, that soon after the conductor C574 is connected to ground through the lower winding of the relay R570, the collector switch at which this conductor terminates will function to effect operation of the associated adding machine to register the two dollar ticket sale in the same manner that the collector switch and adding machine illustrated in the drawings operated in response to the application of ground potential to the marking lead C464. It will be appreciated, therefore, that shortly following the energization of the relay R560, the relay R570 is energized and operates. In operating, the relay R570, at its contacts 571, completes a locking circuit for itself, this circuit extending from ground by way of the contacts 546 and 564, the lower winding of R570, the contacts 571 and the upper winding of R570 to battery. At its contacts 572, the relay R570 disassociates itself from its associated collector switch and adding machine. At its contacts 573, the relay R570 completes a circuit for energizing the magnets 541 and 520 in series, this circuit extending from ground by way of the contacts 546 and 573, the winding of the magnet 520 and the winding of the magnet 541 to battery.

The relay R560, upon operating, also completes a circuit for energizing the motor start magnet 539, this circuit extending from ground by way of the contacts 546, 542b and 561, and the winding of the magnet 539 to battery. When thus energized, the magnet 539 operates to move the knife switch blade 537a into engagement with its associated contacts 540, thereby to complete an obvious operating circuit for the driving motor 543 of the ticket-issuing machine 500. In addition, the magnet 539 rotates the arm 537b so that the roller 536 carried at the end of this arm is moved out of the detent 534 provided in the cam 532b. The cams 532a and 532b are, through operation of the motor 543, rotated with the drive shaft 533 which is geared to the motor 543. During the initial movement of the cams 532a and 532b, the cam 532a engages the roller 529 and through the arm 526b rotates the member 526 in a counterclockwise direction back to normal against the bias of the resilient member 528. In response to this operation, the contact springs 542a and 542b are respectively disengaged. At the contacts 542b, the above-traced operating circuit for the motor start magnet 539 is interrupted, but without effect, since the roller 536, in cooperation with the arm 537b and the cam 532b, is now effective to hold the switch blade 537a in its operated position to maintain the motor circuit closed until the cams 532a and 532b have completed one revolution and are returned to their respective normal positions. At the contact springs 542a and 542b, the operating and locking circuits for the relay R580 are also interrupted causing this relay to restore.

When the magnet 520 is energized in series with the magnet 541 in response to operation of the relay R570 it attracts its associated armature 521, thereby to move the locking bar 501 to the right. During such movement of the locking bar 501, the camming projection 502' carried thereby is moved out of engagement with the camming element 513 so that the operated key K1 is released and restores to its normal position wherein the contact springs 551 are disengaged. The release of the key K1 also results in the partial restoration of the off-normal bar 502 under the influence of the spring 518, the full release of this bar being prevented due to engagement of the projecting portion of this bar with the stop element 525 carried by the locking bar 501. The bar 502 is, however, moved to the left an amount sufficient to cause disengagement of the contacts 546, thereby to interrupt the previously traced locking circuits for the relays R560 and R570 and the above-traced circuit for energizing the two magnets 520 and 541 in series. Upon the deenergization of the magnet 520, the locking bar 501 and the off-normal bar 502 are restored to their respective normal positions under the influence of the biasing springs 519 and 518 in an obvious manner. In the normal operation of the ticket-issuing machine the magnet 520 will be operated before the machine has completed its cycle of operations and, therefore, before the cam 532a is operated so that the detent 530 is positioned opposite the roller 529. Under such conditions, the energization of the magnet 541 is without effect. If, however, the ticket-issuing machine completes its cycle of operation before the operating circuits of the magnets 520 and 541 are interrupted, the magnet 541 functions to hold the arm member 526 in its normal position, thereby to hold the contact springs 542a and 542b desengaged until after the off-normal contacts 546 are opened. Otherwise, a false operation of the ticket-issuing machines might occur. When the ticket-issuing machine completes its cycle of operation, the roller 536 drops into the detent 534 so that the arm 537b is rotated in a clockwise direction to move the switch arm 537a out of engagement with the contacts 540 and thus interrupt the operating circuit for the motor 543. When the relays R560 and R570 restore in response to the release of the key K1, the circuits associated therewith are restored to normal. Thus, following operation of the cams 532a and 532b to their respective normal positions the ticket-issuing machine is fully released and is in readiness for further operation.

In the units order 600 of the adding machine, the relay R610 is deenergized and restores in response to operation of the relay R560. In releasing, the relay R610 opens its locking circuit, disconnects the conductor C26 from ground, reprepares the operating circuit for the magnet 1072 and recompletes, at its contacts 614, the previously traced operating circuit for the collector switch illustrated in Fig. 4. Thus, operation of the collector switch is again initiated and the units order 600 is conditioned to register additional ticket sales.

From the foregoing explanation with reference to the mechanical arrangement of the units order 600, it will be apparent that if the above-described depression of the key K1 embodied in the ticket-issuing machine 500 results in the operation of the magnet 1072 during a period when the drum is, through operation of the locking magnet 1085, locked against operation, the value of the ticket sale is temporarily stored in the storage device comprising the pinion 1088 and its associated tensioning spring 1091. Under these circumstances, the sun gear 1026 is locked against rotation so that when the escapement member 1083 is released in response to energization of the magnet 1072 the sun gear 1025 is rotated through a predetermined angle indicative of the two dollar sale to tension the spring 1091. It will be apparent that the rotation of the sun gear 1025 in lieu of the opposite sun gear 1026 embodied in the differential mechanism 1021 in no way affects the above-described circuit control operations which result from the depression of the key K1 in the ticket-issuing machine 500. Thus, the escapement member 1083 is locked against further rotation after it has been operated through an angle of 180 degrees and the storage pinion 1088 is left standing in the off-normal position to which it was moved during the rotary movement of the escapement member 1083. When the locking magnet 1085 is deenergized at the end of the total-taking period and its armature 1086 is retracted, the drum is unlocked in an obvious manner. As a result, the spring 1091 functions to drive the storage pinion 1088 back to its normal position and, through operation of the driving connection comprising the gears 1025, 1029, 1030, 1026 and 1039, drives the drum 1000 two steps to a new setting.

In order further to explain the operation of the units order 600 it may be assumed that marking ground potential is impressed upon the two dollar marking conductor C465 in response to a key depression of the ticket-issuing machine to which this conductor extends. When, following the grounding of the marking conductor C465, the relay R455 of the collector switch operates, a circuit extending by way of the take-off conductor C37 and the contacts 623 is completed for energizing the other two dollar magnet 1071. When thus energized, the magnet 1071 attracts its armature 1082 to release the escapement member 1081 and to interrupt, at the contacts 1071a, the previously traced operating circuit for the associated collector switch. When the escapement member 1081 is thus released, rotation thereof is initiated in the manner previously explained. During the initial movement of this member the contacts 1081a are closed to complete an obvious circuit for energizing the upper winding of the relay R620. The relay R620 in operating, locks to ground over the take-off lead C37 and, at its contacts 623, opens the operating circuit for the magnet 1071. The magnet 1071 now retracts its armature 1082 so that operation of the gear train is arrested after the escapement member 1081 has been driven through one half of a half revolution. When the magnet 1071 is deenergized, the contacts 1071a are again closed to reprepare the operating circuit for the collector switch illustrated in Fig. 4. The relay R620 in operating, also completes, at its contacts 621, a path for grounding the conductor C26, thereby to energize the slow-to-operate relay R285, and at its contacts 624, opens another point in the operating circuit for the collector switch. When the relay R620 operates to substitute its lower winding in the series circuit which includes the operating winding of the start relay embodied in the ticket-issuing machine to which the marking lead C465 extends, this ticket-issuing machine is caused to operate in the manner explained above with reference to the ticket-issuing machine 500. In the course of its operation, the ticket-issuing machine in which the two dollar ticket sale is indexed operates to disconnect the lead C465 from ground and thus deenergize the relay R620. The relay R620 now restores to reprepare the operating circuit for the magnet 1071, to disconnect the conductor C26 from ground, and to recomplete the operating circuit for the collector switch. In response to the operation of the escapement member 1081 which occurs in response to the momentary energization of the magnet 1071, the drum 1000 is driven through two steps so that a new setting is imparted to the contact springs 1006 which represents a value two dollars greater than that represented by the previous setting of these contact springs.

The two take-off conductors C36 and C37, over which the two register magnets 1072 and 1071 are respectively controlled from the collector switch illustrated in Fig. 4, are provided for the purpose of enabling a large number of two dollar tickets to be sold as compared with the tickets of greater value. It will be apparent, therefore, that the two take-off conductors C36 and C37 may at times be simultaneously associated with ticket-issuing machines in which two dollar ticket sales have been indexed. For example, it may occur that the key K1 of the ticket-issuing machine 500 is depressed to ground the conductor C464 substantially simultaneously with the depression of a corresponding key in the ticket-issuing machine to which the marking lead C465 extends. Accordingly, the two take-off conductors C36 and C37 will both be grounded when the relay R455 of the collector switch next operates. Thus, the two register magnets 1071 and 1072 are simultaneously energized. In such case, the drum 1000 is rotated through twice the angle of rotation which results from the energization of only one of the two magnets 1071 and 1072, all in the manner previously explained with reference to the mechanical arrangement of the units order 600. It will be recalled from this explanation that if the two magnets 1071 and 1072 are simultaneously energized at a time when the drum 1000 is, through operation of the magnet 1085, locked against rotation, the values of the sales are cumulatively stored through operation of the storage pinion 1088 until the drum is released, at which time the drum 1000 is advanced to add the stored total to its previously registered total under the influence of the spring 1091. From a consideration of the control circuits associated with the magnets 1071 and 1072 and their respective associated control relays R620 and R610, it will be apparent that the simultaneous energization of these two magnets in no way prevents the previously described operations of the two ticket-issuing machines involved from being effected. In short, these operations are concurrently carried out in the exact manner previously explained.

*Five dollar ticket sales*

When a five dollar ticket of the "win" class for event No. 1 is sold, the collector switch illustrated in Fig. 4 picks up and extends marking ground potential to the five dollar take-off conductor C35. For example, if the marking lead C466 is grounded through operation of the No. 1 event key in the ticket-issuing machine to which this conductor extends, ground potential is extended to the take-off conductor C35 over an obvious contact chain in response to operation of the collector switch relay R435. When the conductor C35 is thus grounded a circuit including the contacts 633 is completed for energizing the five dollar magnet 1062. At its contacts 1064, the magnet 1062 interrupts the operating circuit for the collector switch illustrated in Fig. 4, thereby to arrest the operation of this switch. Upon operating, the magnet 1062 attracts its armature 1063, thereby to release the escapement member 1060. As a result, the escapement arm 1060 is rotated through one-half of a revolution in the course of which the drum 1000 is advanced five steps to the position fifth removed from the position occupied thereby at the time the escapement arm 1060 is released, all in the manner previously pointed out. During the initial movement of the member 1060, the contact springs 1068 are engaged to complete an obvious operating circuit for the relay R630. This relay in operating, closes its contacts 631 to ground the conductor C26 and opens its contacts 634 further to interrupt the operating circuit for the collector switch. At its contacts 632, the relay R630 completes a circuit for energizing its lower winding in series with the operating winding of the start relay embodied in the ticket-issuing machine to which the conductor C466 extends. At its contacts 633, the relay R630 opens the operating circuit for the magnet 1062, causing this magnet to retract its armature 1063 so that operation of the drum 1000 is arrested after the escapement member 1060 has been operated through one-half of a revolution. When the ticket-issuing machine terminating the marking lead C466 operates in the manner explained above with reference to the machine 500 to disconnect this marking lead from ground, the relay R630 is deenergized and restores. In releasing, the relay R630 opens its contacts 631 to disconnect the conductor C26 from ground and reprepares, at its contacts 633, the operating circuit for the five dollar register magnet 1062. At its contacts 634, the relay R630 recompletes the operating circuit for the collector switch, whereby operation of this switch is resumed.

From the foregoing explanation with reference to the mechanical arrangement of the units order 600 it will be understood that if the momentary operation of the five dollar magnet 1062 occurs at a time when the drum 1000 is locked against rotation, the five dollar ticket sale will be registered in the storage device comprising the pinion 1088 until the drum is released for further operation, at which time the storage pinion 1088 in cooperation with the spring 1091 functions to advance the drum 1000 to its new setting. It will further be apparent from the foregoing explanation that the five dollar magnet 1062 may be simultaneously energized with one or both of the two dollar magnets 1071 and 1072 and that the magnitude of the angle through which the drum 1000 is rotated is determined by the sum of the ticket sales which the simultaneous energization of two or more of the three magnets represents. For example, if the three marking leads C464, C465 and C467 are all three marked with ground potential and the relay R455 operates, all three of the magnets 1071, 1072 and 1062 embodied in the units order 600 will be energized. In such case, the drum 1000 is driven through nine steps to change the setting of the contact spring 1006 so that a new setting is obtained which represents a value nine dollars greater than the value of the previous setting. If the simultaneous energization of two or more of the three magnets occurs during a period when the drum is locked against operation, the sum of the values designated thereby are temporarily stored in the storage device comprising the pinion 1088 until the drum is released, at which time the drum 1000 is rotated to its new position.

As indicated previously, each time sales totaling ten dollars are registered in the units order 600, the drum 1000 is rotated to one of its normal positions and a carry-over operation to the tens order 700 is effected. More specifically, each time the drum 1000 is moved from one of its two ninth off-normal positions back to the adjacent normal position one of the two lobes 1094a and 1094b carried by the camming element 1094 engages the roller carried by the arm 1093 to shift the carry-over frame 1092 about its axis 1095 so that the escapement member 1183 is released. As a result the escapement member 1183 is driven through one-half of a revolution after which it is again latched as a consequence of the release of the carry-over frame 1092 to position the finger 1097a in the path of rotation of the escapement member 1183. During the operation of the escapement member 1183 through one-half of a revolution the drum 1100 is advanced one step in the manner previously explained, thereby to impart a new setting to the contact springs 1106 which represents a value ten dollars greater than the value represented by the previous setting. It will be understood that a carry-over from the units order 600 to the tens orders 700 cannot occur during a period when the drum 1000 is locked against rotation.

*Ten and fifty dollar ticket sales*

The manner in which the tens order 700 operates to register ten and fifty dollar ticket sales made by the salesmen having at their disposal the ten and fifty dollar ticket-issuing machines associated with the collector switch illustrated in Fig. 4, is substantially similar to the mode of operation of the units order 600 to effect registration of two and five dollar ticket sales. Briefly to consider the operation of the tens order 700, if marking ground potential is impressed upon the ten dollar marking lead C468, for example, through operation of the No. 1 event key of the ticket-issuing machine terminating this marking lead, a circuit is completed for energizing the ten dollar magnet 1171 when the relay R455 of the collector switch operates. This circuit extends by way of the grounded conductor C468, the upper make contacts of the relay R455, the ten dollar take-off lead C32, the contacts 713 and the winding of the magnet 1171 to battery. When thus energized, the magnet 1171 operates its contacts 1171a to open the operating circuit to the collector switch, thereby to arrest operation of this switch. When energized, the magnet 1171 also moves its armature 1182 out of latching engagement with the escapement member 1181. When unlatched the escapement member 1181 starts to rotate and in so doing closes the contacts 1181a to complete an obvious circuit for energizing the upper winding of the relay R710. The relay R710 in operating, closes its contacts 711 to ground the conductor C26, and completes a circuit for energizing itself in series with the operating winding of the start relay embodied in the ticket-issuing machine to which the marking lead C468 extends. At its contacts 713, the relay R710 opens the operating circuit for the ten dollar magnet 1171. At its contacts 714, the relay R710 opens a further point in the collector switch operating circuit. When its operating circuit is interrupted, the magnet 1171 restores to reprepare the collector switch operating circuit and to retract its armature 1182, whereby rotation of the escapement member 1181 is arrested after this member has been rotated through one-half of a revolution. During rotation of the escapement member 1181, the drum 1100 is operated one step in the manner previously described. When the lower winding of the relay R710 is included in the circuit which extends through the operating winding of the start relay embodied in the ticket-issuing machine terminating the marking lead C468, this start relay operates to initiate the operation of the ticket-issuing machine in the manner previously explained with reference to the ticket-issuing machine 500. During the operation of this machine, the marking lead C468 is disconnected from ground, thereby to deenergize the relay R710. The relay R710 in releasing, disconnects the conductor C26 from ground, reprepares the operating circuit for the ten dollar magnet 1171, and, at its contacts 714, recompletes the collector switch operating circuit.

If marking ground potential, designating the sale of a fifty dollar "win" ticket on event No. 1, is present on the fifty dollar marking lead C469, for example, a circuit extending by way of the fifty dollar take-off lead C33 and the contacts 723 is completed for energizing the fifty dollar magnet 1162 when the collector switch relay R435 operates. This magnet in operating, opens, at its contacts 1164, the operating circuit for the collector switch illustrated in Fig. 4 and, at its armature 1163, releases the escapement member 1160. During the initial movement of this escapement member, the contact springs 1168 are closed to complete an obvious circuit for energizing the upper winding of the relay R720. This relay in operating, grounds the conductor C26 and at its contacts 722, completes a circuit for energizing its lower winding in series with the operating winding of the start relay embodied in the ticket-issuing machine to which the fifty dollar marking lead C469 extends. At its contacts 724, the relay R720 opens a further point in the collector switch operating circuit. At its contacts 723, the relay R720 interrupts the circuit for energizing the fifty dollar magnet 1162. This magnet in releasing, reprepares the collector switch operating circuit and retracts its armature 1163 to stop the rotation of the escapement member 1160 after this member has been rotated through an arc of 180 degrees. In response to the rotation of the escapement member 1160 through one-half of a revolution, the register drum 1100 is advanced five steps to a new setting representing a total fifty dollars greater than the total represented by the previous setting of this drum. The relay R720 is subsequently deenergized in response to the operation of the ticket-issuing machine terminating the marking lead C469. Upon releasing, this relay disconnects the conductor C26 from ground, recompletes the operating circuit for the collector switch and reprepares the operating circuit for the fifty dollar magnet 1162. In view of the previous explanation it will be apparent that two or more of the three escapement members 1181, 1183 and 1160 may be simultaneously released to cause operation of the register drum 1100 and that the resulting operation of this drum will serve to impart a new setting to the contact springs 1106 which designates a new total that is greater than the previous total by an amount equal to the aggregate of the ticket sales represented by the escapement members which are released. Thus, if the two escapement members 1181 and 1183 are simultaneously released, the new setting imparted to the contact springs 1106 will represent a total twenty dollars greater than the total represented by the previous setting. Similarly, if the escapement member 1160 and one of the two escapement members 1181 and 1183 are simultaneously released, the total represented by the new setting imparted to the contact springs 1106 is sixty dollars greater than the total represented by the previous setting. Finally, if all of the escapement members 1160, 1181 and 1183 are simultaneously released, the new setting imparted to the contact springs 1106 through operation of the drum 1100 is seventy dollars greater than the total designated by the previous setting. In this regard it will be apparent that the relay R435, for example, of the collector switch illustrated in Fig. 4 is operative simultaneously to connect the marking leads C469 and C470' to the fifty and ten dollar take-off leads C33 and C32, respectively. Accordingly, if both of the marking leads C469 and C470' are grounded at the time the relay R435 operates both of the two register magnets 1171 and 1162 are energized to initiate the operations previously explained. From the foregoing explanation it will also be apparent that if one or more of the escapement members 1160, 1181 and 1183 are released during a period when the drum is, through operation of the magnet 1185 locked against rotation, the ticket sales which resulted in the release of the escapement member or members will temporarily be registered in the storage device comprising the pinion 1188 and the spring 1191 until such time as the period is ended and the locking magnet 1185 is deenergized. When this magnet is deenergized, the spring 1191, in cooperation with the storage pinion 1188, functions to rotate the drum 1100 to a new setting wherein the value of the ticket sales stored is added to the total represented by the previous setting of this drum. It will be apparent that the simultaneous registration of two or more sums designated by the release of two or more of the escapement members 1160, 1181 and 1183, either by the register drum 1100 or the storage pinion 1188, may occur without in any way interfering with the circuit control operations described above. Thus, if the relays R710 and R720 are simultaneously energized the ticket-issuing machines with which these relays are thus operatively associated are caused concurrently to issue tickets in the exact manner described above with reference to the operation of the ticket-issuing machine 500.

Each time ticket sales totaling one hundred dollars are registered in the hundreds order 700, the register drum 1100 is moved from one of its ninth off-normal positions back to the adjacent normal position. In response to this operation one of the two lobes 1194a and 1194b carried by the camming element 1194 is operated through a position in engagement with the roller carried by arm 1193, whereby the carry-over frame 1192 is pivoted about its axis 1195 to move the latching finger 1197a out of engagement with the escapement member 1283. As a result, the escapement member 1283 is released to rotate through one-half of a revolution, following which one of the arms thereof again engages the retracted latching finger 1197a. During such movement of the escapement member 1283 the register drum 1200 is operated one step to impart a new setting to the contact springs 1206 which designates a total greater by one hundred dollars than the total designated by the previous setting of these contact springs. It will be observed that a carry-over of this character from the tens order 700 to the hundreds order 800 cannot occur during a period when the drum 1100 is locked against rotation through operation of the locking magnet 1185. Such a carry-over op-

One hundred dollar ticket sales

The manner in which the hundreds order 800 operates to register one hundred dollar tickets issued by the salesmen attending the hundred dollar ticket-issuing machines associated with the collector switch illustrated in Fig. 4 is substantially the same as the previously described operation of the units and tens orders 600 and 700 to effect the registration of two, five, ten and fifty dollar ticket sales. Briefly to consider the operation of the hundreds order 800, if one of the one hundred dollar marking leads, such, for example, as the lead C473 which extends between the collector switch illustrated in Fig. 4 and one of the hundred dollar ticket-issuing machines, is marked with ground potential a circuit is completed for energizing the magnet 1271 when the relay R400 operates. This circuit extends by way of the grounded marking lead C473, the upper make contacts of the relay R400, the upper break contacts of the relays R405 and R410, the one hundred dollar take-off conductor C34, the contacts 813 and the winding of the magnet 1271 to battery. When energized over this circuit the magnet 1271 operates to interrupt the collector switch operating circuit at its contacts 1271a. In operating, the magnet 1271 also retracts its armature 1282 out of engagement with the escapement member 1281 permitting this escapement member to rotate and complete, at the contact springs 1281a, an obvious operating circuit for the relay R810. The relay R810 in operating, closes its contacts 811 to ground the conductor C26 and opens a further point in the collector switch operating circuit at its contacts 814. At its contacts 812, the relay R810 completes a circuit including the conductors C34 and C473 for energizing its lower winding in series with the operating winding of the start relay embodied in the ticket-issuing machine to which the conductor C473 extends. At its contacts 813, the relay R810 interrupts the operating circuit for the magnet 1271, whereby this magnet restores to reprepare the collector switch operating circuit and to arrest operation of the escapement member 1281 after this member has been rotated one-half of a revolution. During the rotation of the escapement member 1281, the register drum 1200 is advanced one step to impart a new setting to the contact springs 1206 which is one hundred dollars greater than the previous setting of these contacts, all in the manner pointed out previously. In the event the drum 1200 is locked against operation at the time the escapement member 1281 is released, the ticket sale is temporarily registered in the storage mechanism comprising the pinion 1288 and the spring 1291, this temporary registration being transferred to the register drum 1200 in response to the release of the locking magnet 1285. When the ticket-issuing machine terminating the marking conductor C473 operates to disconnect this marking lead from ground, the relay R810 is deenergized and restores. In releasing, the relay R810 disconnects the conductor C26 from ground, reprepares the operating circuit for the magnet 1271 and recompletes the collector switch operating circuit, whereby further operation of this switch is initiated. From the foregoing explanation it will be apparent that the magnet 1271 may be energized to release the escapement member 1281 simultaneous with the operation of the carry-over frame 1192 to release the escapement member 1283. In such case, the register drum 1200 is driven through two steps to impart a new setting to the contact springs 1206 which is two hundred dollars greater than the previous setting thereof.

Each time ticket sales aggregating one thousand dollars have been registered in the hundreds order 800, the drum 1200 is operated from one of its ninth off-normal positions back to the adjacent normal position. During such rotation of the drum 1200 the camming element 1294 is rotated so that one of the lobes 1294a and 1294b carried thereby is operated through a position in engagement with the arm 1293. As a result, the carry-over frame 1292 is momentarily rocked to its off-normal position to move the latching finger 1297a out of engagement with the escapement member 1383 embodied in the thousands order 900. Immediately after this escapement member is released the one of the two lobes 1294a and 1294b which engages the arm 1293 rides out of engagement with this arm, permitting the carry-over frame 1292 to be rocked back to its normal position so that the escapement member 1383 engages the latching finger 1297a after this member has been rotated through one-half of a revolution. When the escapement member 1383 is released, the drum 1300 is rotated one step to impart a new setting to the contact springs 1306 which represents a value one thousand dollars greater than the value represented by the previous setting of these contacts. Since the drum 1200 of the hundreds order 800 is locked against rotation during the periods when the setting of the display panels is being changed, it will be apparent that a carry-over operation of the character just described cannot occur during one of these periods. The carry-over mechanism may, however, be operated to effect release of the escapement member 1383 and, hence, operation of the register drum 1300 immediately after the termination of such a period through operation of the spring 1291 and the storage pinion 1288 to drive the drum 1200 from one of its two ninth off-normal positions back to the adjacent normal position. In a manner similar to that just described, the carry-over mechanism comprising the arm 1393, the camming element 1394 and the carry-over frame 1392 operates to effect a ten thousand dollar registration in the ten thousands order 950 each time ticket sales totaling ten thousand dollars have been registered in the thousands order 900.

When ticket sales aggregating one hundred thousand dollars have been registered in the ten thousands order 950, the register drum embodied in this order is rotated from one of its ninth off-normal positions to the adjacent normal position. During such rotation of the register drum embodied in the order 950, one of the two lobes 1494a and 1494b carried by the camming element 1494 functions momentarily to close the contact springs 1495 and thus complete a circuit extending by way of the contacts 913 for energizing the one hundred thousand register relay R910. This relay in operating, completes a locking circuit for itself which extends from ground by way of the contacts 641, C648, the contacts 912 and the winding of R910 to battery. After this circuit is completed, the relay R910 interrupts its initially completed operating circuit at the contacts 913. At its contacts 911, the relay R910 connects the conductor C914 to ground so that during the next succeeding period when the connect relay R990 operates a path extending by way of the grounded conductor C914 and the contacts 696 is completed for grounding the control lead F which extends to the winding of the control relay embodied in the indicator control unit 306. This control relay in operating, locks to ground over the locking lead C9 and completes a circuit for energizing the digit one indicator lamps of the display 300.

*Terminating ticket sales*

When a ticket selling period expires, the steward attending the control board momentarily operates the ticket-issuing machine locking key 203 to momentarily complete, at the contact springs 203a, an obvious circuit for energizing the relay R235. This relay in operating, interrupts, at its contacts 237, the locking circuit for the relay R225 and, at its contacts 238, opens a point in the operating circuit for the relay R230. At its contacts 236, the relay R235 completes an obvious path for impressing ground potential upon the ticket-issuing machine locking lead C28. When this lead is grounded, the upper or locking winding of the locking magnet 547 embodied in the ticket-issuing machine 500 is energized in an obvious manner. The respective upper windings of the locking magnets individually embodied in the other ticket-issuing machines of the system are also energized over branch circuits commonly including the locking lead C28. When the upper winding of the magnet 547 is energized, the locking plunger 548 is moved upward to enter the depression formed in the end of the locking bar 501, thereby to lock the ticket-issuing machine 500 against further operation. The other ticket-issuing machines of the system are locked against operation in a similar manner. The relay R225, upon restoring, opens a further point in its locking circuit at the contacts 226 and, at its contacts 227, completes the circuit for energizing the lamp 295. At its contacts 228, the relay R225 disconnects the ticket-issuing machine start conductor C29 and the other similar start conductors from ground.

After momentarily operating the key 203, the steward momentarily operates the key 204 to its off-normal position and in so doing completes a circuit for energizing the relays R230, R245 and R325 in parallel. This circuit extends from ground by way of the contacts 204a and 223 to the conductor C13 where it divides, one branch extending through the winding of R245 to battery, the second branch extending through the contacts 238 and the winding of R230 to battery and the third branch extending through the winding of R325 to battery. The relay R325 now operates, to complete, at its contacts 327, an obvious locking circuit for itself. At these same contacts, the relay R325 also completes a multiple holding circuit for the two relays R230 and R245, this circuit extending from ground by way of the contacts 334 and 327 to the conductor C13 where it divides, one branch extending through the winding of R245 to battery and the second branch extending through the contacts 238 and the winding of R230 to battery. At its contacts 326, the relay completes a circuit extending by way of C14 for energizing the relay R220. The relay R220 in operating locks to ground at the engaged contacts 202c, opens the multiple operating circuit for the relays R230, R245 and R325 at its contacts 223, and opens the operating circuit for the dashpot relay R250 at its contacts 221. The relay R230 in operating, completes, at its contacts 231, an obvious circuit for energizing the audible signal device 229. This device in operating serves to notify the public that the ticket selling period is ended and that the events for which they have purchased tickets are about to start. A short time interval following operation of the key 204, the dashpot relay R245 operates, to complete, at its contacts 246, an obvious circuit for energizing the two relays R240 and R247 in parallel. The relay R240 now operates, to complete, at its contacts 241, an obvious circuit for energizing the relay R235. The relay R235 in operating, interrupts the circuit for energizing the relay R230, which latter relay, in turn, restores to open the operating circuit for the signal device 229.

The dashpot relay R247 operates after an interval to complete, at its contacts 248, a circuit extending by way of C11 and the contacts 317 for energizing the relay R330. The relay R330 in operating, opens, at its contacts 334, the above-traced holding circuits for the relays R325 and R245. At its contacts 331, the relay R330 opens a point in the previously traced operating circuits for the relays R340, R345 and R350. At its contacts 333, the relay R330 prepares a circuit for energizing the relay R265. The relay R325, upon restoring, opens a further point in the above-traced locking circuit for itself and the relay R245, and the above-traced operating circuit for the relay R220.

When the relay R330 operates it also opens, at its contacts 332, the previously traced operating circuit for the relay R260. The relay R260 now restores, to open, at its contacts 262, a point in the common portion of the respective operating circuits for the start relays corresponding to and including the relay R400 embodied in the various collector switches. As a result, the operation of all of these switches is arrested at the end of the operating cycles in progress at the time the relay R260 releases. At its contacts 335, the relay R330 completes an obvious locking circuit for itself. Finally, at its contacts 336, the relay R330 completes a circuit extending from ground at the contacts 347 for energizing the relay R315.

The dashpot relay R245, upon releasing in response to the release of the relay R325, interrupts, at its contacts 246, the parallel operating circuits for the two relays R240 and R247, causing both of these relays to restore. The relay R240 in releasing, interrupts the circuit for energizing the relay R235, causing the latter relay to restore and reprepare the operating circuit for the relay R230 and the locking circuit for the relay R225.

The relay R315, upon operating, completes an obvious locking circuit for itself at its contacts 318 and at its contacts 316 interrupts the circuit for energizing the relay R255, whereby the last-mentioned relay is caused to restore. In releasing, the relay R255 opens a further point in the operating circuit for the dashpot relay R250. Thus, no further ground pulses will be transmitted from the relay R250 over the conductor C10 to the relay R315 until the ticket-issuing machine release key 202 is again operated to its off-normal position. The relay R315 in operating, also prepares, at its contacts 319, the previously traced holding circuit for the relay R370 and opens, at its contacts 317, a point in the above-traced operating circuit for the relay R330. At its contacts 320, the relay R315 completes the previously traced operating circuit for the relay R385.

The relay R385 in operating, completes its locking circuit at its contacts 388 and interrupts, at its contacts 386, the circuit for energizing the relay R380, thereby to cause the release of the relay R380 and the operation of the relay R370 in the manner previously described. The relay R380 in releasing, opens its contacts 382 to interrupt the normally completed operating circuit for the relay R390 and the other two relays of similar character, not shown. At its contacts 383, the relay R380 opens a point in the previously traced operating circuit for the relay R345.

The relay R390 in releasing, opens its contacts 391 to disconnect the locking lead C9 from ground and at the other contacts controlled thereby disconnects the other locking leads individual to the other indicator control units from ground. Thus, the sales total being displayed by the digit indicators 300 to 305, inclusive, is wiped out in preparation for the energization of the lamps therein which correspond to the digits of the total sales registered in the associated adding machine at the conclusion on the ticket-selling period.

The relay R370 in operating, prepares, at its contacts 372, an alternative circuit for energizing the slow-to-operate relay R360. In operating, the relay R370 also prepares the previously traced operating circuit for the relay R350, prepares the locking circuit for the relay R345, interrupts the locking circuit for the relay R385 and completes the previously traced locking circuit for itself. At its contacts 371, the relay R370 completes the above-mentioned circuit for energizing the relay R265, this latter circuit extending from ground by way of the contacts 333, 357 and 371, C19 and the winding of R265 to battery. The relay R265 now operates to complete, at its contacts 266, the above-mentioned alternative circuit for energizing the relay R360, this circuit extending from ground by way of the contacts 266, C20, the contacts 372 and the winding of R360 to battery.

The relay R385 in restoring recompletes the operating circuit for the relay R380, which latter relay, upon operating, reprepares the operating circuit for the relay R345 and completes the operating circuit for the three locking control relays including the relay R390. The relay R390 and the other two similar relays, in reoperating, connect ground potential to their respective associated locking leads corresponding to and including the lead C9.

The relay R360, upon operating, at its contacts 363, completes the operating circuit for the relay R355 and, at its contacts 361, completes the previously traced holding circuit for itself. At its contacts 362, the relay R360 opens a further point in the operating circuit for the relay R260. The relay R355, upon operating, recompletes, at its contacts 356, the previously traced operating circuit for the relay R350 and, at its contacts 357, interrupts the above-traced operating circuit for the relay R265. The relay R265 in releasing opens the above-traced operating circuit for the relay R360.

The relay R350 now operates, to complete, at its contacts 351, the previously traced path for grounding the conductor C16, thereby to energize the connect relays R690, R790, etc., and the locking magnets 1085, 1185, etc., embodied in all of the adding machines in use in the system. When the various connect relays operate, new settings are imparted to the indicator control units, such, for example, as the control units 306 to 311, inclusive, so that the final sales totals are displayed by the indicator lamps of the several indicator display frames. For example, when the connect relay R690 is energized the final setting of the contact springs 1006 in the units order 600 is translated into a corresponding numerical digit through operation of the indicator control unit 311, which translation results in the energization of the units lamps in the indicator frame 305 corresponding to the particular digit. In a similar manner, the final settings of the contact springs 1106, 1206, 1306 and the corresponding springs of the ten thousands order 950 are, through operation of the translator relays embodied in the indicator control units 310, 309, 308 and 307, respectively, translated into corresponding numerical digits to cause the energization of the corresponding digit lamps in the indicator frames 304, 303, 302 and 301, respectively. If the aggregate of ticket sales registered in the adding machine comprising the five orders 600, 700, 800, 900 and 950 is in excess of one hundred thousand dollars, the register relay R910 occupies its operated position for the reasons previously explained. Accordingly, when the connect relay R990 operates a circuit is completed for energizing the single translator relay of the hundred thousands indicator control unit 306. This circuit may partially be traced as extending from ground by way of the contacts 911, C914, the contacts 596, the control conductor F and through the operating winding of the translator relay in the indicator control unit 306 to battery. This translator relay in operating, locks to ground as applied to the locking lead C9 and completes a circuit for energizing the No. 1 digit lamps of the hundred thousands display frame 300.

The relay R350 in operating, also completes the previously traced operating circuit for the relay R340, whereby the relays R340 and R345 are caused sequentially to reoperate. The relay R345, upon operating, completes the previously traced locking circuit for itself and the relay R340 and interrupts the locking circuits for the relays R315, R330 and R350, causing all three of these relays to restore. The relay R350, upon releasing, opens the previously traced operating circuits for the relays R340 and R345. The relay R315, upon releasing, recompletes the operating circuit for the relay R255 and interrupts the locking circuit for the relay R370. Since the relay R220 is operated at the time the relay R255 reoperates, the latter relay is not effective to energize the relay R250. The relay R370 now restores to open the locking circuit for the relays R345 and R340. Thus, all of the relays illustrated in Fig. 3, with the exception of the relays R355, R360, R330, R390 and R395, are released.

Release

When there is no further use for the displays posted in the various display units, the steward attending the control board momentarily actuates the reset key 200 to its off-normal position, thereby to initiate certain control operations which result in the restoration of the apparatus to normal. More specifically, when this key is moved to its off-normal position, the contact springs 200b are disengaged to disconnect the conductor C15 from ground, thereby to open a point in the above traced operating and locking circuits for the relays R340, R345 and R350. At the contacts 200c, a circuit extending by way of the conductor C10 is completed for again energizing the relay R315. This relay in operating, again locks to ground at the contacts 347, and, at its contacts 316, again disconnects the conductor C12 from ground to deenergize the relay R255. The release of the relay R255 is without effect.

The relay R315 in operating, also recompletes the operating circuit for the relay R385, thereby to cause the operation of the relay R385, the release of the relay R380 and the operation of the relay R370 in the order named and in the manner pointed out above. When the relay R380 releases, it opens the parallel circuit for energizing the locking control relay R390 and the other two similar relays, whereby these three relays are caused to restore to disconnect the locking leads corresponding to and including the conductor C9 from ground. In response to the removal of ground potential from these leads, the various indicator control units are restored to normal and during the release thereof the energized lamps of the respective associated indicator frames are deenergized. Thus, the existing displays are wiped out. The relay R370 in operating locks to ground at the contacts 375 and opens the previously traced holding circuit for the relay R385, thereby to cause the release of the relay R385 followed by the reoperation of the relays R380 and R390 and the other two relays which correspond to the relay R390. Thus, the indicator control unit locking leads are again connected to ground. The relay R370 in operating, also prepares the operating circuit for the relay R350, but at this time the relay R675 of the release apparatus 650 is operated so that this circuit is held open at the contacts 676'.

When the steward attending the control board momentarily operates the reset key 200 to its off-normal position the contacts 200a are moved into engagement to connect the release conductor C22 to ground, thereby to initiate operation of the register release control apparatus 650. More specifically, when the conductor C22 is grounded an obvious circuit is completed for energizing the release start relay R640. This relay in operating, prepares, at its contacts 642, 643, 644 and 645, reset pulsing circuits to the magnets 1171, 1271, 1371 and the release magnet of the ten thousands order 950. At its contacts 641, the relay R640 disconnects the conductor C648 from ground, thereby to deenergize the relay R910, if operated, and any of the other energized one hundred thousand dollar register relays embodied in the other adding machines. At its contacts 646 and 647, the relay R640 prepares circuits traced hereinafter for delivering restoring pulses to the five and two dollar magnets 1062 and 1072 respectively of the units order 600. Branch pulsing circuits also extending to the contacts 646 and 647 are also prepared for delivering release pulses to the five dollar magnet and one of the two dollar magnets of each of the other units orders embodied in the system when the relay R640 operates.

Immediately following the operation of the reset key 200 to ground the release conductor C22, the continuously driven pulsing element 661 embodied in the pulsing apparatus 660 operates to transmit a current pulse to the lower winding of the pulse absorbing relay R675 over a circuit including the grounded conductor C22, the conductive segment of the pulsing element 661, the contact springs 678 and the lower winding of R675 to battery. When energized over this circuit, the two-step relay R675 partially operates, to complete, at the preliminary make contacts 676, a path for short-circuiting its upper winding, this path extending from the conductor C22 through the conductive segment of the pulsing element 661, the contact springs 678, the upper winding of R675 and the contacts 676 back to the conductor C22. At its preliminary break contacts 676', the relay R675 opens a point in the previously traced operating circuit for the relay R350. When the first pulse is ended, the short-circuiting path traced above is interrupted by the pulsing element 661, permitting the two windings of the relay R675 to be energized in series over a circuit extending through the contacts 676 to the grounded conductor C22. When its two windings are thus energized the relay R675 completes its operation, to open, at its contacts 678, the initially completed circuit for energizing its lower winding. At its contacts 677, the relay R675, upon fully operating, prepares a circuit for energizing the relay R665. At its contacts 679, the relay R675 prepares a circuit for energizing the operating magnet 687 of the sequence switch 662. At the beginning of the next pulse a circuit is completed for energizing the lower winding of the relay R665 in parallel with the winding of the magnet 687, one branch of this circuit extending from the grounded conductor C22 by way of the conductive segment of the pulsing element 661, the contacts 677 and 668 and the lower winding of R665 to battery; and the second branch extending from the grounded release conductor C22 through the pulsing element 661 and by way of the contacts 679 and 669 and the winding of the magnet 687 to battery. When energized over the circuit just traced, the two-step relay R665 partially operates, to complete, at its preliminary make contacts 667, a path for short-circuiting its upper winding, this path extending from the release conductor C22 by way of the contacts 667, the upper winding of R665, the contacts 668 and 677 and the pulsing element 661 back to the conductor C22. At the end of the second pulse, the pulsing element 661 functions to interrupt the short-circuiting path just traced permitting the two windings of the relay R665 to be energized in series over a circuit extending through the contacts 667 to the grounded release conductor C22. The relay R665 now completes its operation, to open, at its contacts 669, the preliminary pulsing circuit to the operating magnet 687 of the sequence switch 662. At its contacts 668, the relay R665 opens a point in its initially completed operating circuit. At its contacts 666, the relay R665 prepares a path for transmitting restoring pulses over the pulsing leads C648 and C651 to C656, inclusive, to certain of the register magnets embodied in the orders of the various adding machines of the system.

At the end of the second pulse which occurs following operation of the reset key 200, the pulsing element 661 interrupts the above-traced circuit for energizing the operating magnet 687 of the sequence switch 662. As a result, this magnet, in cooperation with its associated ratchet and pawl mechanism, operates to advance the wipers 685, 686 and 686' from their illustrated normal positions into engagement with their respective associated first contacts. When the wipers 685, 686 and 686' are thus moved off-normal, the off-normal springs 688 are closed in a well-known manner to complete obvious locking circuits for the relays R675, R665 and R640 and to complete an obvious alternative path for grounding the conductive segment of the pulsing element 661.

With the relays R665 and R640 operated and the wipers 685, 686 and 686' standing in engagement with their respective associated first contacts, four restoring pulses are transmitted to the two dollar magnet 1072 of the units order 600 and over branch circuits to the corresponding two dollar magnets of each of the other adding machines embodied in the system. The circuit over which these impulses are transmitted to the magnet 1072 may be traced as extending by way of the grounded conductor C22, the pulsing element 661, the contacts 684 and 666, the wiper 685 and its associated first contact, the contacts 682 and 647, the pulsing lead 656, the left pair of springs in the off-normal spring pile 1006f and the winding of the magnet 1072 to battery. Each time the magnet 1072 is energized over this circuit it attracts its associated armature 1084 to release the escapement mechanism 1083. Accordingly, rotary movement is imparted to the escapement member 1083 through the driving connection which extends to the drive shaft 1011. The speed of rotation of the pulsing element 661 is such that the duration of each pulse transmitted to the magnet 1072 is substantially less than the period required for the escapement member 1083 to be driven through an arc of 180 degrees. Accordingly, the magnet 1072 is deenergized to retract its armature 1084 before the escapement member 1083 is rotated through one-half of a revolution. Thus, the escapement member 1083 is locked against rotary movement after being released at the beginning of each restoring pulse. It will be noted that during the initial movement of the escapement member 1083, the operating circuit for the relay R610 is completed. Since during the release of the apparatus the collector switch illustrated in Fig. 4 is not operating, no holding circuit is prepared for the relay R610. Accordingly, the relay R610 restores immediately the contacts 1083a are separated in response to further rotation of the escapement member 1083. Assuming that the register drum 1000 does not occupy one of its normal positions at the time the transmission of restoring pulses to the magnet 1072 is started, this drum may be advanced as many as eight positions from the off-normal position initially occupied thereby at the outset of the release operation in response to the four impulses which are successively delivered to the magnet 1072. In this connection it is pointed out that if the drum 1000 occupies one of its normal positions at the time release of apparatus is initiated, the two pairs of off-normal springs 1006f are respectively disengaged so that no restoring pulses can be transmitted over the above-traced circuit to the magnet 1072. If, at the end of any one of the first four pulses transmitted to this magnet, the drum 1000 is left standing in one of its two normal positions the off-normal springs 1006f are respectively disengaged in an obvious manner so that the remaining pulses are without effect to cause further operation of the magnet 1072. In short, the drum 1000 is driven ahead to the next adjacent normal position after which the off-normal springs 1006f are disengaged to prevent further restoring pulses from being transmitted to the magnet 1072.

It will be apparent from the preceding explanation that if the drum 1000 occupies an odd numbered off-normal position, such, for example, as the first, third or fifth positions, the transmission of restoring pulses to the two dollar magnet 1072 will not alone suffice to cause the drum 1000 to be rotated back to one of its normal positions. This is true for the reason that the drum 1000 is advanced two positions in response to each energization of the magnet 1072 and, hence, may be operated through one of its normal positions in response to a single restoring pulse transmitted to the magnet 1072. Accordingly, provisions are made in the release control apparatus 650 for transmitting a restoring pulse to the five dollar magnet 1062 after four restoring pulses have been transmitted to the two dollar magnet 1072, thereby to advance the drum 1000 either to one of its two normal positions or to an even numbered off-normal position. After this restoring pulse is transmitted to the five dollar magnet 1062, six additional restoring pulses are transmitted over the two dollar pulsing lead C656. As many as four of these additional pulses may be utilized in order to advance the drum 1000 from an occupied even numbered off-normal position to the next succeeding normal position.

To this end, the rotary switch 663 is provided which operates as a restoring pulse counter. More specifically, the operating magnet 672 of the rotary switch 663 is energized and deenergized in response to each impulse generated through operation of the pulsing element 661 following the complete operation of the relay R665. The circuit for energizing this magnet extends by way of the grounded release conductor C22, the pulsing element 661, the contacts 684 and 666 and the winding of the magnet 672 to battery. Each time this magnet is energized and deenergized it cooperates with its associated ratchet and pawl mechanism, not shown, to advance the wiper 671 one step. Accordingly, after four impulses have been transmitted to the magnet 672 and over the pulsing lead 656 to the magnet 1072, the wiper 671 is advanced four steps from its normal position as shown in the drawings into engagement with its associated fourth contact. With the wiper 671 occupying this position an obvious circuit is completed for energizing the pulse transfer relay R680. In operating, the relay R680 interrupts, at its contacts 682, the above-traced circuit for transmitting restoring pulses to the two dollar magnet 1072. At its contacts 681, the relay R680 completes a circuit for transmitting the next or fifth restoring pulse to the five dollar magnet 1062, similar circuits being completed to each of the other five dollar magnets individually embodied in the other adding machines of the system. The circuit for energizing the magnet 1062 extends by way of the grounded release conductor C22, the pulsing element 661, the contacts 684 and 666, the wiper 685, the contacts 681 and 646, the pulsing lead C655, the right pair of off-normal springs 1006f and the winding of the magnet 1062 to battery. In response to the momentary energization of the magnet 1062 which occurs when this circuit is momentarily completed, the escapement member 1060 is released and operates through one-half of a revolution, whereby the drum 1000 is advanced five positions in the manner previously explained. During such rotation of the escapement member 1060, the operating circuit for the relay R630 is momentarily completed at the contacts 1068, but the resulting momentary operation of this relay is without effect. As indicated above, if, at the outset of the restoring operation the drum 1000 occupies an odd numbered off-normal position, operation of the five dollar magnet 1062 in the manner just explained serves to advance this drum either to a normal position or to an even numbered off-normal position. From any even numbered off-normal position the drum 1000 may obviously be advanced to one of its two normal positions in response to from one to four additional restoring pulses transmitted to the two dollar magnet 1072. If the drum 1000 occupies one of its fifth off-normal positions at the time the magnet 1062 is energized, the drum 1000 will be advanced to one of its two normal positions in response to operation of the magnet 1062. In such case, the off-normal springs 1006f are respectively disengaged and the four restoring pulses subsequently generated for transmission to the two dollar magnet 1072 are without effect.

At the end of the fifth pulse which is transmitted to the operating magnet 672 of the switch 663 in parallel with the respective five dollar magnets of the several adding machines embodied in the system, the magnet 672 releases to advance the wiper 671 out of engagement with its associated fourth contact and into engagement with its associated fifth contact. In response to this movement of the wiper 671 the relay R680 is deenergized and restores. In releasing, this relay opens, at its contacts 681, the prepared pulsing circuits extending to the respective five dollar magnets of the adding machines and reprepares, at its contacts 682, the pulsing circuits which respectively extend to the two dollar magnets corresponding to and including the magnet 1072 of the units order 600. If the drum 1000 has not previously been restored to one of its normal positions it will necessarily be left standing in one of these positions at the end of one of the four additional restoring pulses transmitted to the magnet 1072. As indicated above, when this drum is left standing in a normal position at the end of a restoring pulse the off-normal springs 1006f are disengaged to prevent further pulses from being delivered to either of the two magnets 1062 and 1072.

In view of the preceding explanation it will be apparent that in restoring the drum 1000 to one of its normal positions, this drum may be operated to a normal position either one or two times which, of course, means that the drum is operated from one of its ninth off-normal positions to a normal position as many as two times. It will further be recalled from the preceding explanation that each time this drum is operated from one of its ninth off-normal positions back to normal a carry-over operation between the units and tens orders 600 and 700 occurs to cause the advancement of the drum 1100 to a new setting, this carryover being effected through operation of the camming element 1094 in conjunction with the arm 1093 and the carryover frame 1092. It is imperative, therefore, that the units order 600 be restored to normal before the restoration of the tens order 700 is started since, otherwise, the drum 1100 of the tens order 700 might be left standing in one of its off-normal positions.

Since the impulse counting switch 663 is a standard eleven-point switch, a total of eleven pulses must be transmitted to the operating magnet 672 in order to advance the wiper 671 from its normal position through all of its off-normal positions back to normal. Only the first nine of these pulses are utilized in any case to effect restoration of the various orders embodied in the several adding machines. At the end of the tenth pulse the wiper 671 is advanced to engage its associated tenth contact, thereby to complete an obvious circuit for energizing the magnet 687. This magnet is deenergized in an obvious manner when the wiper 671 is advanced to normal at the end of the eleventh pulse. When thus energized and deenergized, the magnet 687, in cooperation with its associated ratchet and pawl mechanism, functions to advance the wipers 685, 686 and 686' into engagement with their respective associated second contacts. In response to this operation of the wiper 685, the above-traced circuit for transmitting restoring pulses over the two and five dollar pulsing leads C655 and C656 is interrupted and a similar circuit is prepared for transmitting restoring pulses over the ten dollar pulsing lead C654 to the ten dollar magnet 1171 embodied in the tens order 700 and the corresponding magnets of each of the other adding machines. More specifically, the circuit for energizing the ten dollar magnet 1171 extends by way of the grounded release conductor C22, the pulsing element 661, the contacts 684 and 666, the wiper 685 and its associated second contact, the contacts 645, the ten dollar pulsing lead C654, the off-normal springs 1106f and the winding of the magnet 1171 to battery. If the drum 1100 is standing in one of its normal positions such that the off-normal springs 1106f are disengaged, no restoring pulses can be transmitted to the magnet 1171 when the switch 662 is operated to the position for delivering restoring pulses to the tens orders.

Each time the ten dollar magnet 1171 of the tens order 700 is momentarily energized over the circuit just traced it functions to release the escapement member 1181 for rotation through one-half of a revolution. The momentary energization and operation of the relay R710 which occurs in response to this operation of the escapement member 1181 is without effect. As explained previously, each time the escapement member 1181 is released and operates through one-half of a revolution the register drum 1100 is advanced one step. Accordingly, in response to one of the first nine restoring pulses transmitted over the pulsing lead C654 the register drum 1100 is moved to one of its two normal positions, wherein the off-normal springs 1106f are disengaged to interrupt the release circuit extending through the winding of the magnet 1171. After these contact springs are disengaged, the remaining restoring pulses transmitted over the ten dollar pulsing lead C654 are without effect to cause further operation of the magnet 1171. It will be understood from the previous explanation that when the drum 1100 is, during the restoring operation, moved from one of its two ninth off-normal positions to a normal position a carry-over from the tens order 700 to the succeeding order 800 occurs which results in the advancement of the register drum 1200 to a new setting.

After ten restoring pulses have been transmitted over the ten dollar pulsing lead C654 and each of the other corresponding leads, the wiper 671 of the pulse counting switch 663 is again advanced to engage its associated tenth contact, thereby to complete the operating circuit for the magnet 687 of the sequence switch 662. When the wiper 671 is thereafter advanced to normal, this circuit is interrupted and the magnet 687 operates to advance the wipers 685, 686 and 686' into engagement with their associated third contacts. In response to this operation the pulsing circuit to the ten dollar pulsing leads is broken, at the wiper 685, and a similar circuit is prepared for transmitting restoring pulses over the one hundred dollar pulsing lead C653 and the other leads corresponding thereto. More specifically, restoring pulses are transmitted to the magnet 1271 of the hundreds order 800 over a circuit which extends by way of the grounded release conductor C22, the pulsing element 661, the contacts 684 and 666, the wiper 685 and its associated third contact, the contacts 644, C653, the off-normal springs 1206f and the winding of the magnet 1271 to battery. Restoring pulses are also transmitted to the one hundred dollar magnet of each of the other hundreds order individually included in the other adding machines of the system. It will be obvious that if the drum 1200 occupies a normal position at the time the sequence switch 662 is advanced to the position for transmitting restoring pulses over the pulsing lead C653, these restoring pulses are without effect to cause energization of the magnet 1271. On the other hand, if the drum 1200 occupies one of its off-normal positions the magnet 1271 is momentarily energized in response to each restoring pulse transmitted thereto to effect advancement of the register drum 1200 to normal in a step-by-step manner. At this time, the off-normal springs 1206f are disengaged to prevent further pulses from being transmitted to the magnet 1271. It is pointed out that the momentary energization and operation of the relay R810 which occurs in response to each restoring pulse transmitted to the magnet 1271 is without effect. As the drum 1200 is operated from one of its ninth off-normal positions back to normal in response to a restoring pulse transmitted to the register magnet 1271 a carry-over from the hundreds order 800 to the succeeding order 900 occurs to cause advancement of the register drum 1300 in the manner previously described.

When the wiper 671 of the pulse counting switch 663 is again operated to engage its associated tenth contact, the operating circuit for the magnet 687 is again completed. When thereafter the wiper 671 is advanced to normal, the magnet 687 operates to advance its wipers 685, 686, and 686' another step, thereby to break the pulsing path to the one hundred dollar pulsing leads and to complete similar paths for transmitting restoring pulses over the thousand dollar pulsing leads corresponding to and including the lead C652. In the event the register drum 1300 does not stand in one of its normal positions at the time the sequence switch 662 is operated to associate the pulsing element with the thousand dollar pulsing lead C652, a circuit is completed for energizing the restoring magnet 1371 of the thousands order 900 during each revolution of the pulsing element 661. This circuit extends by way of the grounded release conductor C22, the pulsing element 661, the contacts 684 and 666, the wiper 685 and its associated fourth contact, the contacts 643, C652, the off-normal springs 1305f and the winding of the magnet 1371 to battery. Each time the restoring magnet 1371 is momentarily energized over this circuit it operates to release the escapement member 1383, whereby the register drum 1300 is advanced one step. After a predetermined number of pulses have been delivered to the magnet 1371, as determined by the initial setting of the drum 1300, this drum is returned to one of its normal positions. At this time, the off-normal springs 1306f are disengaged to open the pulsing circuit to the restoring magnet 1371. As the register drum 1300 is advanced from one of its ninth off-normal positions back to normal a carry-over from the thousands order 900 to the succeeding order 950 is effected in the manner previously explained, whereby the register drum of the ten thousands order 950 is advanced to a new setting. After eleven pulses have been transmitted over the thousand dollar pulsing lead C652, the wipers of the sequence switch 662 are advanced an additional step in a manner clearly apparent from the preceding explanation. In response to this operation, the path for transmitting pulses over the pulsing lead C652 is broken and a corresponding path is completed for transmitting restoring pulses over the ten thousand dollar pulsing lead C651 and the other leads corresponding thereto. The manner in which the register drum of the ten thousands order 950 is advanced to normal in response to the pulses transmitted over this lead is exactly the same as described above with reference to the restoration of the thousands order 900. As the register drum of the order 950 is moved to one of its normal positions the contact springs 1495 are momentarily operated into engagement to complete the operating circuit for the register relay R910. Since the locking circuit for the relay R910 is now open at the contacts 641, this relay only momentarily operates in response to the momentary engagement of the contacts 1495.

After eleven restoring pulses have been transmitted over the ten thousand dollar pulsing lead C651, the wipers of the sequence switch 662 are advanced to engage their respective associated sixth contacts under the control of the pulse counting switch 663. At the wiper 686', an obvious circuit is completed for energizing the slow-to-release relay R683 which relay now operates and remains operated until the sequence switch 662 is restored to normal. At its contacts 684, the relay R683 opens the above-traced circuit for transmitting pulses to the operating magnet 672 of the counting switch 663. Thus, the counting switch 663 is left standing in its normal position after the wipers of the sequence switch 662 have been operated to engage their associated sixth contacts. When the wiper 686 is operated to its sixth off-normal position an alternative circuit is completed for energizing the operating magnet 687, this circuit extending from ground by way of the multipled sixth to tenth contacts of the contact set associated with the wiper 686, the contacts 689 and the winding of the magnet 687 to battery. Due to the circuit-interrupting action of the contacts 689 under the control of the magnet 687, this magnet operates buzzer fashion rapidly to drive the wipers 685, 686 and 686' back to normal. When the wiper 686 is moved to its normal position, the alternative circuit for energizing the magnet 687 is interrupted to arrest operation of the switch 662, and the off-normal springs 688 are disengaged. At the wiper 686', the operating circuit for the relay R683 is interrupted when the wipers of the switch 662 are restored to normal. This relay restores after an interval to reprepare, at its contacts 684, the previously traced pulsing circuits. When the springs 688 are opened, the release conductor C22 is disconnected from ground to cause the deenergization and release to the three relays R675, R665 and R640. Thus, the release control apparatus 650 is fully restored to normal. In this regard it is pointed out that the time interval required for the release control apparatus 650 to complete a cycle of operation is considerably in excess of the period during which the reset key 200 is held operated at the control board. Accordingly, the release of the apparatus 650 is normally automatically effected in the manner just explained after this apparatus has operated through one complete cycle. In any case, if the release key 200 is held in its off-normal position after all of the adding machines have been restored to normal, thereby to continue operation of the apparatus 650 this apparatus will simply operate through one or more additional cycles, but without effect.

When the reset key 200 is released by the steward attending the control board, the contact springs 200c are disengaged to open a point in the above-traced operating circuit for the relay R315 and the contact springs 200b are moved into engagement further to prepare the previously traced operating circuit for the relay R350. After the release control apparatus 650 has completed a cycle of operation and has restored to normal in the manner explained above, the circuit for energizing the relay R350 is completed. More specifically, when the relay R675 releases this circuit is closed at the contacts 676'. The relay R350 now operates to cause the sequential operation of the relays R340 and R345 in the manner pointed out above. In addition, the relay R350 completes, at its contacts 351, the path for grounding the conductor C16, thereby to energize the connect relays R690, R790, etc., and the locking magnets 1085, 1185, etc., respectively embodied in the different orders of the several adding machines. When the indicated connect relays are energized they operate to cause the energization of the zero digit lamps embodied in all of the display units. If, for any reason, any of the orders have not been properly restored to normal this condition will be indicated by the energization of the indicator lamps associated therewith which designate digits other than the digit zero. Thus, the steward is able to check the release of the several adding machines.

The relay R345, upon operating, opens the locking circuit for the relay R315 and interrupts the operating circuit for the relay R350, causing both of these relays to restore. The relay R315 in releasing, recompletes the above-traced circuit for energizing the relay R255. The relay R255 now operates to prepare the operating circuit for the dashpot timing relay R250. At its contacts 319, the relay R315 interrupts the above-traced locking circuit for the relay R370. The relay R370 in releasing opens the holding circuits for the relays R345 and R340, causing both of these relays to restore. In restoring, the relay R350 disconnects the conductor C16 from ground, thereby to deenergize the locking magnets and the connect relays respectively embodied in the adding machines in use in the system. Thus the system is fully restored to normal.

The preliminary operations required to condition the apparatus for the sale and totalization of tickets to be issued for subsequent events are substantially the same as described above. It will be recalled from the preceding explanation, however, that when a final display indication is obtained at the end of a ticket-selling period, the relay R360 is locked up over a holding circuit which extends to ground through the contact springs 202a of the key 202. With the relay R360 in its operated position, the operating circuit for the relay R260 is held open at the contacts 362. Accordingly, the relay R260 is deenergized so that the collector switch start circuits are held open at the restored contacts 262 thereof. When the steward attending the control board operates the key 202, however, these collectors switch start circuits are completed, at the contacts 262, in response to the release of the relay R370 followed by the operation of the relay R260 which occurs in response to disengagement of the switch springs 202a.

Event lockout control

In operating the apparatus, instances may occur when certain of the possible entries are canceled and, therefore, no tickets are to be issued with respect thereto. As explained previously, in order to prevent the issuance of tickets under these circumstances the control board is equipped with a group of twelve event lockout keys of which the keys 207 and 208, respectively corresponding to entries Nos. 1 and 12, are illustrated. Each of these keys is employed to operate "win," "place" and "show" event lockout relays, such, for example, as the relays R270, R271 and R272 which respectively correspond to the "show," "place" and "win" tickets for entry No. 1.

If the key 207, for example, is operated to its off-normal position the contact springs 207a thereof are closed to complete an obvious circuit for energizing the signal lamp 293 in parallel with the three relays R270, R271 and R272. The relay R272, upon operating, opens, at its contacts 273, a point in the previously traced start circuit for the collector switch illustrated in Fig. 4 and associated with the No. 1 entry "win" adding machine, thereby to arrest operation of this collector switch after it has completed the cycle of operation in progress at the time the relay R272 is energized. At is contacts 274, the relay R272 opens a point in the above-traced circuit for energizing the locking magnets 1085, 1185, etc., and the connect relays R690, R790, etc., of the No. 1 event "win" adding machine illustrated in the drawings. The relays R270 and R271 effect corresponding circuit changes in the No. 1 entry "place" and "show" control circuits. In a similar manner, any one of the other entry lockout keys may be operated for the purpose of locking out the apparatus individual to the other twelve entries.

For each of the twelve adding machines of a group there is also provided an alarm relay R285. A pair of associated alarm relays R280 and R275 controlled by any of the relays corresponding to and including the relay R285 are also provided. The relay R285 individual to the No. 1 "win" entry adding machine illustrated in the drawings is arranged to be energized over a circuit including the conductor C26 when ground potential is impressed upon this conductor for a substantial and continuous period. If desired or necessary, the relay R285 may be provided with a dashpot in order to obtain the required slow-to-operate characteristic. In this regard it will be recalled from the preceding explanation that each time one of the register magnets embodied in the different orders 600, 700 and 800 is operated to effect registration of a ticket sale, the associated one of the relays R610, R620, R630, etc., is also momentarily operated to impress ground potential upon the conductor C26 and thus complete the operating circuit for the relay R285. If ground potential is held upon this conductor C26 for a sustained period it indicates that one of the associated orders is in improper working order. Under these circumstances, the relay R285 operates, to complete, at its contacts 287, an obvious circuit for energizing the slow-to-operate alarm relay R280 common to the "win" adding machines for the twelve entries. At its contacts 288, the relay R285 prepares a circuit for energizing the lower winding of the relay R272. At its contacts 286, the relay R285 opens a point in the previously traced operating circuit for the collector switch illustrated in Fig. 4 of the drawings, thereby to arrest operation of this collector switch and thus prevent possible loss of the registration of ticket sales. If the conductor C26 is not disconnected from ground for a predetermined time interval, the relay R280 operates, to complete, at its contacts 282, the above-mentioned circuit extending through the contacts 288 for energizing the relay R272. At its contacts 281, the relay R280 completes an obvious circuit for energizing the lower winding of the relay R275. The relay R272 in operating, performs the functions described previously, namely, interruption of the start circuit extending to the collector switch illustrated in Fig. 4 of the drawings and the interruption of the circuit for energizing the connect relays and locking magnets of the different orders included in the No. 1 entry "win" adding machine illustrated in the drawings. The relay R275, in operating, completes, at its contacts 276, an obvious circuit for energizing the alarm signal lamp 289. At its contacts 277, the relay R275 completes an obvious circuit for energizing the audible signal device 278, whereby the steward is informed that a fault exists in the system. Further, by observing the lighted condition of the signal lamp 289, the steward is informed that the fault is present in an adding machine of the "win" group. He can then ascertain which adding machine of this group is faulty by noting which of the lamps corresponding to and including the lamp 290, 291 and 292 of this group is lighted. From the foregoing explanation it will be obvious that the "win," "place" and "show" switches 211, 210 and 209 control the adding machines and ticket-issuing machine of the "win," "place" and "show" groups respectively. Any one of these switches may, therefore, be operated to render inactive any one of the three groups of ticket-issuing machines and their associated adding machines.

While there has been described what is at present considered to be the preferred embodiment of the invention, it will be understood that various modifications may be made therein, and it is contemplated to cover in the appended claims all such modifications as fall within the true spirit and scope of the invention.

What is claimed is:

1. In a totalizing system, value indexing apparatus, register means, storage means controlled by said apparatus and operative to store the total of values indexed in said apparatus during an interval when said register means is locked against operation and for transferring the stored total to said register means when said register means is released for further operation, indicating means for displaying the total of the values indexed in said apparatus, cyclically operating means, means controlled by said cyclically operating means for intermittently locking said register means against operation and for then releasing said register means for further operation, means controlled by said cyclically operating means for changing the total displayed by said indicating means so that it corresponds to the total registered by said register means during each period when said register means is locked against operation, and means controlled by said apparatus for entering values indexed in said apparatus directly in said register means while the said register means is not locked during periods when said storage means is inactive and during periods when stored totals are being transferred from said storage means to said register means.

2. In a totalizing system, ticket-issuing apparatus for issuing tickets of the same and different denominations, register means including register elements each normally operative under the control of said apparatus to total the values of tickets of one or more denomiations issued by said apparatus, storage devices individually associated with said register elements and individually operative to store the total value of tickets of the respective corresponding denominations issued during an interval when said register elements are locked against operation and for transferring their stored totals to their respective associated register elements when said register elements are released for further operation, indicating means for displaying the total value registered by said register means, means for intermittently locking said register elements against operation and for then releasing said register elements for further operation, and means for changing the total displayed by said indicating means so that it corresponds to the total registered by said register means during each period when said register elements are locked against operation.

3. In a totalizing system, a plurality of ticket-issuing machines for issuing tickets of the same and different denominations, register means including register elements each operative to total the values of tickets of one or more denominations issued by said machines, means for successively connecting said register elements to be controlled by different ones of the corresponding ticket-issuing machines so that the values represented by operation of the corresponding ticket-issuing machines are totaled by said register elements, storage devices individually associated with said register elements and individually operative under the control of said second-named means to store the total value of tickets of the respective corresponding denominations issued by said machines during an interval when said register elements are locked against operation and to transfer their stored totals to their respective associated register elements when said register elements are released for further operation, indicating means for displaying the total value registered by said register means, means for intermittently locking said register elements against operation and for then releasing said register elements for further operation, and means for changing the total displayed by said indicating means so that it corresponds to the total registered by said register means during each period when said register elements are locked against operation.

4. In a totalizing system, a ticket-issuing machine, a register element, an indexing magnet including an armature, an escapement member normally locked against operation by said armature and released by said armature when said magnet is energized, a gear train connecting said escapement member and said register element to prevent operation of said register element when said escapement member is locked against operation by said armature, driving means for actuating said register element and for driving said escapement member through said gear train when said escapement member is released, means including a circuit extending to said ticket-issuing machine for energizing said magnet each time a ticket is issued by said machine, means for locking said register element against operation for an interval and for then releasing said element for further operation, storage means including a storage pinion driven by said driving means in response to operation of said magnet during said interval and also auxiliary drive means driven by said pinion for operating said register element when said element is released, and means operative in response to each operation of said magnet for deenergizing said magnet to release said armature during the initial movement of said escapement member, whereby said escapement member is locked against further operation by said armature after said register element or said storage means is operated a predetermined amount designating the value of one ticket issued by said machine.

5. In a totalizing system which includes a plurality of ticket-issuing machines, register apparatus including means controlled by said machines for simultaneously registering in one continuous operation the total value of a plurality of tickets concurrently issued by said machines, storage means controlled by said machines and operative to store the total value of tickets issued by said machines during an interval when said register apparatus is locked against operation and for then transferring the stored total to said register apparatus when said register apparatus is released, said storage means being operative simultaneously to store in one continuous operation the total value of a plurality of tickets concurrently issued by said machines during an interval when said register apparatus is locked against operation, indicating means for displaying the total value of tickets issued by said machines, means for intermittently locking said register apparatus against operation and for then releasing said register apparatus for further operation, and means for changing the total displayed by said indicating means so that it corresponds to the total registered by said register apparatus each time said register apparatus is locked against operation.

6. In a totalizing system, ticket-issuing apparatus for concurrently issuing tickets of identical character and the same denomination, a register element, a plurality of electromagnetic register control devices, means including circuits extending between said apparatus and said devices for simultaneously energizing a plurality of said control devices when tickets are to be issued by said apparatus, means operative in response to simultaneous operation of a plurality of said control devices for causing said register element continuously to operate until the total value represented by the operated control devices is added to the total registered thereby, and means responsive to the simultaneous operation of said control devices for controlling said apparatus over said circuits to cause said apparatus concurrently to issue tickets corresponding in number to the number of operated control devices.

7. In a totalizing system, a plurality of ticket-issuing machines for issuing tickets of the same or different values, marking leads individually extending to said ticket-issuing machines, means in each machine for marking the associated lead when operated to issue a ticket, a register element, a plurality of control devices each operative when connected to a marked one of said leads, a cyclically operative collector switch having a plurality of settings and operative to connect a plurality of marked leads to different ones of said control devices when operated to any one of said settings, whereby a plurality of said control devices may be simultaneously operated, means operative in response to simultaneous operation of a plurality of said control devices for causing said register element continuously to operate until the total of the values represented by the operated control devices is added to the total registered thereby, and means responsive to simultaneous operation of a plurality of said control devices for controlling over said marked leads the ticket-issuing machines to which said operated control devices are connected to cause the connected ticket-issuing machines concurrently to issue tickets.

8. In a totalizing system, a ticket-issuing machine, a register element, an electromagnetic register control device including an armature, an escapement member normally locked against operation by said armature and released by said armature when said control device is energized, a gear train connecting said escapement member and said register element to prevent operation of said register element when said escapement member is locked against operation by said armature, continuously operated driving means, means including a slip connection between said driving means and said register element for actuating said register element and said gear train when said escapement member is released, means including a circuit extending to said ticket-issuing machine for energizing said control device when a ticket is to be issued by said machine, and means operative in response to operation of said control device for deenergizing said control device during the initial movement of said escapement member, whereby said escapement member is locked against further operation by said armature after said register element is operated to add to its total the value of said ticket, and means responsive to the operation of said control device for controlling said ticket-issuing machine over said circuit to cause said machine to issue said ticket.

9. In a totalizing system, a pair of ticket-issuing machines for issuing tickets of the same value, a register element, a pair of electromagnetic register control devices each corresponding to said value and each including an armature, escapement members individually controlled by said armatures and each normally locked against operation by the associated armature and released thereby when the associated control device is energized, a gear train connecting said escapement members and said register element to prevent operation of said register element when said escapement members are locked against operation by their associated armatures, continuously operated driving means, means including a slip connection between said driving means and said register element for actuating said register element and said gear train when either or both of said escapement members are released, means including circuits respectively extending to said ticket-issuing machines for simultaneously energizing said control devices, thereby to cause the simultaneous release of said escapement members, means comprising relays individually associated with said control devices and each operative in response to operation of the associated control device for deenergizing the associated control device during the initial movement of said escapement members, whereby said escapement members are locked against further operation by their associated armatures after said register element is operated to add to its registered total the total value represented by the concurrent operation of said control devices, and contacts controlled by said relays for controlling said ticket-issuing machines over said circuits to cause said machines concurrently to issue tickets.

10. In a totalizing system, a pair of ticket-issuing machines for issuing tickets of different values, a register element, a pair of electromagnetic register control devices respectively corresponding to said values and each including an armature, escapement members individually controlled by said armatures and each normally locked against operation by the associated armature and released thereby when the associated control device is energized, a gear train connecting said escapement members and said register element to prevent operation of said register element when said escapement members are locked against operation by their associated armatures, continuously operated driving means, a slip connection through which said gear train is operated by said driving means when either or both of said escapement members are released, said gear train including a differential mechanism so arranged that said register element is operated different amounts respectively corresponding to the values represented by said control devices in response to individual operation of said control devices to release their respective associated escapement members and is continuously operated a greater amount corresponding to the aggregate of the values represented by said control devices in response to concurrent operation of both of said control devices to release both of said escapement members, means including circuits respectively extending to said ticket-issuing machines for simultaneously energizing said control devices when tickets are to be issued by both of said machines, means comprising relays individually associated with said control devices and each operative in response to operation of the associated control device for deenergizing the associated control device during the initial movement of the associated escapement member, whereby said escapement members are locked against further operation after said register element is operated to add to its registered total the value represented by the concurrent operation of said control devices, and contacts controlled by said relays for controlling said ticket-issuing machines over said circuits to cause said machines concurrently to issue tickets.

11. In a totalizing system, ticket-issuing apparatus, register means including a plurality of register elements of different orders controlled by said apparatus and normally operative to total the value of tickets issued by said apparatus, normally inactive storage means for storing the total value of tickets issued by said apparatus during an interval when said register elements are locked against operation, means controlled by said storage means for effecting a tens transfer from one of the register elements to the register element of next higher order when said register elements are released for further operation, indicating means for displaying the total registered by said register means, means for intermittently locking said register elements against operation and for then releasing said register elements for further operation, and means for changing the total displayed by said indicating means so that it corresponds to the total registered by said register means during each period when said register elements are locked against operation.

12. In a totalizing system, register means, control means normally operative to vary the total registered by said register means, indicating means for displaying the total registered by said register means, means for intermittently locking said register means against operation and for then releasing said register means for further operation, means for changing the total displayed by said indicating means so that it corresponds to the total registered by said register means during each period when said register means is locked against operation, and storage means controlled by said control means for storing the total value represented by operation of said control means during each period when said register means is locked against operation and for transferring the stored total to said register means when said register means is released for further operation.

13. In a totalizing system, an adding machine including a plurality of register elements for respectively registering different values, control means for selectively controlling said register elements to vary the totals registered thereby, indicating means for displaying the total registered on said machine, means for intermittently locking said register elements against operation and for then releasing said register elements, means for changing the total displayed by said indicating means so that it corresponds to the total registered by said register elements during each period when said register elements are locked against operation, and storage devices individually associated with at least a portion of said register elements and operative during each period when said register elements are locked against operation to store values totaling that represented by operation of said control means during the period and to transfer the stored values to their respective associated register elements when said register elements are released for further operation.

14. In a totalizing system, a plurality of control devices individually corresponding to different values, register means including a plurality of register elements of different orders controlled by said devices and normally operative to totalize the values represented by operation of said devices, means for locking said register elements against operation for an interval and for then releasing said registers for further operation, normally inactive storage devices for storing the total of the values represented by operation of said control devices during said interval and for transferring the stored totals to said register elements when said register elements are released for further operation, means controlled by one of said storage devices for effecting a tens transfer from one of said register elements to the register element of next higher order when said register elements are released for further operation, and control means for effecting operation of said control devices.

15. In an adding machine, value registering means including a plurality of register elements, a plurality of control devices individually corresponding to said elements and each designating a predetermined value, operating means individually controlled by said control devices for effecting operation of the respective associated register elements to add to their respective totals the values designated by operation of the corresponding control devices, indicating means, means for locking said register elements against operation for an interval while transferring the total therefrom to said indicating means and for then releasing said elements, and normally inactive storage devices individually associated with said register elements and each operated through the associated operating means accumulatively to store the values designated by one or more operations of the associated control device during said interval and to transfer its stored total to the associated register element when said register elements are released for further operation.

16. In an adding machine, register means, a register magnet designating a predetermined value and including an armature, an escapement member normally locked against operation by said armature and released by said armature when said magnet is energized, a gear train connecting said escapement member and said register means to prevent operation of said register means when said escapement member is locked against operation by said armature, continuously operated driving means, a slip connection through which said register means and said gear train are driven by said driving means, indicating means, means for locking said register means against operation for an interval while transferring the total from said registering means to said indicating means and for then releasing said register means for further operation, normally inactive storage means including a storage pinion connected in driven relationship with said driving means for accumulatively storing the values represented by one or more operations of said magnet during said interval and for transferring the stored total through a portion of said gear train to said register means when said register means is released, and means including said slip connection for directly driving said register means an amount corresponding to said predetermined value each time said escapement member is released during a period when said storage means is inactive and during a period when a total is being transferred from said storage means to said register means.

17. In an adding machine, a register element, an indicator, means for locking said element against operation and for then releasing said element, means for transferring the totals from said element to said indicator while the element is locked, a pair of control devices respectively designating the same or different values, driving means, storage means controlled by said driving means and operative to store the total value designated by operation of said control devices during an interval when said register element is locked against operation and to transfer the stored total to said register element when said register element is released, and means controlled by said driving means and operative in response to simultaneous operation of said control devices during a period when said storage means is inactive or a period when said storage means is operating to transfer a total to said register element for directly operating said element so that the total registered thereby is increased by an amount equal to the sum of said values.

18. In an adding machine, a register element, means for locking said register element against operation and for then releasing said element for further operation, a pair of register control devices the operations of which respectively designate different values, a gear train connecting said register element and said control devices, escapement members individually locked against operation by said control devices and normally restraining said gear train against operation, driving means including a slip connection, storage means controlled by said driving means and operative to store the total value designated by operation of said control devices during an interval when said register element is locked against operation and to transfer the stored total to said register element when said register element is released, means including said driving means and said slip connection for driving said register element when one or both of said escapement members are released by their associated control devices during a period when said storage means is inactive or a period when said storage means is operating to transfer a total to said register element, and means comprising a pair of differential mechanisms included in said gear train at different points for causing said register element to add to its registered total a value equal to the sum of said different values in response to the simultaneous release of said escapement members, an indicator, and means for transferring the values registered in said register element while it is locked against operation.

19. In an adding machine, a first register element operative to totalize a plurality of predetermined values; a second register element of higher order than said first register element, a control device the operation of which represents a different value, a gear train connecting said second register element and said control device, an escapement member normally locked against operation by said control device and normally restraining said gear train against operation, and driving means for driving said second register element and said gear train a predetermined amount corresponding to said different value when said escapement member is released by said control device; means for effecting tens transfers from said first register element to said second register element, and means comprising a differential mechanism included in said gear train for permitting said second register element simultaneously to respond to concurrent operation of said control device and said tens transfer means.

20. In an adding machine, a first register element operative to totalize a plurality of predetermined values; a second register element of higher order than said first register element, a pair of control devices the operations of which respectively represent different values, a gear train connecting said second register element and said control devices, a pair of escapement members normally locked against operation by said control devices and normally restraining said gear train against operation, driving means for driving said second register element and said gear train predetermined amounts respectively corresponding to said different values in response to operation of the corresponding control devices to release their respective associated escapement members, means comprising a differential mechanism included in said gear train for causing said second register element to add to its registered total a value equal to the sum of said different values in response to the simultaneous release of said escapement members; means for effecting tens transfers from said first register element to said second register element, and means comprising a second differential mechanism included in said gear train for permitting said second register element simultaneously to respond to concurrent operation of one or both of said control devices and said tens transfer means.

21. In a totalizing system, a plurality of ticket-issuing machines including means for indexing the sale of tickets of the same or different values, marking leads extending to said ticket-issuing machines, means in each machine for marking the associated lead when a ticket sale is indexed therein, register means, a plurality of register control devices each operative when connected to a marked one of said leads, a cyclically operative collected having a plurality of settings and operative to connect a plurality of marked leads to different ones of said control devices when operated to any one of its settings, whereby a plurality of said control devices may be concurrently operated, means for locking said register means against operation for an interval and for then releasing said register means for further operation, storage means controlled by said devices and operative to store the total of values represented by operated ones of said control devices during said interval and to transfer the stored total to said register means in response to the release of said register means at the end of said interval, means operative in response to concurrent operation of a plurality of said control devices during a period when said storage means is inactive or during a period when said storage means is transferring a stored total to said register means for causing said register means continuously to operate until the total of the values represented by the operated control devices is added to the total registered thereby, and means responsive to concurrent operation of a plurality of said control devices for controlling over said marked leads the ticket-issuing machines to which the operated control devices are connected to cause the connected ticket-issuing machines concurrently to issue tickets of the values indexed therein.

22. In a totalizing system, ticket-issuing machines each including means for indexing the sale of a ticket, a register element, means controlled by the machines in which ticket sales are concurrently indexed for causing said register element to register in one continuous operation the total value of the indexed ticket sales, and means responsive to the operation of said last-named means for causing the machines in which ticket sales are concurrently indexed to issue tickets concurrently.

23. In a totalizing system, ticket-issuing machines each including means for indexing the sale of a ticket, register means operative to total the values of ticket sales indexed in said machines and including a register element, means controlled by the machines in which ticket sales are concurrently indexed for causing said register element to register in one continuous operation the total value of the indexed ticket sales, indicating means for displaying the total of the values registered in said register means, means for intermittently locking said register element against operation and for then releasing said register element for further operation, means for changing the total displayed by said indicating means so that it corresponds to the total registered by said register means during each period when said register element is locked against operation, storage means controlled by said second-named means and operative to store the total of ticket values indexed in said machines during each interval when said register element is locked against operation and to transfer the stored total to said register element when said element is released for further operation, and means controlled by said second-named means for causing the machines in which ticket sales are concurrently indexed to issue tickets concurrently.

24. In a totalizing system, value indexing apparatus, register apparatus recurrently operative through a predetermined cycle, cyclically operating means for controlling said register apparatus to cause each cycle of operation thereof to include non-concurrent periods for registering, reading and storage transfer respectively, means for locking said register apparatus against operation during each reading period and for releasing said register apparatus at the end of each reading period, storage means for accumulatively storing the values indexed in said value indexing apparatus during each reading period and for transferring the stored total to said register apparatus during the succeeding storage transfer period, means for rendering said storage means completely inactive during each registering period, and means for directly entering in said register means values indexed in said value indexing apparatus during each registering period.

MARTIN L. NELSON.